United States Patent
Choi et al.

(10) Patent No.: US 12,175,059 B2
(45) Date of Patent: Dec. 24, 2024

(54) METHOD AND ELECTRONIC DEVICE FOR NAVIGATING APPLICATION SCREEN

(71) Applicant: SAMSUNG ELECTRONICS CO., LTD., Suwon-si (KR)

(72) Inventors: Inkwon Choi, Suwon-si (KR); Jungmin Kwon, Suwon-si (KR); Chiyoun Park, Suwon-si (KR); Youngchul Sohn, Suwon-si (KR); Byeongcheol Kang, Suwon-si (KR); Ilgu Kang, Suwon-si (KR); Jeongseop Kim, Suwon-si (KR); Hyunseo Park, Suwon-si (KR); Juyong Song, Suwon-si (KR); Kangwook Lee, Suwon-si (KR); Joohyung Lee, Suwon-si (KR); Dongjae Lim, Suwon-si (KR); Donguk Ju, Suwon-si (KR); Sunghyun Choi, Suwon-si (KR); Gyujeong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/875,083

(22) Filed: Jul. 27, 2022

(65) Prior Publication Data
US 2022/0404956 A1    Dec. 22, 2022

Related U.S. Application Data

(63) Continuation of application No. PCT/KR2022/008605, filed on Jun. 17, 2022.

(30) Foreign Application Priority Data

Jun. 17, 2021   (KR) .................. 10-2021-0078993
May 4, 2022    (KR) .................. 10-2022-0055724

(51) Int. Cl.
*G06F 17/00*     (2019.01)
*G06F 3/04842*   (2022.01)
*G06F 3/16*      (2006.01)

(52) U.S. Cl.
CPC .......... *G06F 3/04842* (2013.01); *G06F 3/167* (2013.01)

(58) Field of Classification Search
CPC .... G06F 3/04842; G06F 3/167; G06F 3/0482; G06F 3/04886; G06F 3/04892;
(Continued)

(56) References Cited

U.S. PATENT DOCUMENTS 10,018,977 B2    7/2018   Cipollo et al.
10,042,550 B2 *  8/2018   Hwang ............... G06F 3/04883
(Continued)

FOREIGN PATENT DOCUMENTS

KR    10-2003-0047153 A   6/2003
KR    10-2015-0054490 A   5/2015
(Continued)

OTHER PUBLICATIONS

Karaman, Çağla Çığ, and Tevfik Metin Sezgin. "Gaze-based predictive user interfaces: Visualizing user intentions in the presence of uncertainty." International Journal of Human-Computer Studies 111 (2018): 78-91 (Year: 2018).*
(Continued)

*Primary Examiner* — Andrew T McIntosh
(74) *Attorney, Agent, or Firm* — Sughrue Mion, PLLC

(57) ABSTRACT

Provided are an electronic device for navigating an application screen, and an operating method thereof. The method may include receiving a user input; determining, based on the user input, a user intent for controlling the electronic device; determining a command for performing a control operation corresponding to the user intent as a goal; iden-
(Continued)

tifying elements of a user interface on the screen of the application; determining, based on the user intent and the elements of the user interface, at least one sub-goal for executing the command; and executing the command by performing at least one task corresponding to the at least one sub-goal, wherein the at least one sub-goal is changeable based on a validation of an operation of navigating the application for executing the command, and the at least one task includes units of action for navigating the application.

12 Claims, 33 Drawing Sheets

(58) Field of Classification Search
CPC .............. G06F 3/165; H04M 1/72415; H04N 21/42203; H04N 21/42208; H04N 21/42222; H04N 21/4394; H04N 21/44008; H04N 21/482
See application file for complete search history.

(56) References Cited

U.S. PATENT DOCUMENTS

| | | | |
|---|---|---|---|
| 10,127,011 | B2 | 11/2018 | Bang et al. |
| 10,572,137 | B2 * | 2/2020 | Rajabi .................... G06F 3/0485 |
| 10,585,677 | B2 | 3/2020 | Desineni et al. |
| 2010/0058363 | A1 * | 3/2010 | Brun ....................... G06F 9/451 |
| | | | 719/328 |
| 2013/0347009 | A1 * | 12/2013 | Hall ....................... G06F 9/4482 |
| | | | 719/328 |
| 2015/0106851 | A1 * | 4/2015 | Pauli ...................... G06F 3/0386 |
| | | | 725/52 |
| 2015/0169285 | A1 * | 6/2015 | Reyes ..................... G06F 3/167 |
| | | | 715/728 |
| 2016/0088060 | A1 * | 3/2016 | Rahman ................ H04L 67/025 |
| | | | 715/740 |
| 2016/0292217 | A1 * | 10/2016 | Sinha ..................... G06F 3/0482 |
| 2017/0031652 | A1 | 2/2017 | Kam et al. |
| 2018/0356977 | A1 | 12/2018 | Won et al. |
| 2019/0250891 | A1 * | 8/2019 | Kumar ..................... G06T 7/70 |
| 2019/0304455 | A1 * | 10/2019 | Jaygarl ................... G10L 15/08 |
| 2019/0311717 | A1 * | 10/2019 | Kim ........................ G06F 3/167 |
| 2019/0391825 | A1 * | 12/2019 | Jann ....................... G06F 3/0482 |
| 2020/0057541 | A1 * | 2/2020 | Wantland ............ G06F 3/04883 |
| 2020/0225908 | A1 * | 7/2020 | Lee ......................... G10L 15/26 |
| 2021/0027774 | A1 * | 1/2021 | Kessler ................. G06N 3/045 |
| 2021/0133652 | A1 * | 5/2021 | Khalid ............ G06Q 10/06311 |
| 2022/0321965 | A1 | 10/2022 | Sim et al. |

FOREIGN PATENT DOCUMENTS

| | | |
|---|---|---|
| KR | 10-1579292 B1 | 12/2015 |
| KR | 10-2018-0046208 A | 5/2018 |
| KR | 10-2018-0064328 A | 6/2018 |
| KR | 10-2018-0069477 A | 6/2018 |
| KR | 10-2018-0135687 A | 12/2018 |
| KR | 10-2020-0008341 A | 1/2020 |
| KR | 10-2145370 B1 | 8/2020 |
| WO | WO-2013192117 A2 * | 12/2013 ........... G06F 9/4482 |

OTHER PUBLICATIONS

Cho, Vincent, TC Edwin Cheng, and WM Jennifer Lai. "The role of perceived user-interface design in continued usage intention of self-paced e-learning tools." Computers & Education 53.2 (2009): 216-227 (Year: 2009).*

Choi, Wontae, George Necula, and Koushik Sen. "Guided gui testing of android apps with minimal restart and approximate learning." Acm Sigplan Notices 48.10 (2013): 623-640 (Year: 2013).*

International Search Report (PCT/ISA/220 and PCT/ISA/210) and Written Opinion (PCT/ISA/237) issued Sep. 21, 2022 by the International Searching Authority in International Application No. PCT/KR2022/008605.

* cited by examiner

FIG. 12B
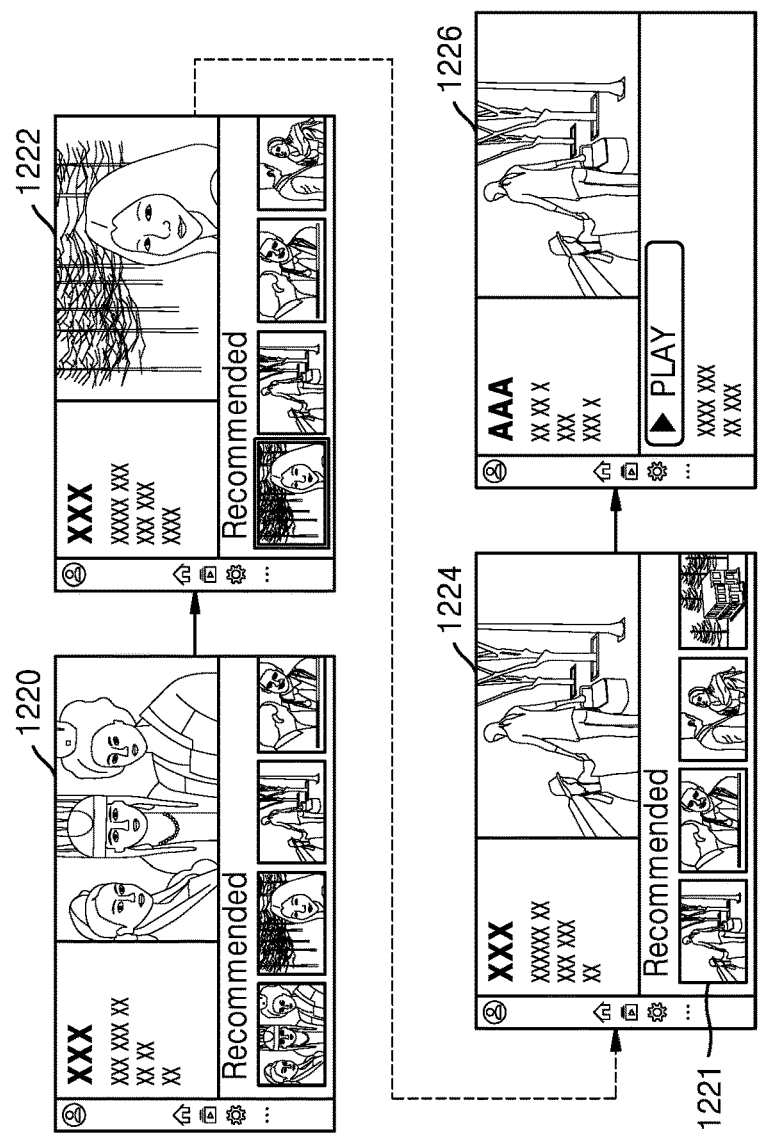
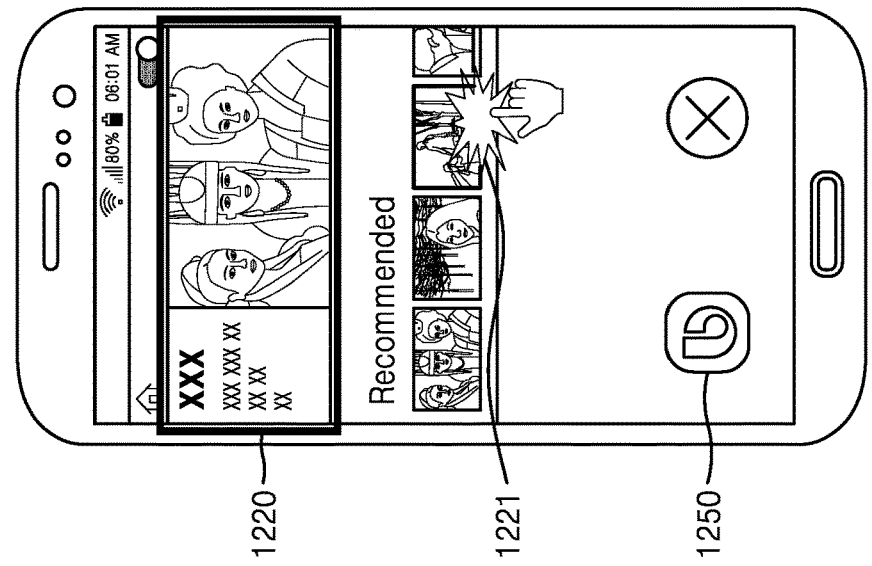

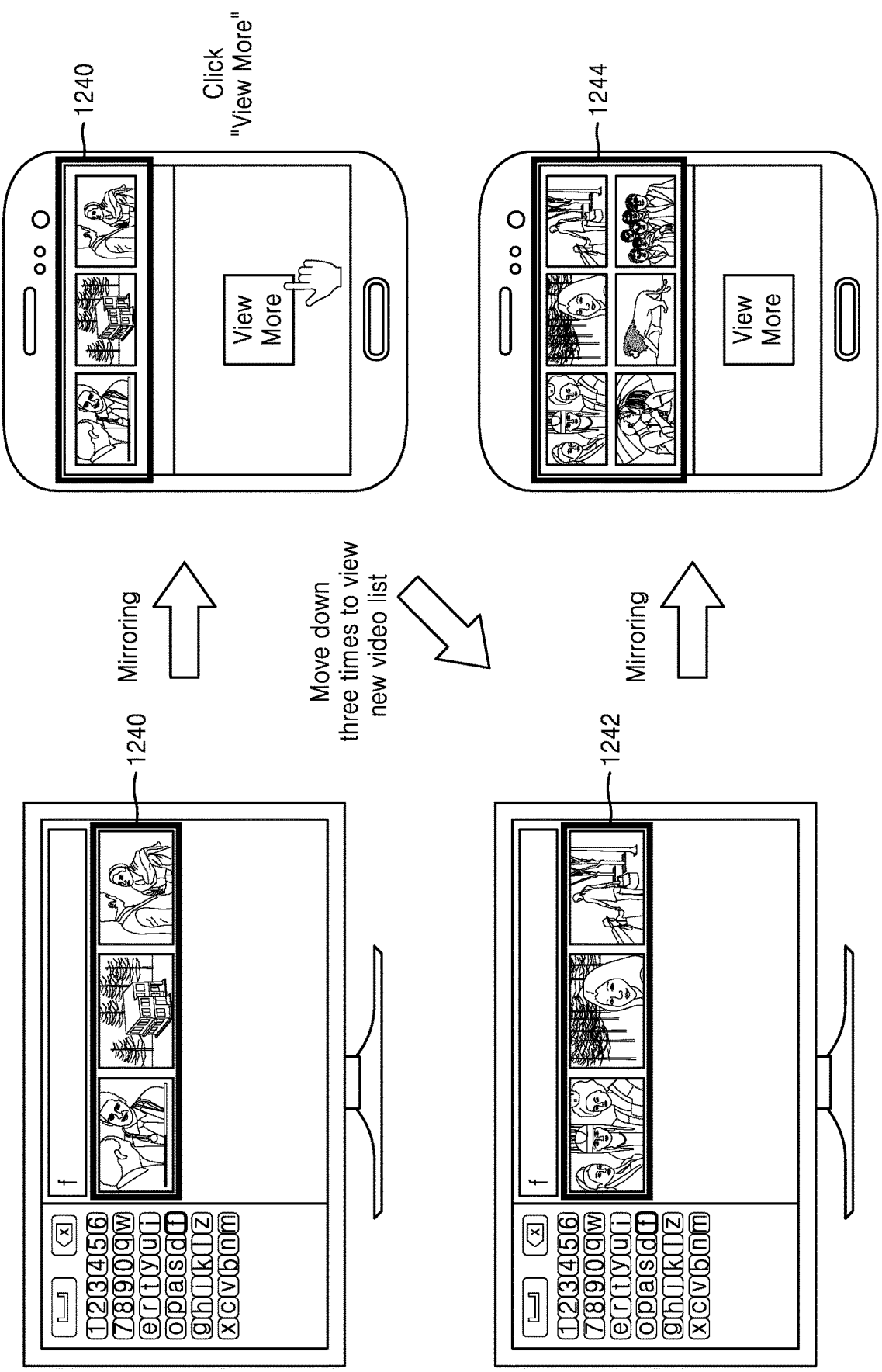

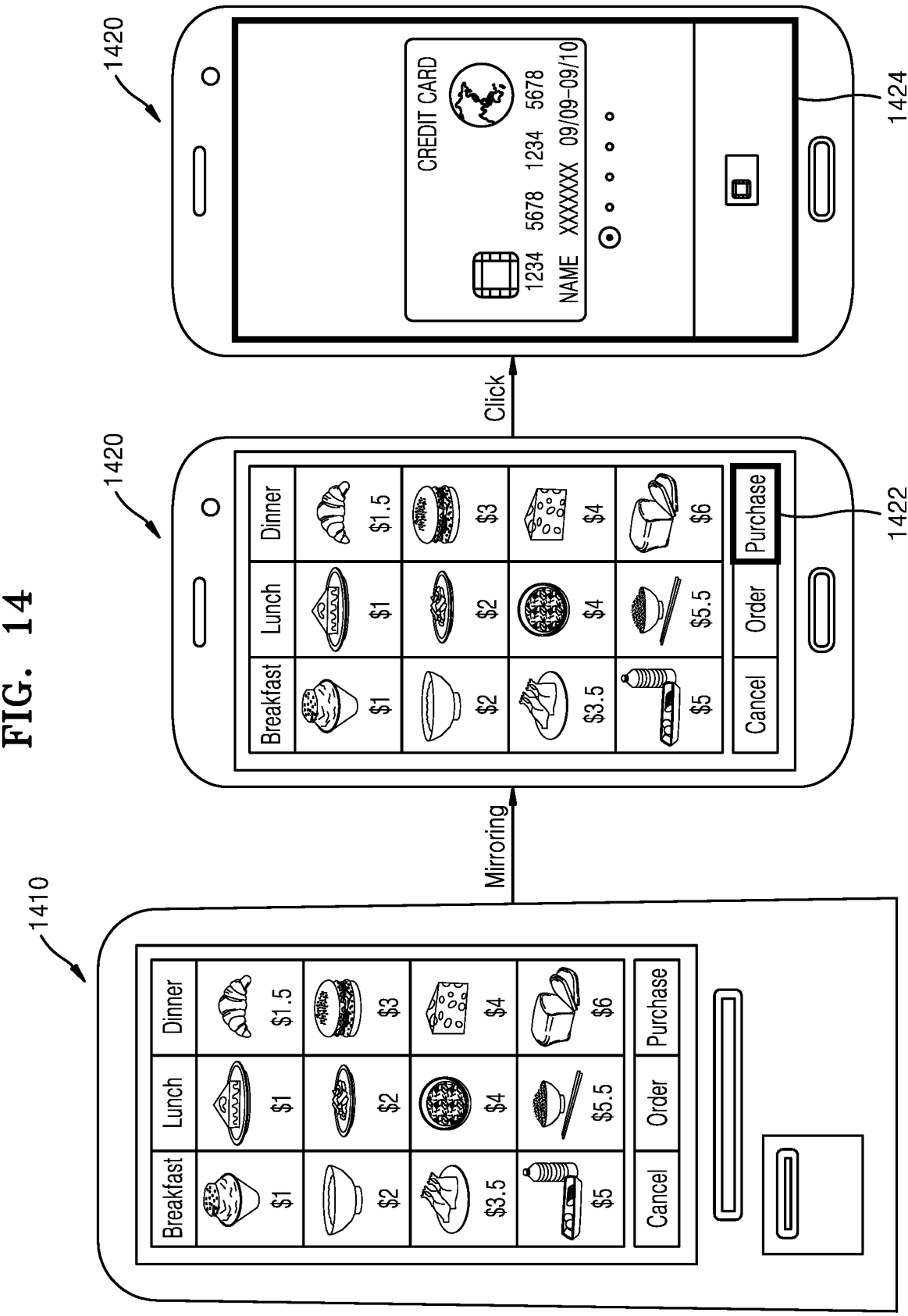

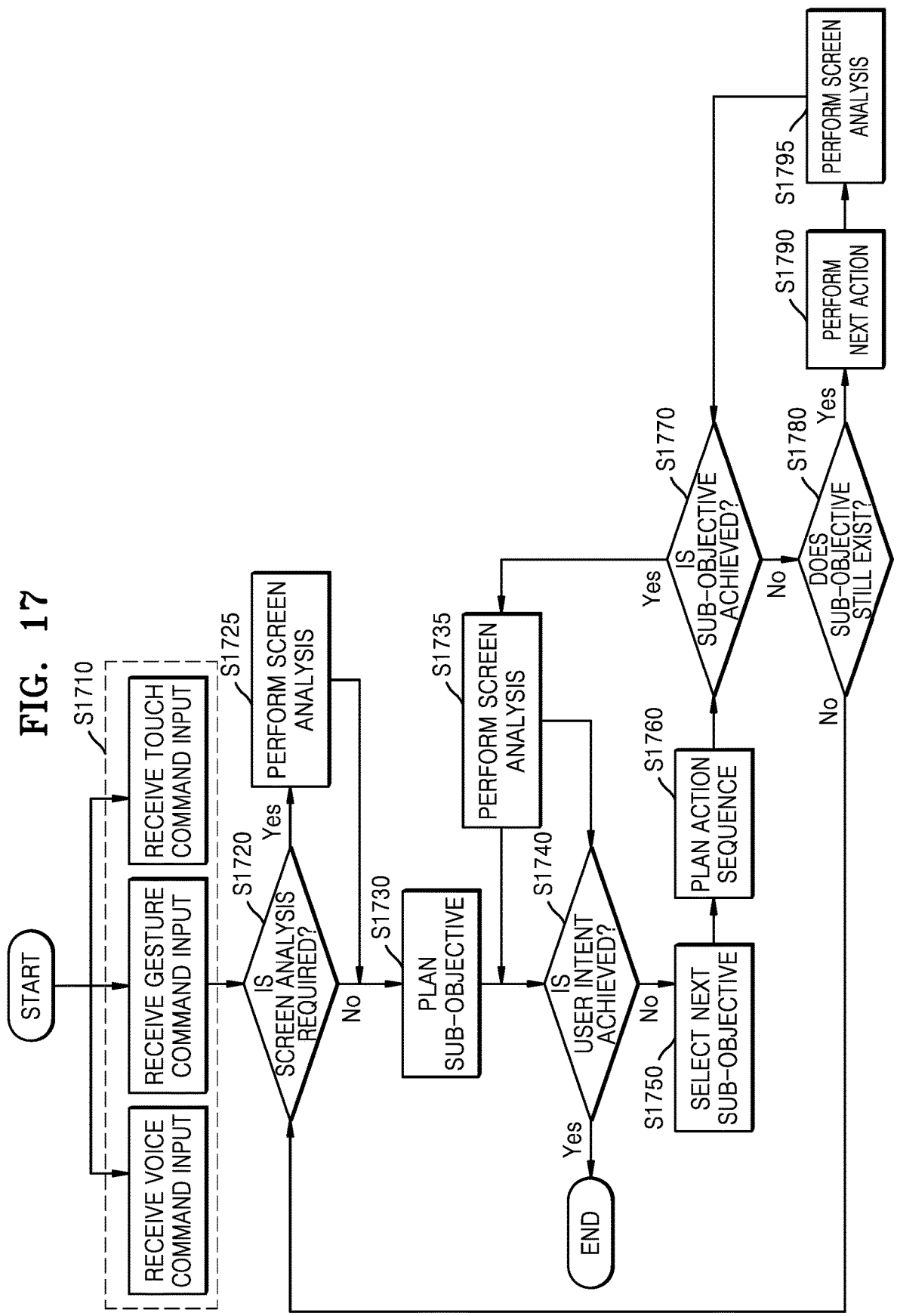

METHOD AND ELECTRONIC DEVICE FOR NAVIGATING APPLICATION SCREEN

CROSS-REFERENCE TO RELATED APPLICATION(S)

This application is a bypass continuation application of International Application No. PCT/KR2022/008605, filed on Jun. 17, 2022, which claims priority to Korean Patent Application No. 10-2021-0078993, filed on Jun. 17, 2021, and Korean Patent Application No. 10-2022-0055724, filed on May 4, 2022, in the Korean Intellectual Property Office, the disclosures of which are incorporated by reference herein in their entireties.

TECHNICAL FIELD

The disclosure relates to an electronic device for controlling and autonomously navigating a screen or an application, and an operating method of the electronic device.

BACKGROUND

Examples of various electronic devices including a display include a television (TV), a signage, a kiosk, etc. Accordingly, methods, performed by users, of controlling respective electronic devices including a display are different from each other according to characteristics of the electronic devices. For example, a TV is provided with a remote controller, which is a control device for navigating an application and/or controlling an external source, for controlling the TV. Latest TVs provide various functions, such as content reproduction through an application or game execution through an external source connected thereto. Accordingly, the number of applications for providing a service by using a function of TVs is also increasing. Functions provided by TVs are various and their number is gradually increasing, but simplification of buttons of remote controllers may require users to click buttons several times in order to execute a single command.

There is a demand for providing an improved user experience by allowing a user to easily and conveniently manipulate any application executed by an electronic device or any device connected to and used by the electronic device.

Technical Problem

Embodiments of the disclosure provide an electronic device capable of navigating and/or controlling an application based on a command input by a user and a result of analyzing a screen of the electronic device, without using an application programming interface (API) of the application, and an operating method of the electronic device.

Technical Solution

According to an aspect of the disclosure, provided is a method, performed by an electronic device, of navigating an application screen. The method may include: receiving a user input; determining, based on the user input, a user intent for controlling the electronic device; determining a command for performing a control operation corresponding to the user intent as a goal; identifying elements of a user interface on the screen of the application; determining, based on the user intent and the elements of the user interface, at least one sub-goal for executing the command; and executing the command by performing at least one task corresponding to the at least one sub-goal, wherein the at least one sub-goal is changeable based on a validation of an operation of navigating the application for executing the command, and the at least one task includes units of action for navigating the application.

The elements of the user interface of the screen of the application may include at least one of an icon, an image, a text, or a button.

The method may further include determining whether the command corresponds to a function that is callable by an operating system of the electronic device, and the identifying of the elements of the user interface may include identifying the elements of the user interface on the screen of the application based on the command corresponding to a function that is uncallable by the operating system of the electronic device.

The determining of the at least one sub-goal may include: detecting a current state of the electronic device based on the elements of the user interface; determining, based on the user intent, a target state of the electronic device in which the command is executed; and determining the at least one sub-goal based on the current state of the electronic device and the target state of the electronic device.

The executing of the command may include, based on the at least one sub-goal including two or more sub-goals, sequentially achieving the two or more sub-goals until the control command is executed.

The executing of the command may include navigating the application by performing the at least one task including switching of the screen of the application.

The method may further include: determining, based on the screen of the application being switched from a first screen to a second screen, whether a first sub-goal is achieved, to perform the validation; and dynamically determining a second sub-goal, based on whether the first sub-goal is achieved.

The dynamically determining of the second sub-goal may include changing the second sub-goal based on interface elements of the second screen.

The executing of the command may include: performing a first task corresponding to the first sub-goal; and performing a second task corresponding to the second sub-goal.

The user input may include a voice signal, and the determining of the user intent may include: converting the voice signal into a text by performing automatic speech recognition (ASR) on the voice signal; and obtaining the user intent by applying the text to a natural-language understanding (NLU) model.

According to another aspect of the disclosure, provided is an electronic device for navigating a screen of an application. The electronic device may include: a display configured to display a screen of an application being executed; a communication interface; a memory storing one or more instructions; and a processor configured to execute the one or more instructions stored in the memory to receive a user input, determine, based on the user input, a user intent for controlling the electronic device, determine a command for performing a control operation corresponding to the user intent as a goal, identify elements of a user interface on the screen of the application, determine, based on the user intent and the elements of the user interface, at least one sub-goal for executing the command, and execute the command by performing at least one task corresponding to the at least one sub-goal, wherein the at least one sub-goal is changeable based on a validation on an operation of navigating the application for executing the command, and the at least one task includes units of action for navigating the application.

According to another aspect of the disclosure, provided is a computer-readable recording medium having recorded thereon a program for executing any one of the methods causing the electronic device to navigate an application screen.

BRIEF DESCRIPTION OF DRAWINGS

FIG. 12B is a diagram for further describing the first embodiment of the operation of navigating the screen of the first electronic device based on a touch input on the second electronic device, according to an embodiment of the disclosure.

FIG. 12D is a diagram for describing a third embodiment of an operation of navigating a screen of a first electronic device based on a touch input on a second electronic device, according to an embodiment of the disclosure.

FIG. 14 is a diagram for describing another embodiment of the disclosure in which a first electronic device is controlled based on a touch input on a second electronic device.

FIG. 17 is a flowchart of a control operation of an electronic device according to an embodiment of the disclosure.

DETAILED DISCLOSURE

Figure 1:
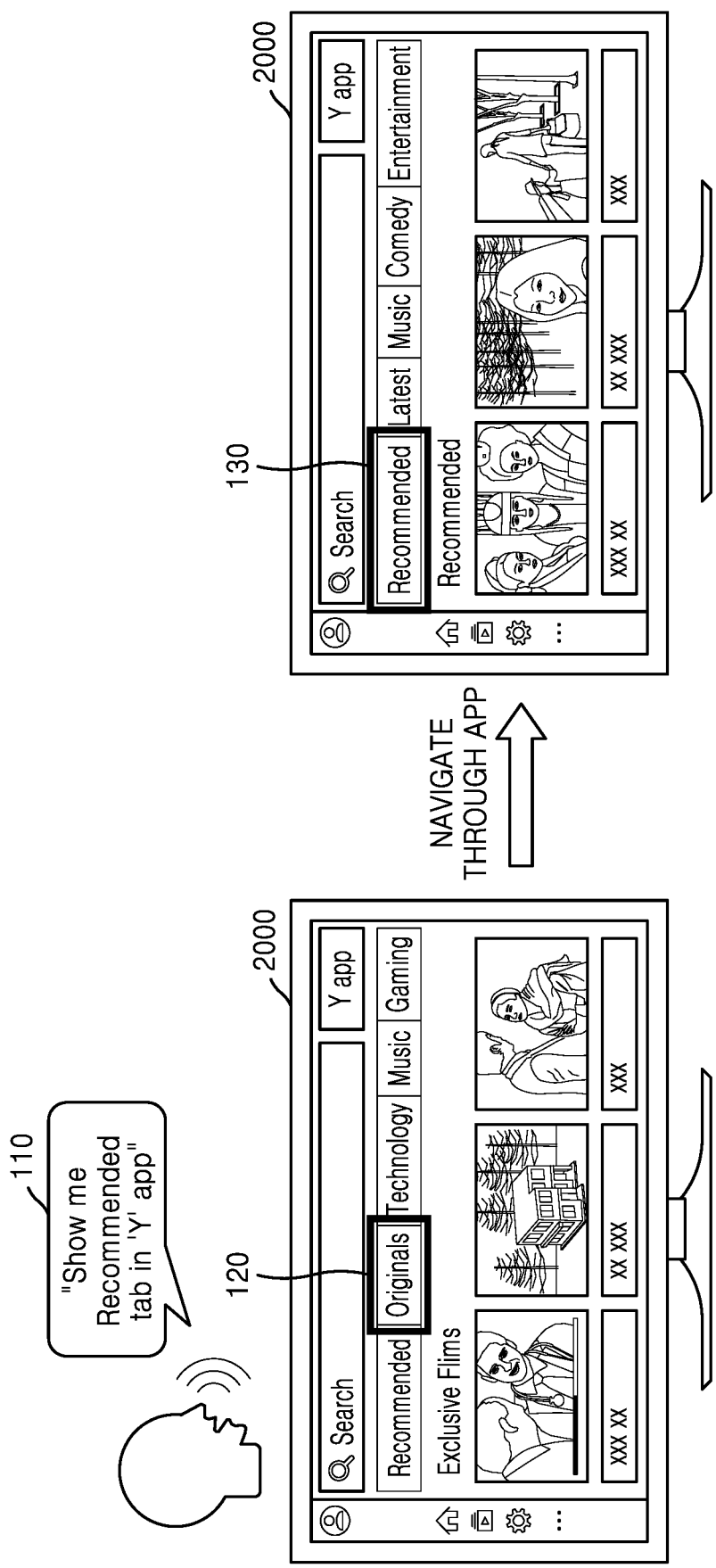
FIG. 1 is a diagram illustrating an example in which an electronic device controls an application screen, according to an embodiment of the disclosure.

The terms used herein will be briefly described, and then the disclosure will be described in detail. Throughout the disclosure, the expression "at least one of a, b or c" indicates only a, only b, only c, both a and b, both a and c, both b and c, all of a, b, and c, or variations thereof.

Although the terms used in the disclosure are selected from among common terms that are currently widely used in consideration of their functions in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used herein are not merely designations of the terms, but the terms are defined based on the meaning of the terms and content throughout the disclosure.

The singular expression may also include the plural meaning as long as it is not inconsistent with the context. All the terms used herein, including technical and scientific terms, may have the same meanings as those generally understood by those of skill in the art. In addition, although the terms such as 'first' or 'second' may be used in the present specification to describe various elements, these elements should not be limited by these terms. These terms are only used to distinguish one element from another element.

Throughout the specification, when a part "includes" a component, it means that the part may additionally include other components rather than excluding other components as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

Hereinafter, embodiments of the disclosure will be described in detail with reference to the accompanying drawings to allow those of skill in the art to easily carry out the embodiments of the disclosure. The disclosure may, however, be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the present specification.

Hereinafter, the disclosure will be described in detail with reference to the accompanying drawings.

FIG. 1 is a diagram illustrating an example in which an electronic device controls an application screen, according to an embodiment of the disclosure.

Referring to FIG. 1, an electronic device 2000 according to an embodiment of the disclosure may be a device including a display and capable of outputting an image and/or a video. For example, the electronic device 2000 may be a smart television (TV), a smart phone, a signage, a kiosk, an electronic blackboard, a tablet PC, a laptop personal computer (PC), a frame-type display, or the like, but is not limited thereto, and may be implemented in various types and configurations of electronic devices including a display. In addition, the electronic device 2000 may also include a speaker to output an audio.

The electronic device 2000 according to an embodiment of the disclosure may navigate an application screen based on a user input 110. For example, the electronic device 2000 may be currently in a state in which a Y application, which is a video application, is running, and an 'Originals' tab 120 has been selected from among content categories.

In an embodiment of the disclosure, the electronic device 2000 may receive the user input 110 "Show me a 'Recommended' tab 130 in the Y app", in the form of a voice signal. The electronic device 2000 may determine a user intent, one or more operations to be performed, based on the user input 110.

In an embodiment of the disclosure, the electronic device 2000 may analyze a screen of the electronic device 2000 to identify user interface (UI) elements in the screen. The electronic device 2000 may determine at least one task for achieving the user intent based on the UI elements. A task may include system actions for navigating an application, and examples of system actions may include a cursor movement, a click, etc.

In an embodiment of the disclosure, applications executed by the electronic device 2000 may be classified into system applications controllable by an operation system (OS) of the electronic device, and third-party applications, each of which is developed by a third-party company to provide a particular function and/or service by using an application programming interface (API) provided by the OS of the electronic device 2000. The third-party applications include applications to be executed in association with an external source (e.g., a game console, a set-top box, etc.) connected to the electronic device 2000.

The third-party applications are developed and distributed by other companies than the manufacturer of the electronic device 2000. Therefore, in order for the OS of the electronic device 2000 to navigate and/or control a third-party application, an API of the third-party application provided by the developer of the third-party application is required. Otherwise, when the API of the third-party application is not provided or is uncallable, the OS of the electronic device 2000 is unable to navigate and/or control the application. In this case, in order to navigate and/or control the third-party application executed by the electronic device 2000, a separate control device, such as a remote controller, may be used.

The electronic device 2000 according to an embodiment of the disclosure may control a third-party application in the same/similar manner as navigating and/or controlling of an application by a user with a control device, such as a remote controller, without an API of the third-party application.

The electronic device 2000 may navigate and/or control an application by identifying UI elements by analyzing a screen of the electronic device 2000, and selecting at least one of the identified UI elements according to a user intent or operation to be performed. The electronic device 2000 may determine the user intent or the operation to be performed based on the user input 110, identify UI elements of an application screen, and determine at least one task for achieving the user intent or the operation to be performed (i.e., for performing a control command corresponding to the user intent) based on the user intent or the operation to be performed and the UI elements.

In an embodiment of the disclosure, the electronic device 2000 may determine at least one sub-goal for achieving the user intent or the operation to be performed. Each sub-goal may be achieved by performing a task corresponding to the sub-goal. The electronic device 2000 may analyze the screen of the electronic device 2000 whenever each sub-goal is achieved, and dynamically determine a task for achieving a sub-goal based on the identified UI elements.

Detailed operations, performed by the electronic device 2000, of navigating a screen will be described below in more detail with reference to drawings.

Figure 2:
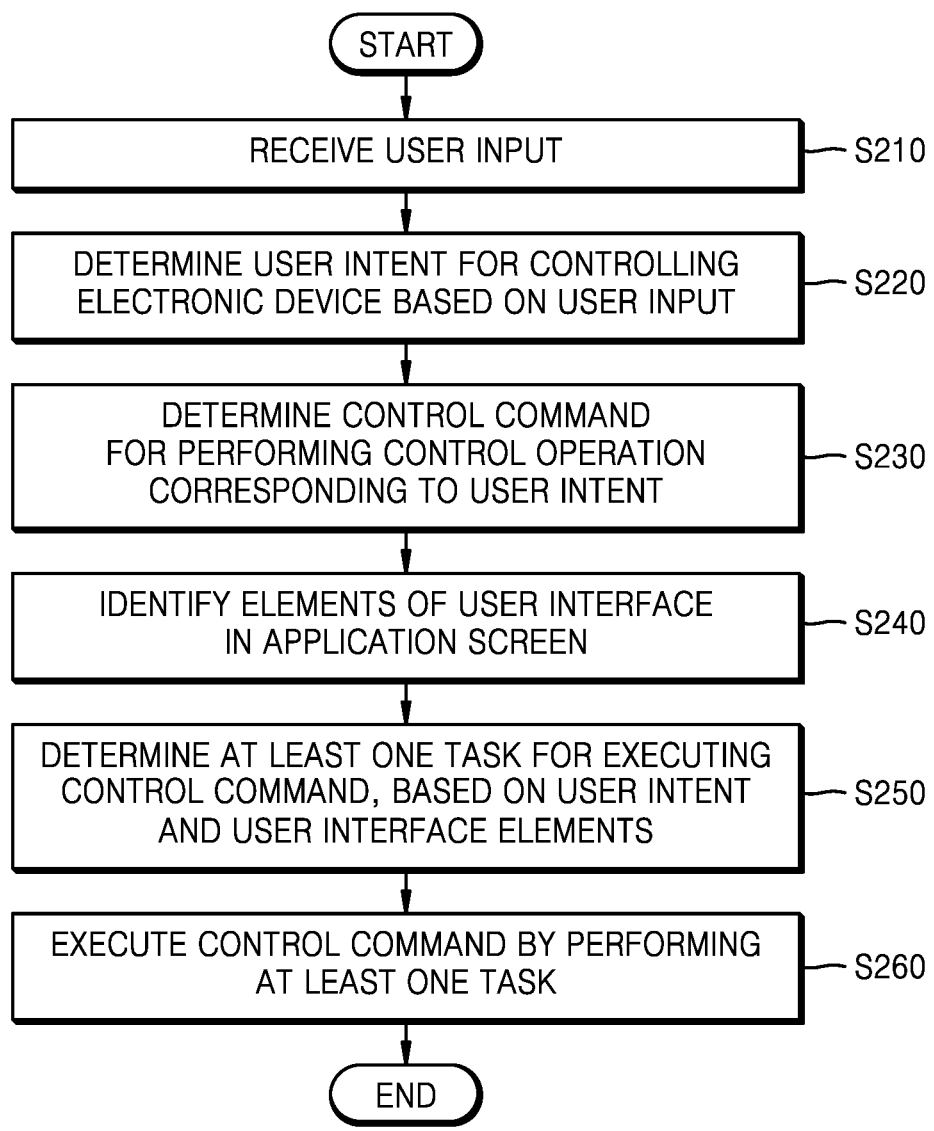
FIG. 2 is a flowchart for describing a method, performed by an electronic device, of navigating a screen of an application, according to an embodiment of the disclosure.

FIG. 2 is a flowchart for describing a method, performed by an electronic device, of navigating a screen of an application, according to an embodiment of the disclosure.

In operation S210, the electronic device 2000 according to an embodiment of the disclosure receives a user input.

In an embodiment of the disclosure, user inputs may include, but are not limited to, voice signal inputs, text inputs, gesture inputs, and touch inputs on a duplicate screen on a second device.

In operation S220, the electronic device 2000 according to an embodiment of the disclosure determines a user intent for controlling the electronic device 2000 based on the user input.

In an embodiment of the disclosure, a user intent includes information indicating a function and/or operation that a user input is to perform via the electronic device 2000.

In an embodiment of the disclosure, the electronic device 2000 may identify the type of the user input. The electronic device 2000 may determine the user intent by analyzing the user input based on the type of the user input. For example, when the user input is a voice signal, the electronic device 2000 may perform automatic speech recognition (ASR) on the voice signal to convert the voice signal into a text, apply the text to a natural-language understanding (NLU) model, and thus determine the user intent. For example, when the user input is a text input, the electronic device 2000 may apply the text to the NLU model to determine the user intent. For example, when the user input is a gesture signal, the electronic device 2000 may determine the user intent based on gesture recognition. In this case, predefined control operations may correspond to respective gesture shapes. For example, when the user input is a touch input on a duplicate screen on a second device, the electronic device 2000 may determine the user intent based on the user touch input on the screen on the second device. In detail, the user intent may be execution of a control operation corresponding to a UI element of the position of the touch on the second device.

In operation S230, the electronic device 2000 according to an embodiment of the disclosure determines a control command for performing a control operation corresponding to the user intent.

In an embodiment of the disclosure, the control command refers to a command related to a principal control operation of the electronic device 2000, which invokes a function of the electronic device 2000 matching the user intent. That is, the user intent is achieved by executing the control command.

Hereinafter, an example will be described in which the user intent is to reproduce content A by using an N application on the electronic device 2000. In this case, the control operations of the electronic device 2000 related to the user intent may include, for example, execution of the N application, searching for the content A, reproduction of the content A, etc. Here, the principal control operation corresponding to the user intent is 'reproduction of the content A', and thus the electronic device 2000 may determine the control command to be 'reproduction of the content A'.

In an embodiment of the disclosure, the control command may be executed by performing at least one task. This will be described below with reference to operation S250.

The control command may be an instruction, such as machine code or program code, but is not limited thereto. In the disclosure, for convenience of descriptions, the control command will be described as a natural-language form (e.g., 'Execute function X').

In operation S240, the electronic device 2000 according to an embodiment of the disclosure identifies elements of a UI in an application screen. The UI element may cause, when selected by the user, a particular function to be performed, and may include at least one of an icon, an image, a text, or a button.

In an embodiment of the disclosure, the electronic device 2000 may analyze a screen layout. A screen layout includes the arrangement of UI elements in a screen. The electronic device 2000 may detect one or more UI elements present in the screen layout, and identify the sizes and positions of the UI elements in the screen. The electronic device 2000 may classify and recognize the detected UI elements. For example, the electronic device 2000 may classify the detected UI elements into icons, images, texts, or buttons. Furthermore, the electronic device 2000 may recognize details of the UI elements, for example, the meaning of a UI element classified as an icon, or the content of a UI element classified as a text.

In an embodiment of the disclosure, the electronic device 2000 may determine whether the determined control command corresponds to a function that is callable by the OS of the electronic device 2000. In some embodiments of the disclosure, when the determined control command is related to a system application of the electronic device 2000 and thus is a function that is callable directly by the OS of the electronic device 2000, the electronic device 2000 may omit the operation of identifying the UI elements in the screen and directly control the system application. In some embodiments of the disclosure, when the determined control command is related to a third-party application installed in the electronic device 2000 and/or to external sources connected to the electronic device 2000, and thus is a function that is uncallable directly by the OS of the electronic device 2000, the electronic device 2000 may identify the UI elements to determine tasks for executing the control command.

The electronic device 2000 according to an embodiment of the disclosure may generate layout information by processing information related to the identified UI elements.

In operation S250, the electronic device 2000 according to an embodiment of the disclosure determines at least one sub-goal for executing the control command, based on the user intent and the UI elements.

In an embodiment of the disclosure, the electronic device 2000 may determine at least one sub-goal for executing the control command. One sub-goal corresponds to one task. That is, one sub-goal may be achieved by performing one task, and when all sub-goals are achieved by performing all tasks, it may be considered that the control command is executed and thus the user intent is achieved.

In an embodiment of the disclosure, the at least one sub-goal for executing the control command is dynamically determined based on identified UI elements. That is, although the user intent is achieved by executing the control command, the current state of the electronic device 2000 may vary depending on the current situation, one or more phases for reaching a state in which the control command is executable may be required according to the current state of the electronic device 2000.

The above-described example will be continuously described, in which the user intent is to reproduce the content A by using the N application on the electronic device 2000, and the determined control command is 'Reproduce the content A'.

For example, when a UI element indicating the content A is present on the current screen of the electronic device 2000, the control command 'Reproduce the content A' may be executed by performing only selection of the UI element indicating the content A, which is at least one task. As another example, when the application N is running on the electronic device 2000 but no UI element indicating the content A is present on the current screen of the application N, the control command 'Reproduce the content A' may be executed by performing searching for the content A and selection of a UI element indicating the content A, which are at least two tasks. As another example, when the N application is not running on the electronic device 2000, the control command 'Reproduce the content A' may be executed by performing execution of the N application, searching for the content A, and selection of a UI element indicating the content A, which are at least three tasks.

In operation S260, the electronic device 2000 according to an embodiment of the disclosure executes the control command by performing the at least one task.

In an embodiment of the disclosure, one task may include one or more system actions, each of which is a unit of action for navigating an application. The system actions may include, for example, up, down, left, and right movements of a cursor, a click, and the like, but is not limited thereto.

In an embodiment of the disclosure, when the control command requires two or more sub-goals, the electronic device 2000 may sequentially achieve the sub-goals until the control command is executed. When the control command requires two sub-goals, for example, the electronic device 2000 may perform a first task corresponding to the first sub-goal and then perform a second task corresponding to the second sub-goal.

For example, the electronic device 2000 may allow the sub-goals to be sequentially achieved by sequentially performing the tasks corresponding to the sub-goals, respectively. As sub-goals are sequentially achieved, an operation of navigating an application is performed. While sequentially achieving the sub-goals, the electronic device 2000 may perform interim validation to determine whether a certain sub-goal has been achieved. The electronic device 2000 may determine whether a sub-goal is achieved, and then dynamically determine a next sub-goal according to a result of the determining.

Figure 3A:
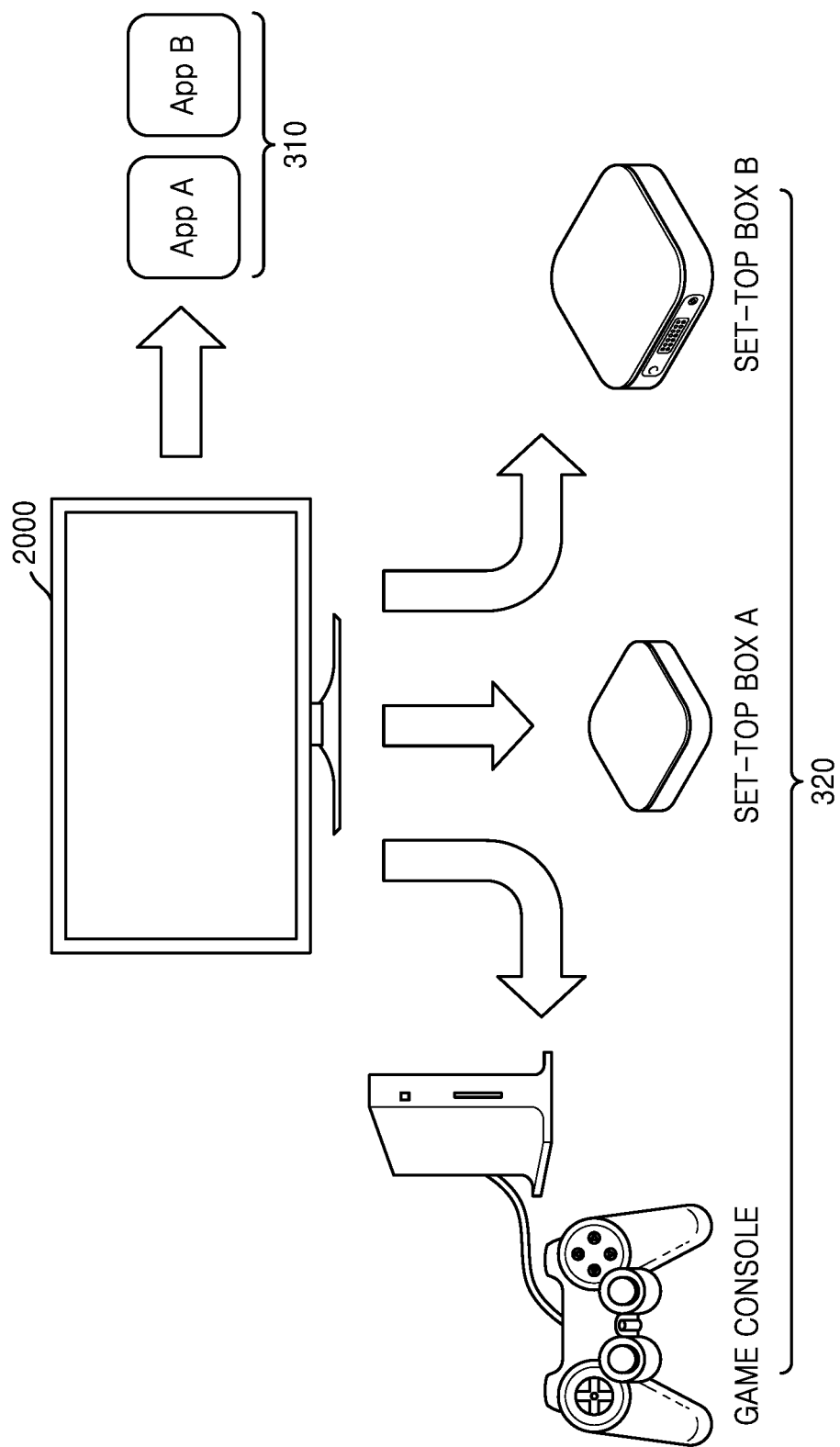
FIG. 3A is a diagram for describing applications and sources related to control by an electronic device, according to an embodiment of the disclosure.

FIG. 3A is a diagram for describing applications and sources related to control by an electronic device, according to an embodiment of the disclosure.

The electronic device 2000 according to an embodiment of the disclosure may obtain a user input for control of the electronic device 2000 (e.g., control of a screen) from a user, and execute a control command corresponding to the user input.

In an embodiment of the disclosure, third-party applications 310 may be executed by the electronic device 2000. Each of the third-party applications 310 is an application developed by a third-party company to provide a particular function and/or service by using an API provided by the OS of the electronic device 2000. Third-party applications are distinguished from manufacturer applications, system applications, and the like, which are executable and controllable by the OS of the electronic device 2000. The third-party applications 310 executed by the electronic device 2000 may include, for example, an over-the-top (OTT) media service application, a video application, a game application, and the like, but are not limited thereto.

In an embodiment of the disclosure, external sources 320 may be connected to the electronic device 2000 to be used. The external sources 320 are devices that are connected to the electronic device 2000 in a wired and/or wireless manner to provide content to the electronic device 2000. That is, the external sources 320 connected to the electronic device 2000 provide the electronic device 2000 with content/media/applications, etc. The external sources 320 may include, for example, a game console, a set-top box, a desktop PC, a laptop PC, and the like, but are not limited thereto.

According to an embodiment of the disclosure, the electronic device 2000 may control an arbitrary application and/or device. First, an example in which the user of the electronic device 2000 controls an arbitrary application and/or device in a typical manner will be described with reference to FIG. 3B, and then operations, performed by the electronic device 2000 of the disclosure, of controlling an arbitrary application and/or device will be described with reference to the subsequent drawings.

Figure 3B:
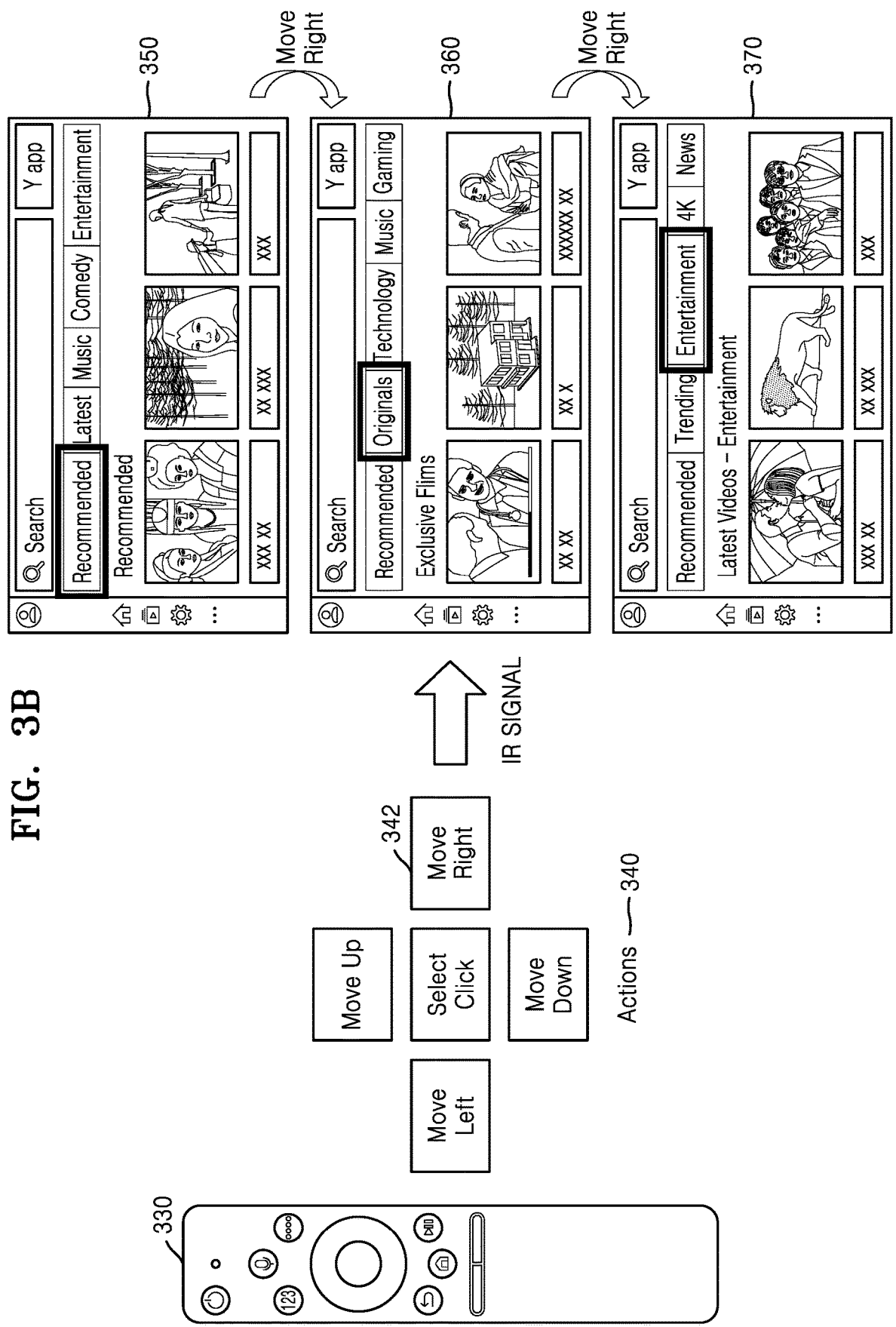
FIG. 3B is a diagram for describing an operation, performed by a user of an electronic device, of manipulating the electronic device in a typical manner to control an application and sources illustrated in FIG. 3A, according to an embodiment of the disclosure.

FIG. 3B is a diagram for describing an operation, performed by a user of an electronic device, of manipulating the electronic device in a typical manner to control the application and sources described above with reference to FIG. 3A, according to an embodiment of the disclosure.

When a third-party application is executed by the electronic device 2000, or an external source is connected to and then used by the electronic device 2000, because the third-party application or the external source is unexecutable and uncontrollable by the OS of the electronic device 2000, the electronic device 2000 needs to be directly/indirectly manipulated by the user. For example, a user command may not be automatically executed by the electronic device 2000 based on an abstract command of the user (e.g., 'Search for video A and play it'). For example, the user may use a remote controller 330 to manipulate the electronic device 2000. The remote controller 330 may include a plurality of buttons for manipulating the electronic device 2000, and the plurality of buttons may correspond to control actions 340, respectively.

In an example, the user may navigate a screen of the electronic device 2000 by using the remote controller 330. Hereinafter, an example in which a video application is running on the electronic device 2000 and the user intends to change a video category tab will be described. When the current screen of the electronic device 2000 is a first screen 350 in which a first video category is selected, the user may select a move-right action 342 from among the control actions 340 in order to view a video list in a second video category. The remote controller 330 may transmit, to the electronic device 2000, an infrared (IR) signal corresponding to the move-right action 342 such that the electronic device 2000 displays a second screen 360 in which the second video category is selected. In the same manner, when the move-right action 342 is selected from among the control actions 340 again, a third screen 370 may be displayed on the electronic device 2000.

The user's manipulation of the electronic device 2000 to navigate the screen of the electronic device 2000 as described above with reference to FIG. 3B may be referred to as human navigation. Hereinafter, operations, performed by the electronic device 2000 of the disclosure, of performing screen navigation by itself in order to control an arbitrary application and/or device will be described with reference to the drawings.

Figure 4:
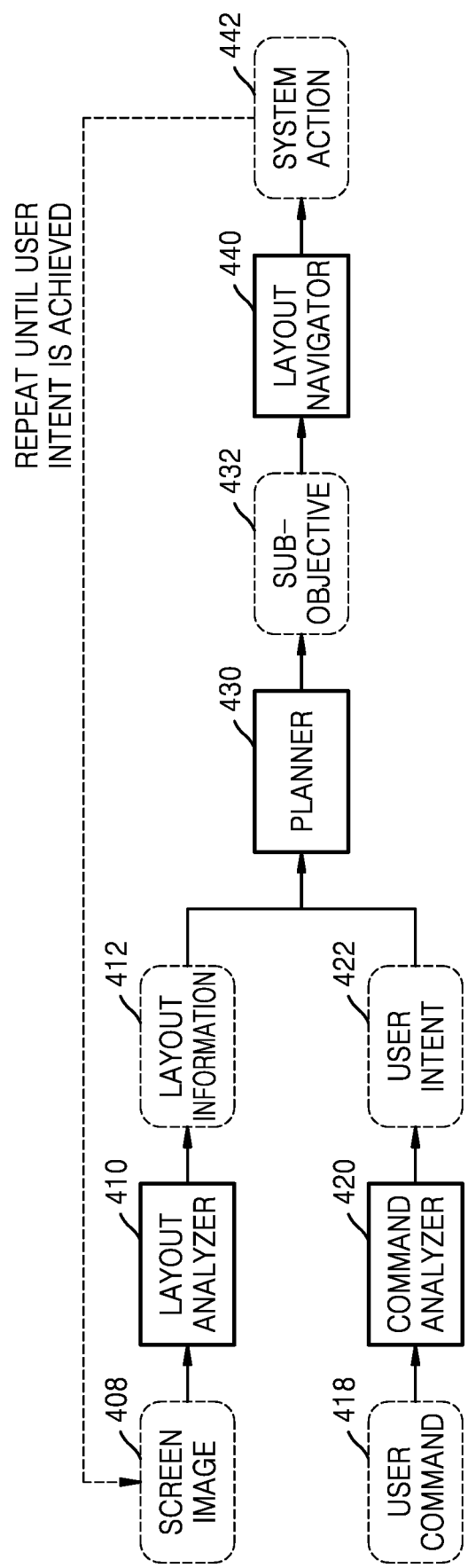
FIG. 4 is a diagram illustrating detailed operations included in a control operation of an electronic device according to an embodiment of the disclosure.

FIG. 4 is a diagram illustrating detailed operations included in a control operation of an electronic device according to an embodiment of the disclosure.

In an embodiment of the disclosure, the electronic device 2000 may perform a control operation (e.g., a screen control operation) of the electronic device 2000 by using various software modules. For example, the electronic device 2000 may perform a screen control operation by using a layout analyzer 410, a command analyzer 420, a planner 430, and a layout navigator 440. However, the above-described software modules are only exemplarily distinguished from each other in order to describe the functions of the respective modules, and are not limited thereto.

The electronic device 2000 may obtain layout information 412 by using the layout analyzer 410. The layout analyzer 410 receives a screen image 408 of the electronic device 2000 and outputs the layout information 412. The layout information 412 may include, for example, the positions of UI elements in the screen, the sizes of the UI elements, the function of an icon (e.g., information obtained by performing character recognition), the content of a text (e.g., information obtained by performing character recognition), and the like. The layout analyzer 410 will be further described with reference to FIG. 6.

The electronic device 2000 may determine a user intent 422 by using the command analyzer 420. The command analyzer 420 receives a user command 418 and outputs the user intent 422. A user intent includes information indicating a function and/or operation that a user input is to perform via the electronic device 2000. The electronic device 2000 may allow the user intent 422 to be achieved by executing a control command. The command analyzer 420 will be further described with reference to FIG. 5.

The electronic device 2000 may determine a sub-goal 432 by using the planner 430. The planner 430 determines the sub-goal 432 based on the layout information 412 and the user intent 422. The electronic device 2000 may determine a task corresponding to the sub-goal 432. One sub-goal may be achieved by performing one task, and when all (one or more) sub-goals are achieved by performing all (one or more) tasks, it may be considered that the control command is executed and thus the user intent is achieved. The planner 430 will be further described with reference to FIG. 7.

The electronic device 2000 may navigate the screen of the electronic device 2000 by using the layout navigator 440. Based on the sub-goal 432, the layout navigator 440 performs the task corresponding to the sub-goal 432. The task may include one or more system actions 442. The layout navigator 440 will be further described with reference to FIG. 8.

In an embodiment of the disclosure, a plurality of sub-goals 432 may be provided. For example, the sub-goals 432 may include a first sub-goal, a second sub-goal, etc. When a first task is performed and thus the first sub-goal is achieved, the electronic device 2000 may again perform layout analysis. In some embodiments of the disclosure, when the first task is performed, the screen of the application running on the electronic device 2000 may be switched. The electronic device 2000 may analyze the switched screen to identify UI elements therein, and thus obtain second layout information. The electronic device 2000 may determine the second sub-goal based on the second layout information and the user intent 422. The electronic device 2000 may determine a second task corresponding to the second sub-goal, and perform the second task. The electronic device 2000 may repeat layout analysis and sub-goal planning until the user intent is achieved. When it is determined that all of the sub-goals are achieved, thus the control command is finally executed, and the user intent is achieved, the electronic device 2000 may terminate the operation.

The screen navigation operation performed by the electronic device 2000 according to an embodiment of the disclosure may include a feedback loop that repeats screen analysis until a user intent is achieved. The electronic device 2000 may update analysis information on the changing screen by continuously performing layout analysis, while performing at least one task for executing a control command. The electronic device 2000 may determine whether a sub-goal is achieved, and then dynamically determine a next sub-goal according to a result of the determining. The electronic device 2000 according to an embodiment of the disclosure may update a sub-goal sequence by changing a sub-goal according to a layout analysis result. For example, the electronic device 2000 may determine the second sub-goal again based on whether the first sub-goal is achieved.

Figure 5:
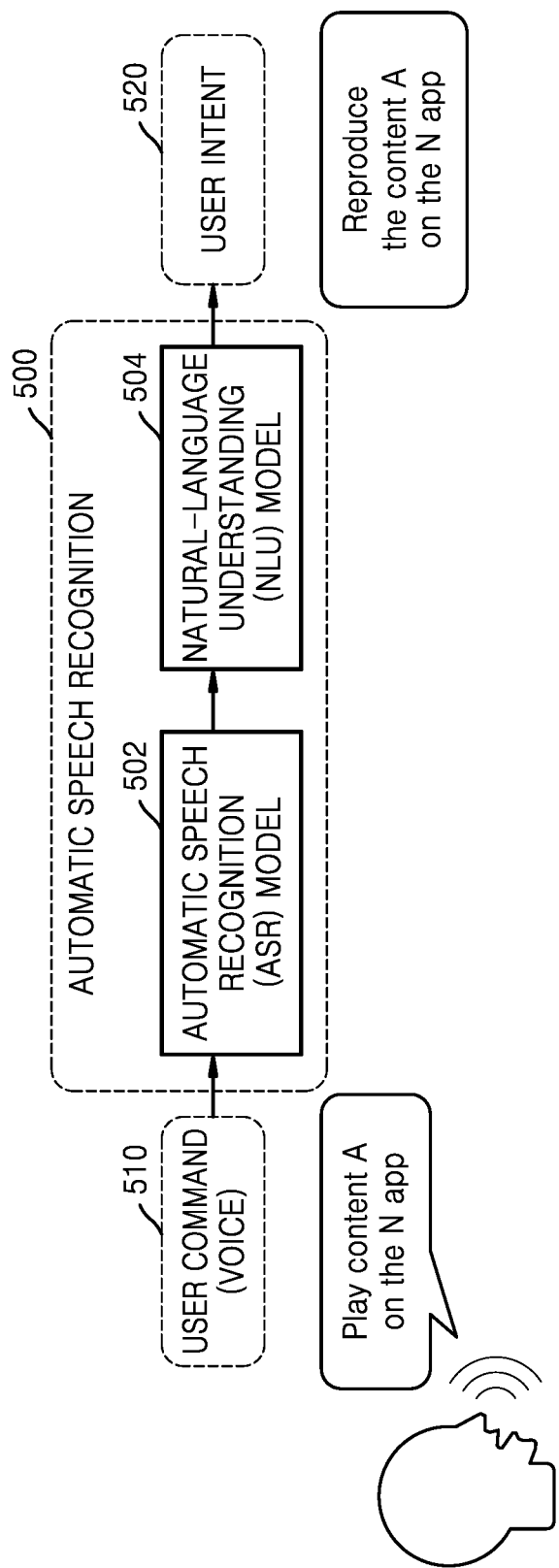
FIG. 5 is a diagram for describing an operation, performed by an electronic device, of determining a user intent based on a user input, according to an embodiment of the disclosure.

FIG. 5 is a diagram for describing an operation, performed by an electronic device, of determining a user intent based on a user input, according to an embodiment of the disclosure.

In an embodiment of the disclosure, user inputs may include, but are not limited to, voice signal inputs, text inputs, gesture inputs, and touch inputs on a duplicate screen on a second device. For convenience of description, an example will be described with reference to FIG. 5 in which a user input is a voice signal input.

Referring to FIG. 5, the electronic device 2000 according to an embodiment of the disclosure may analyze a user command 510 by using a command analyzer 500, and determine a user intent 520.

The electronic device 2000 may receive, from the user, a voice signal indicating a command for an operation that the user intends to perform. For example, the user command 510 may be "Play content A on the N app". When the user input is a voice signal input, the command analyzer 500 may include an ASR model 502 and an NLU model 504.

The electronic device 2000 may convert the voice signal received from the user into a text by using the ASR model 502. The ASR model 502 may include, but is not limited to, an acoustic model (AM) or a language model (LM). In some embodiments of the disclosure, when the electronic device 2000 obtains a text input, the operation of the ASR model 502 may be omitted.

The electronic device 2000 may apply the obtained text to the NLU model 504 to parse the text and identify an intent indicating the utterance intention of the received voice signal and entities indicating components of an uttered sentence. For example, the user intent 520 determined by the command analyzer 500 may be 'Reproduce the content A on the N app', and the entities that are the components of the sentence may include 'N app', 'content A', 'play', etc. The NLU model 504 may be implemented as, for example, a transformer model, but is not limited thereto.

The electronic device 2000 according to an embodiment of the disclosure may obtain the user command 510, and determine the user intent 520 to control the electronic device 2000, by using the command analyzer 500. The electronic device 2000 may determine a control command corresponding to the user intent 520. According to the above-described example, the electronic device 2000 may determine that the control command corresponding to the user intent 520 is 'Reproduce the content A'.

In an embodiment of the disclosure, the electronic device 2000 may determine at least one task for executing the control command. For example, the electronic device 2000 may determine that a task 'Select the content A' is required to execute the control command 'Reproduce the content A'. Operations, performed by the electronic device 2000, of utilizing the user intent 520 for control (e.g., screen control) of the electronic device 2000 will be described below.

Meanwhile, in some embodiments of the disclosure, when the user input is an input other than a voice signal input (e.g., a gesture input, a touch input on a duplicate screen on a second device), the command analyzer 500 may include a data/signal processing module corresponding to the type of the user input.

Figure 6:
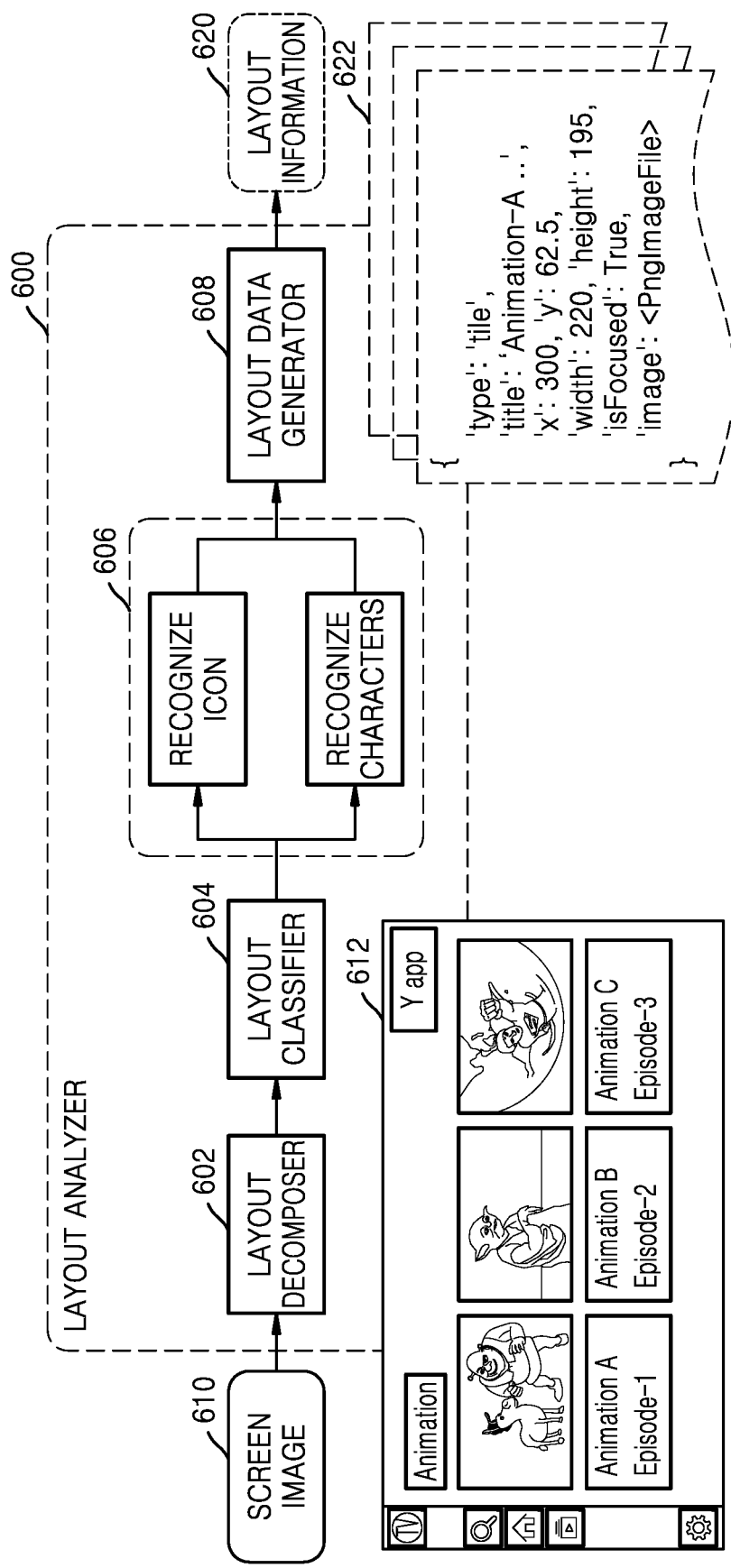
FIG. 6 is a diagram for describing an operation, performed by an electronic device, of obtaining layout information by analyzing a screen being displayed, according to an embodiment of the disclosure.

FIG. 6 is a diagram for describing an operation, performed by an electronic device, of obtaining layout information by analyzing a screen being displayed, according to an embodiment of the disclosure.

For convenience of description, the example described above with reference to FIG. 5 in which the user intends to 'Reproduce the content A on the N app' will be also provided for describing FIG. 6.

Referring to FIG. 6, in an embodiment of the disclosure, when an API of an application running on the electronic device 2000 is unobtainable, the electronic device 2000 is unable to discover the function to which each UI element in an execution screen of the application corresponds. The electronic device 2000 may analyze a screen image 610 by using a layout analyzer 600 and generate layout information by identifying functions of UI elements.

In an embodiment of the disclosure, when an application is executed by the electronic device 2000, elements of a UI in an application screen 612 may be identified. The UI element may cause, when selected by the user, a particular function to be performed, and may include at least one of an icon, an image, a text, or a button.

The electronic device 2000 may obtain the screen image 610 being displayed on the electronic device 2000. The screen image 610 may include the application screen 612 currently executed by the electronic device 2000, or a screen being display by an external source connected to the electronic device 2000.

The electronic device 2000 may analyze a screen layout by using the layout analyzer 600. A screen layout includes the arrangement of UI elements in a screen.

In an embodiment of the disclosure, the electronic device 2000 may identify the overall configuration of a layout by using a layout decomposer 602. The layout decomposer 602 may include an artificial intelligence model for detecting UI elements, and may detect one or more UI elements present in a layout. For example, the electronic device 2000 may identify the sizes, positions, and the like of the UI elements in the application screen 612 by using the layout decomposer 602.

In an embodiment of the disclosure, the electronic device 2000 may classify each of the detected UI elements by using a layout classifier 604. The layout classifier 604 may include an artificial intelligence model (e.g., a vision transformer model, etc.) for classifying UI elements. For example, the layout classifier 604 may classify the detected UI elements into icons, images, texts, or buttons.

In an embodiment of the disclosure, the electronic device 2000 may recognize details of UI elements by using a UI element recognizer 606. The UI element recognizer 606 may include an artificial intelligence model for recognizing a text and/or image. For example, the UI element recognizer 606 may recognize the meaning of a UI element classified as an icon, or the content of a UI element classified as a text.

In an embodiment of the disclosure, the electronic device 2000 may generate layout information 620 by using a layout data generator 608. The layout data generator 608 may generate the layout information 620 including, for example, the positions of UI elements in the screen, the sizes of the UI elements, the function of an icon (e.g., icon recognition), the content of a text (e.g., character recognition), and the like. As illustrated in an example 622 of FIG. 6, layout information may include the type, title, coordinates, size of a UI element, whether the UI element is currently focused, an image in the layout, and the like.

In an embodiment of the disclosure, the electronic device 2000 may determine at least one task for executing the control command. For example, the electronic device 2000 may determine that a task 'Select the content A' is required to execute the control command 'Reproduce the content A'. In order to perform respective tasks for executing the control command, the electronic device 2000 may identify UI elements from the current screen, and utilize the layout information 620 generated by analyzing and processing the identified UI elements. This will be described below.

Meanwhile, in some embodiments of the disclosure, the electronic device 2000 may identify whether the control command that the user intends to execute corresponds to a function that is callable by the OS of the electronic device 2000.

Based on whether the control command corresponds to a callable function, the electronic device 2000 may determine whether to analyze the application screen 612 by using the layout analyzer 600. For example, when the control command is a function that is callable by the OS of the electronic device 2000 (e.g., 'Raise the volume'), the electronic device 2000 may increase the sound volume of the electronic device 2000 by causing the OS to directly call a volume-up function, without performing screen analysis. For example, when the control command corresponds to a function of a third-party application and thus is a function that is uncallable by the OS of the electronic device 2000 (e.g., 'Reproduce content A' wherein the content A is provided by a third-party application 'N'), the electronic device 2000 may use the layout analyzer 600 to identify the UI elements in the application screen 612. By performing layout analysis, the electronic device 2000 may identify UI elements in a layout and obtain information about functions corresponding to the respective UI element.

In some embodiments of the disclosure, the layout analyzer 600 may include a scene relational graph generation module. The scene relational graph generation module may include a scene graph generation model, which is an artificial intelligence model configured to receive the screen image 610 to generate a scene graph. A scene graph may be a data structure that includes one or more nodes and one or more edges. Each node corresponds to a scene, and each edge represents a connection relationship between scenes. For example, a node of a graph may represent the application screen 612, and an edge of the graph may represent a connection relationship between the application screen 612 and another screen, which is switched therefrom when a UI element in the current application screen 612 is selected. An edge of a scene graph generated by the scene graph generation model may include an inferred probability of a next scene connected to the current scene.

In an embodiment of the disclosure, the electronic device 2000 may train the scene graph generation model. The electronic device 2000 may obtain a training data set for training the scene graph generation model. The training data set may include a plurality of scene images, UI elements in each scene image, which are labeled with relationships between scenes to be switched to and from each other when each UI element is selected, etc. The electronic device 2000 according to an embodiment of the disclosure may train the scene graph generation model, and then generate a scene graph related to the current application screen 612 of the electronic device 2000 by applying the screen image 610 to the scene graph generation model. In an embodiment of the disclosure, when the electronic device 2000 uses the scene graph generation model, the generated scene graph may be included in the layout information 620.

Figure 7:
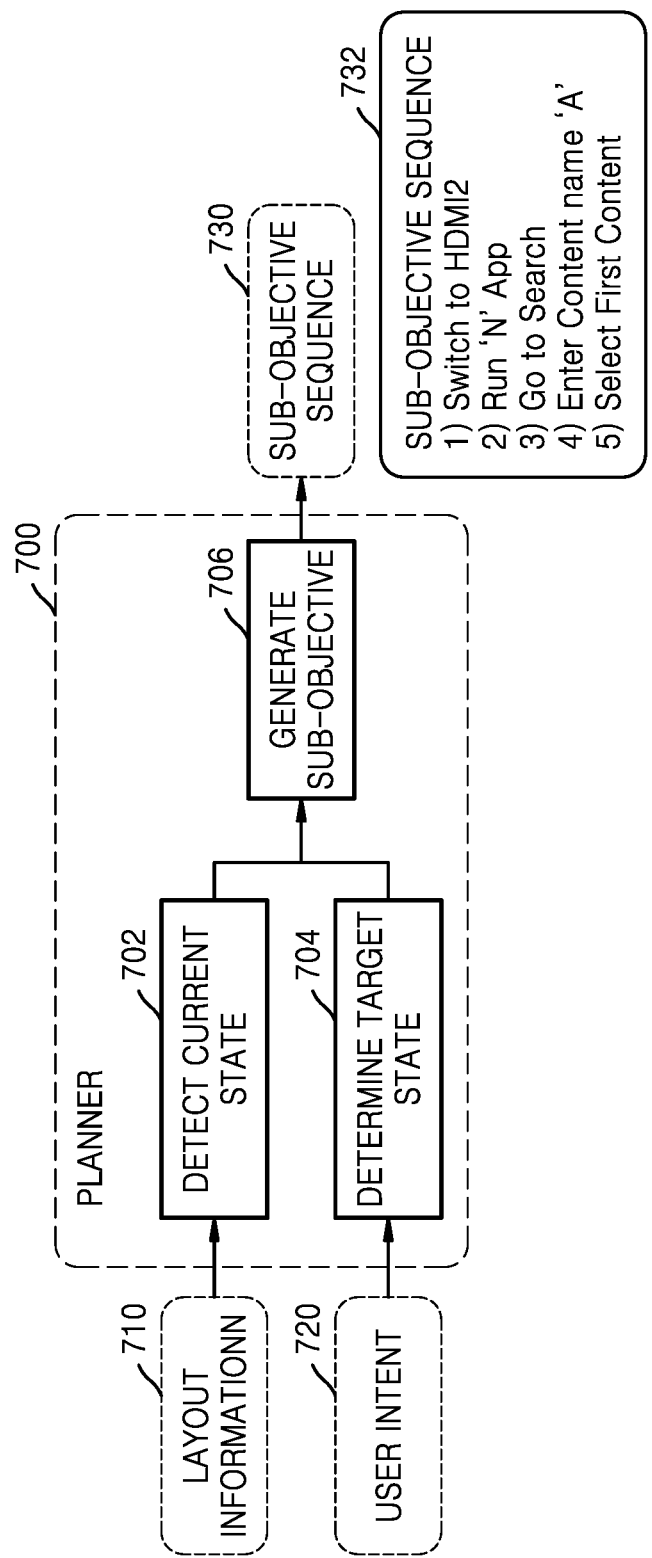
FIG. 7 is a diagram for describing an operation, performed by an electronic device, of determining at least one sub-goal for executing a control command determined based on a user input, according to an embodiment of the disclosure.

FIG. 7 is a diagram for describing an operation, performed by an electronic device, of determining at least one sub-goal for executing a control command determined based on a user input, according to an embodiment of the disclosure.

For convenience of description, the example described above with reference to FIGS. 5 and 6 in which the user intends to 'Reproduce the content A on the N app' will be also provided for describing FIG. 7.

Referring to FIG. 7, the electronic device 2000 according to an embodiment of the disclosure may determine a sub-goal 706 for executing a control command corresponding to a user intent 720, by using a planner 700. The electronic device 2000 may determine a current state 702 of the electronic device 2000 and a target state 704, which indicates a state in which the control command is executed, and generate the sub-goal 706 for reaching the target state 704.

In an embodiment of the disclosure, the electronic device 2000 may detect the current state 702 of the electronic device 2000 based on layout information 710. For example, the electronic device 2000 may detect the current state 702 of the electronic device 2000 based on elements of an interface included in the layout information 710. For example, the electronic device 2000 may detect a state in which the current screen is displaying a home screen, or a state in which a particular category tap is selected in a video application.

In an embodiment of the disclosure, based on the user intent 720, the electronic device 2000 may determine a control command corresponding to the user intent 720. The electronic device 2000 may determine the target state 704 of the electronic device 2000 based on the user intent 720 and/or the control command. In detail, when the control command determined based on the user intent 720 is 'Reproduce the content A', the electronic device 2000 may determine that the target state 704 is a state in which the content A is being reproduced.

In an embodiment of the disclosure, based on the current state 702 and the target state 704, the electronic device 2000 may generate the sub-goal 706 for the electronic device 2000 to reach the target state 704. For example, when it is determined, by analyzing the layout information 710, that a UI element indicating the content A is present on the screen of the electronic device 2000, the electronic device 2000 may determine that the sub-goal 706 is 'Select the content A', because the content A is immediately selectable the current state 702.

In an embodiment of the disclosure, the electronic device 2000 may generate a sub-goal sequence 730 by generating a plurality of sub-goals 706. For example, when it is determined, by analyzing the layout information 710, that the electronic device 2000 is currently displaying the home screen, the electronic device 2000 may generate the plurality of sub-goals 706 for reaching, from the current state 702 in which the home screen is displayed, the target state 704 in which the content A is being reproduced. The example 732 of a sub-goal sequence may include 'Switch to HDMI 2' (a first sub-goal), 'Run N App' (a second sub-goal), 'Go to Search' (a third sub-goal), 'Enter Content name A' (a fourth sub-goal), and 'Selection first content' (a fifth sub-goal). Each sub-goal 706 706 may include information or (x, y) coordinates of a particular item/button to be clicked. In an embodiment of the disclosure, when a plurality of sub-goals 706 are required, the electronic device 2000 may sequentially achieve the sub-goals 706 until the control command corresponding to the user intent is executed.

The electronic device 2000 according to an embodiment of the disclosure may use a scene graph generated by the layout analyzer 600 illustrated FIG. 6 for generating the sub-goals 706. The scene graph may be included in the layout information 710. Based on the current state 702, the target state 704, and nodes and edges included in the scene graph, the electronic device 2000 may generate the sub-goal sequence 730 for reaching the target state 704.

In some embodiments of the disclosure, the planner 700 may be implemented by using an artificial intelligence planning algorithm. Examples of the artificial intelligence planning algorithm may include, but are not limited to, A*(A star), plan-space planning (PSP), partial-order planning (PoP), simple task network (STN), hierarchical task network (HTN), etc.

In some embodiments of the disclosure, the planner 700 may be implemented by using a hierarchical reinforcement learning algorithm. For example, the planner 700 may plan tasks to be performed to achieve a user intent, in a hierarchical structure. For example, the hierarchical structure may include the target state 704 at a high level, the sub-goal 706 (or the sub-goal sequence 730 that is a set of the sub-goals 706) at a middle level, and system actions at a low level. The electronic device 2000 may train a reinforcement learning agent of the planner 700 to determine system actions for achieving the respective sub-goals 706. In training of the agent based on reinforcement learning, the agent may obtain a reward by performing a system action for achieving the sub-goal 706 in the current state. The electronic device 2000 may train the agent such that the total rewards obtained until the sub-goal 706 is achieved is at a maximum.

Figure 8:
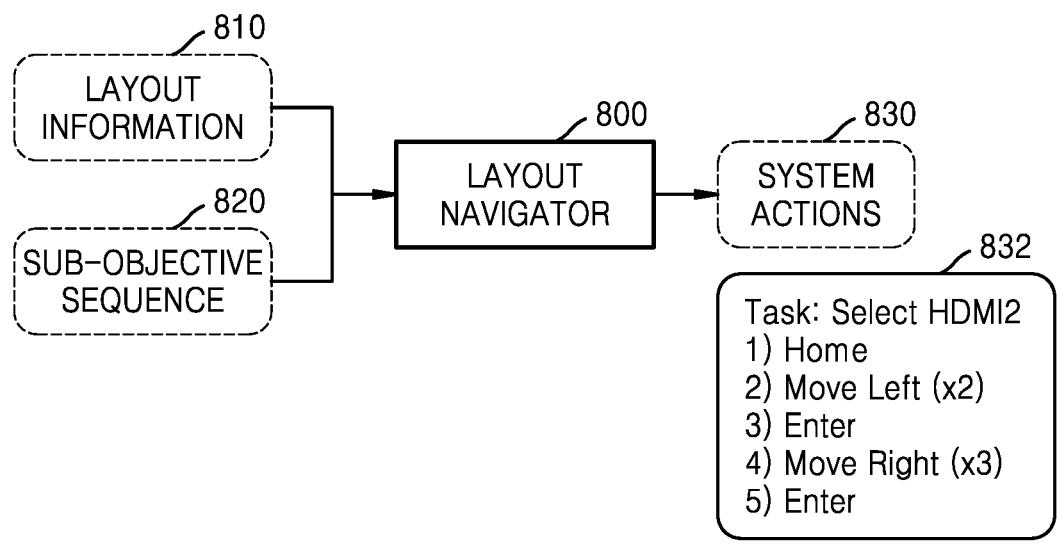
FIG. 8 is a diagram for describing an operation, performed by an electronic device, of determining at least one task for executing a control command, according to an embodiment of the disclosure.

FIG. 8 is a diagram for describing an operation, performed by an electronic device, of determining at least one task for executing a control command, according to an embodiment of the disclosure.

For convenience of description, the example described above with reference to FIGS. 5 to 7 in which the user intends to 'Reproduce the content A on the N app' will be also provided for describing FIG. 8.

Referring to FIG. 8, the electronic device 2000 according to an embodiment of the disclosure may determine a task corresponding to a sub-goal by using a layout navigator 800. A task is a set of system actions (e.g., a cursor movement, a click, etc.), which are units for executing a particular function in the electronic device 2000. The electronic device 2000 achieves a sub-goal by performing a task corresponding to the sub-goal. The task for achieving the sub-goal includes system actions 830 including cursor movements, clicks, etc.

In an embodiment of the disclosure, the electronic device 2000 may determine a task corresponding to a sub-goal based on layout information 810 and a sub-goal sequence 820.

In some embodiments of the disclosure, when the layout analyzer 600 illustrated in FIG. 6 is model-free, the layout information 810 may include information related to UI elements. The electronic device 2000 may determine the task corresponding to the sub-goal based on UI elements included in the layout information 810 and the sub-goal (e.g., a UI element to be clicked and the position thereof, etc.).

In some embodiments of the disclosure, when the layout analyzer 600 illustrated in FIG. 6 is model-based, the layout information 810 may further include a scene graph in addition to the information related to the UI elements. The electronic device 2000 may determine the task corresponding to a sub-goal based on a connection relationship between scenes of a scene graph (e.g., a current scene and a scene corresponding to a target state) included in the layout information 810, current positions (e.g., the position of the current scene, the current position of a cursor, etc.), and the sub-goal (e.g., a UI element to be clicked and the position thereof, etc.).

For example, when the first sub-goal among the sub-goals included in the sub-goal sequence 820 is 'Switch to HDMI 2', the electronic device 2000 may determine that a task to be performed for achieving the sub-goal is 'Select HDMI 2'.

The electronic device 2000 may determine the system actions 830 for performing the determined task 'Select HDMI 2', based on the layout information 810. Referring to an example 832 of system actions, the system actions 830 included in the task 'Select HDMI 2' may include 'Home' (a first system action), 'Move Left*2') (a second system action), 'Enter' (a third system action), 'Move Right*3' (a fourth system action), and 'Enter' (a fifth system action). The electronic device 2000 may navigate a screen and/or an application by performing the first system action to the fifth system action described above by using the layout navigator 800. When all of the system actions are performed by the layout navigator 800, the task 'Select HDMI 2' is executed, and a source connection configuration of the electronic device 2000 is changed to 'HDMI 2'.

Figure 9A:
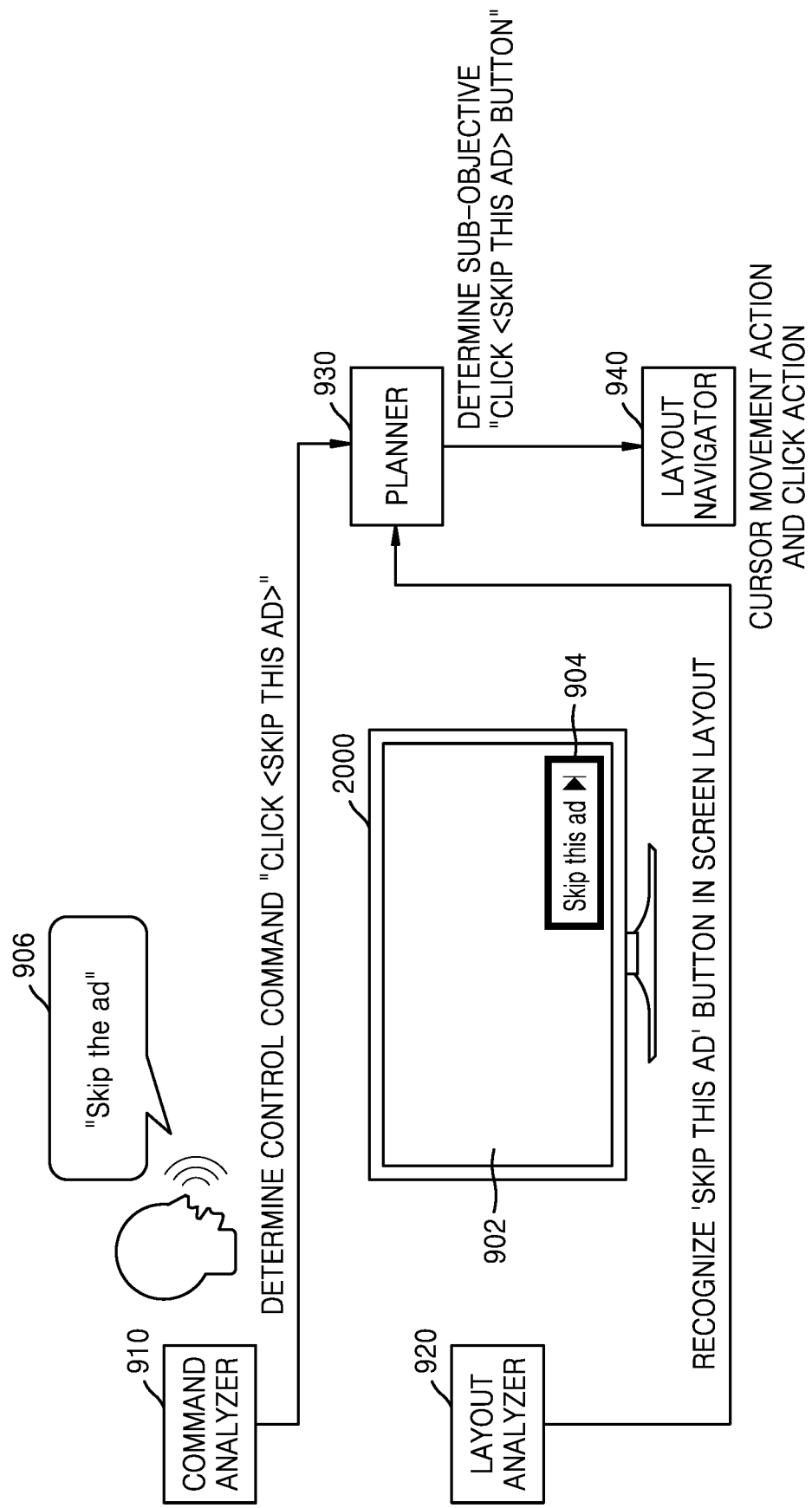
FIG. 9A is a diagram for describing an operation, performed by an electronic device, of performing a task for screen control, according to an embodiment of the disclosure.

FIG. 9A is a diagram for describing an operation, performed by an electronic device, of performing a task for screen control, according to an embodiment of the disclosure.

In an embodiment of the disclosure, the electronic device 2000 may receive a voice signal input from the user. The user inputs a voice 906 for controlling a screen 902 of the electronic device 2000. For example, the electronic device 2000 may receive a voice signal input "Skip the ad" from the user.

The electronic device 2000 may determine a user intent for controlling the electronic device 2000 based on the user input. The electronic device 2000 may determine the user intent determining an operation to be performed by using a command analyzer 910, and determine a control command of the electronic device 2000 corresponding to the user intent. For example, the determined control command may be 'Click 'Skip this ad''.

The electronic device 2000 may identify UI elements displayed on the screen 902. The electronic device 2000 may obtain an image of the screen 902 of the electronic device 2000 and analyze the obtained image, by using a layout analyzer 920. For example, the electronic device 2000 may detect the UI elements displayed on the screen 902, and identify the sizes, positions, and the like of the UI elements on the screen 902. The electronic device 2000 may classify the detected UI elements into icons, images, texts, or buttons. Furthermore, the electronic device 2000 may recognize the functions of the UI elements classified as icons/buttons, the content of the UI elements classified as texts, etc. For example, the electronic device 2000 may identify a 'Skip this ad' button 904 on the screen 902.

The electronic device 2000 may determine at least one sub-goal for executing the control command based on the user intent and the UI elements. The electronic device 2000 may determine a sub-goal for executing the control command, based on the user intent, the control command corresponding to the user intent, and the UI elements on the screen 902 and by using a planner 930. For example, when the control command determined according to the above-described example is 'Click 'Skip this ad'', the control command may be executed by clicking the 'Skip this ad' button 904 on the current screen 902, and thus the electronic device 2000 may determine that a sub-goal for executing the control command is 'Click 'Skip this ad' button'.

The electronic device 2000 may execute the control command by performing a determined task to achieve the sub-goal. The electronic device 2000 may determine a task for achieving the sub-goal, by using a layout navigator 940. The task may include a plurality of system actions. The electronic device 2000 may determine system actions for performing a task, and perform the system actions. For example, based on the current position of a cursor, the electronic device 2000 may perform system actions including moving the cursor onto the 'Skip this ad' button 904 and clicking the 'Skip this ad' button 904.

When the control command determined based on the user input is executed, the electronic device 2000 according to an embodiment of the disclosure may provide a function corresponding to the control command to the user, and wait for a next input of the user. When the next user input is received, the electronic device 2000 may repeat the above-described operations based on the user input.

Figure 9B:
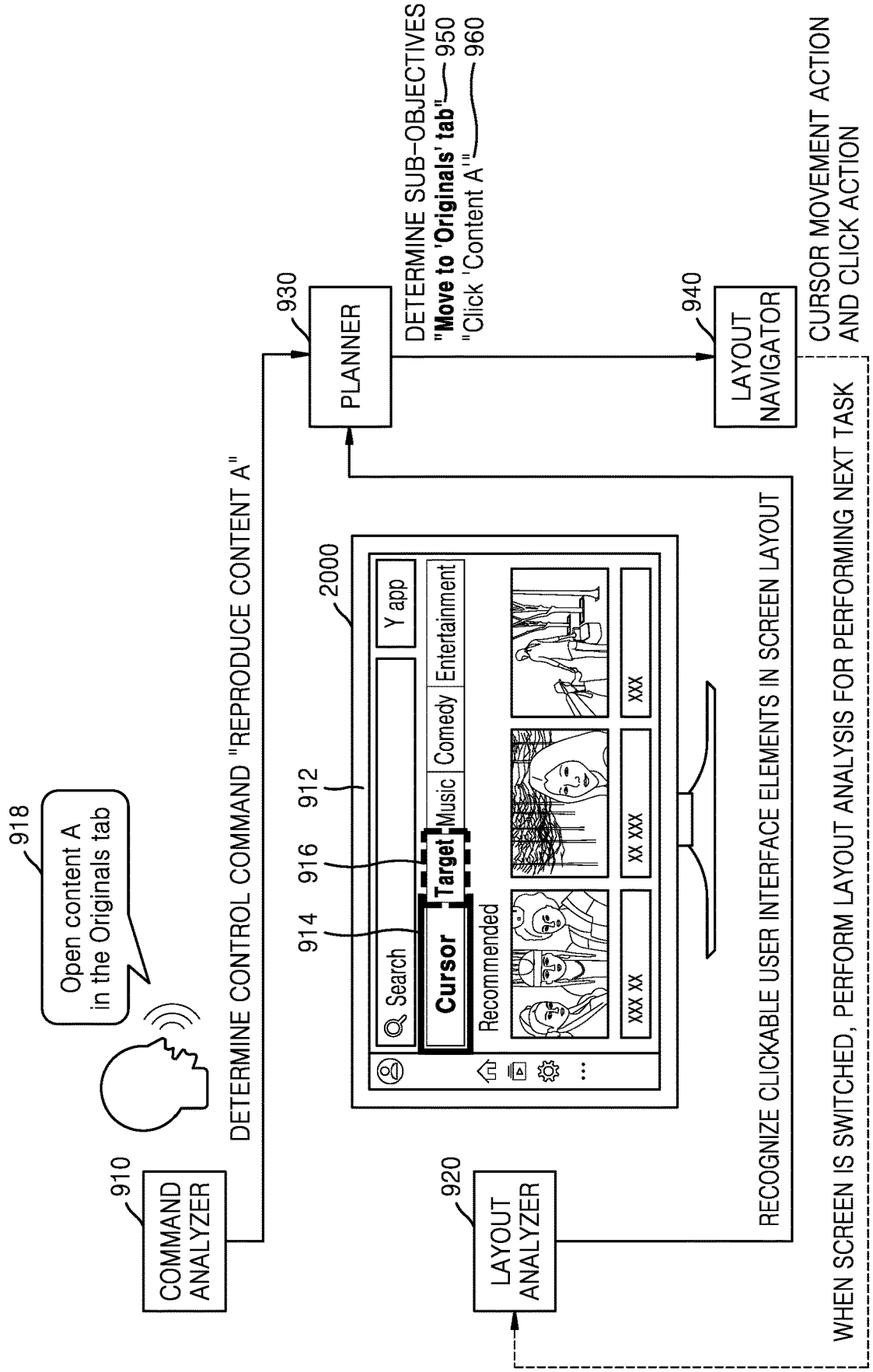
FIG. 9B is a diagram for describing an operation, performed by an electronic device, of performing a plurality of tasks for screen control, according to an embodiment of the disclosure.

FIG. 9B is a diagram for describing an operation, performed by an electronic device, of performing a plurality of tasks for screen control, according to an embodiment of the disclosure.

In an embodiment of the disclosure, the electronic device 2000 may receive a voice signal input from the user. The user inputs a voice 918 for controlling a screen 912 of the electronic device 2000. For example, the electronic device 2000 may receive a voice signal input "Open content A in the Originals tab" from the user.

The electronic device 2000 may determine the user intent by using the command analyzer 910, and determine a control command of the electronic device 2000 corresponding to the user intent. For example, the determined control command may be 'Reproduce the content A'.

The electronic device 2000 may obtain an image of the screen 912 of the electronic device 2000 and analyze the obtained image, by using the layout analyzer 920. This has been described above, and thus the description thereof will be omitted.

The electronic device 2000 may determine at least one sub-goal for executing the control command, based on the user intent, the control command corresponding to the user intent, and the UI elements on the screen 912 and by using the planner 930. For example, when the control command determined according to the above-described example is 'Reproduce the content A', no UI element indicating the content A is display on the current screen 912, and thus it is unable to reproduce the content A by performing a single action. In this case, in order to execute the control command, the electronic device 2000 may determine at least one sub-goal for performing the task in stages.

In an embodiment of the disclosure, the electronic device 2000 may use the current state and a target state of the electronic device 2000 for determining a sub-goal. The electronic device 2000 may detect the current state of the electronic device 2000 based on the UI elements in the screen 912. For example, the electronic device 2000 may detect that a 'Recommended' tab 914 is currently selected from among the UI elements in the screen 912, and an 'Originals' tab 916 is at the right of the 'Recommended' tab 914. The electronic device 2000 may determine the target state of the electronic device 2000 in which the control command is executed, based on at least one of the user intent or the determined control command. For example, the electronic device 2000 may determine that the target state is a state in which the control command 'Reproduce the content A' has been executed.

The electronic device 2000 may determine sub-goals for reaching the target state from the current state. For example, the electronic device 2000 may determine that a first sub-goal 950 is 'Move to the 'Originals' tab' and a second sub-goal 960 is 'Click content A'.

The electronic device 2000 may determine tasks for achieving the respective sub-goals, by using the layout navigator 940. One task may include a plurality of system actions. For example, the electronic device 2000 may determine a cursor movement action and a click action for selecting the 'Originals' tab 916 on the screen 912, and perform the actions to achieve the first sub-goal 950.

When one sub-goal is achieved by the layout navigator 940, the electronic device 2000 according to an embodiment of the disclosure may perform a task for achieving the next sub-goal. For example, when the 'Originals' tab 916 is selected and thus the current screen 912 is switched to another screen, the electronic device 2000 may determine that the first sub-goal 950 is achieved. The electronic device 2000 may perform layout analysis for achieving the second sub-goal 960 by using the layout analyzer 920. Based on a result of the layout analysis, the electronic device 2000 may update a sub-goal sequence by modifying the second sub-goal 960. This will be described in detail with reference to FIGS. 9C and 9D.

Figure 9C:
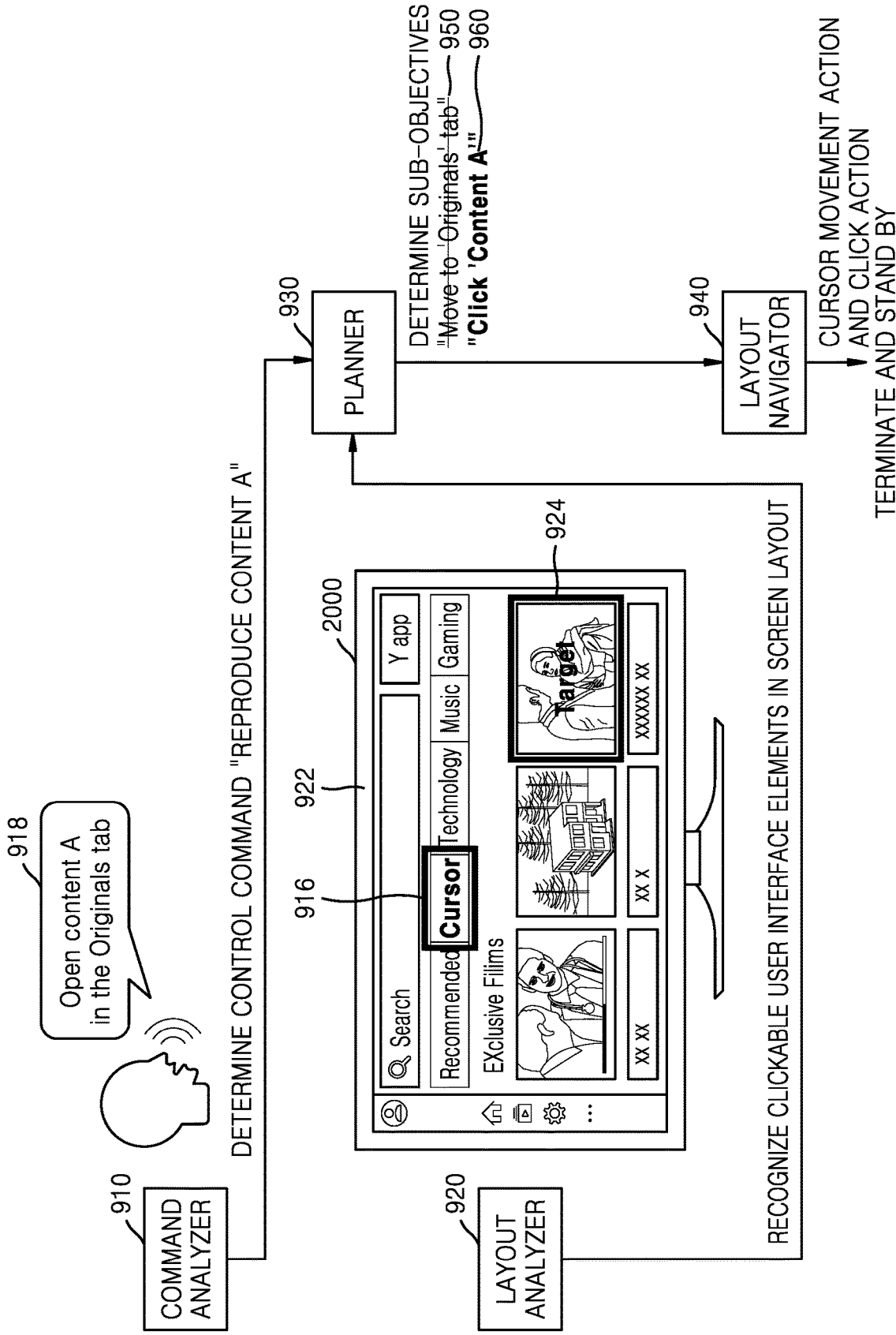
FIG. 9C is a diagram for further describing an operation, performed by an electronic device, of performing a plurality of tasks for screen control, according to an embodiment of the disclosure.

FIG. 9C is a diagram for further describing an operation, performed by an electronic device, of performing a plurality of tasks for screen control, according to an embodiment of the disclosure.

Referring to FIG. 9C, the electronic device 2000 according to an embodiment of the disclosure may determine the second sub-goal 960 based on whether the first sub-goal 950 is achieved.

In an embodiment of the disclosure, while performing an application navigation operation for executing the control command, the electronic device 2000 may perform interim validation on the application navigation operation. For example, when the screen is switched as the task corresponding to the first sub-goal 950 is performed by using the layout navigator 940, the electronic device 2000 may analyze a new screen 922 again by using the layout analyzer 920. (hereinafter, the previous screen 912 illustrated in FIG. 9B is referred to as the first screen 912, and the new screen 922 illustrated in FIG. 9C is referred to as the second screen 922) That is, based on that the screen of the application is switched from the first screen 912 to the second screen 922, the electronic device 2000 may identify whether the first sub-goal is achieved, so as to perform the interim validation on the application navigation operation.

The electronic device 2000 may detect the current state of the electronic device 2000 based on UI elements in the second screen 922. For example, the 'Originals' tab 916 is currently selected from among the UI elements in the second screen 922 by using the layout analyzer 920, and thus the electronic device 2000 may recognize that the first sub-goal 950 is achieved. The electronic device 2000 may dynamically determine the second sub-goal based on whether the first sub-goal is achieved. For example, the first sub-goal 950 has been achieved, and thus the electronic device 2000 may dynamically determine the second sub-goal 960 to be performed subsequent to the first sub-goal 960. In some embodiments of the disclosure, the electronic device 2000 may recognize that an element 924 indicating the content A is present on the second screen 922. The control command (i.e., 'Reproduce the content A') may be executed by clicking the element 924 indicating the content A on the second screen 922 currently being displayed, the electronic device 2000 may determine to change the second sub-goal 960, which was determined for executing the control command, to be 'Click 'Content A''. In some embodiments of the disclosure, in an example different from that illustrated in FIG. 9C, even when the first sub-goal 950 has been achieved, the element 924 indicating the content A may not be present on the second screen 922 and thus may not be identified. In this case, the electronic device 2000 is unable to perform a task for the second sub-goal 960 'Click 'Content A'', and thus may modify the second sub-goal 960. For example, the electronic device 2000 may change the second sub-goal 960 to 'Search for the content A'. When the second sub-goal is changed, sub-goals subsequent to the second sub-goal may be also changed, and thus the sub-goal sequence may be updated. An operation of changing each sub-goal may be performed in the same manner as described above, the description thereof will be omitted.

The electronic device 2000 may determine tasks for achieving the respective sub-goals, by using the layout navigator 940. One task may include a plurality of system actions. For example, the electronic device 2000 may determine a cursor movement action and a click action for selecting the element 924 indicating the content A on the screen 922, and perform the actions to achieve the second sub-goal 960.

Figure 9D:
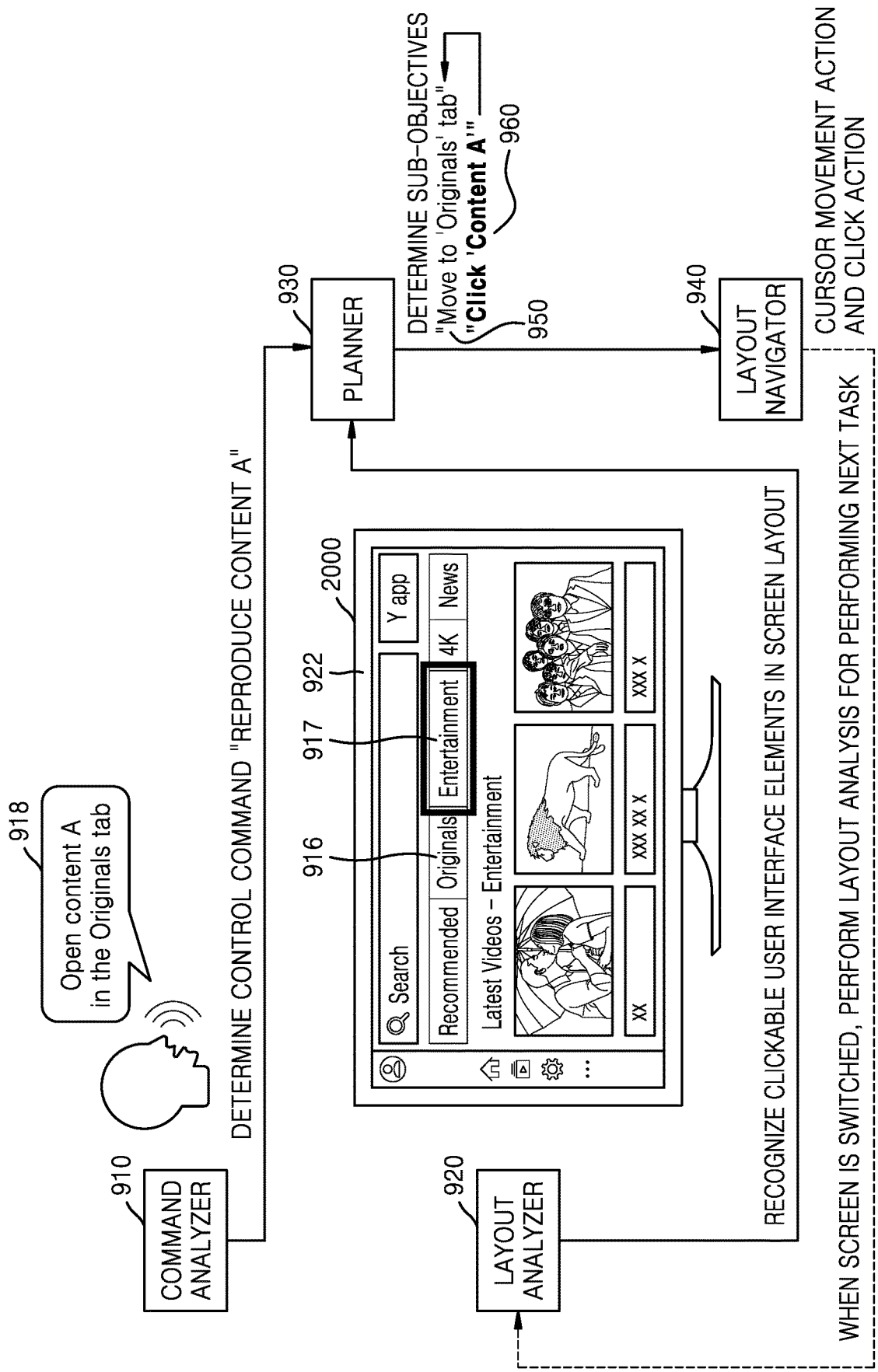
FIG. 9D is a diagram for describing an operation, performed by an electronic device, of updating a previously determined task for screen control, according to an embodiment of the disclosure.

FIG. 9D is a diagram for describing an operation, performed by an electronic device, of updating a previously determined task for screen control, according to an embodiment of the disclosure.

An example in which the task corresponding to the first sub-goal 950 has been performed as illustrated in FIG. 9B will be described with reference to FIG. 9D.

In an embodiment of the disclosure, when the screen is switched as the task corresponding to the first sub-goal 950 is performed by using the layout navigator 940, the electronic device 2000 may analyze the screen 922 to which the screen is switched, again by using the layout analyzer 920. (unlike the example described with reference to FIG. 9C, the second screen 922 illustrated in FIG. 9D is in a state in which the task corresponding to the first sub-goal 950 is erroneously performed and thus an 'Entertainment' tab 917 is selected instead of the 'Originals' tab 916)

The electronic device 2000 may detect the current state of the electronic device 2000 based on UI elements in the second screen 922. For example, the 'Entertainment' tab 917, instead of the 'Originals' tab 916, is currently selected from among the UI elements in the second screen 922 by using the layout analyzer 920, and thus the electronic device 2000 may recognize that the first sub-goal 950 is not achieved.

The electronic device 2000 may determine the second sub-goal based on whether the first sub-goal is achieved. For example, the first sub-goal 950 has not been achieved, the electronic device 2000 may reattempt to cause the first sub-goal 950 to be performed without determining the second sub-goal 960.

The electronic device 2000 may detect the current state of the electronic device 2000 based on UI elements in the second screen 922. For example, the electronic device 2000 may detect that the 'Entertainment' tab 917 is currently selected from among the UI elements in the second screen 922, and the 'Originals' tab 916 is at the left of the 'Entertainment' tab 917. Accordingly, the electronic device 2000 may determine that a sub-goal to be performed to reach the target state from the current state is 'Move to 'Originals' tab", which is the first sub-goal 950.

The electronic device 2000 may determine tasks for achieving the respective sub-goals, by using the layout navigator 940. One task may include a plurality of system actions. For example, the electronic device 2000 may determine a cursor movement action and a click action for selecting the 'Originals' tab 916 on the second screen 922, and perform the actions to achieve the first sub-goal 950.

When one sub-goal is achieved by the layout navigator 940, the electronic device 2000 according to an embodiment of the disclosure may perform a task for achieving the next sub-goal. This has been described above, and thus the description thereof will be omitted.

Figure 9E:
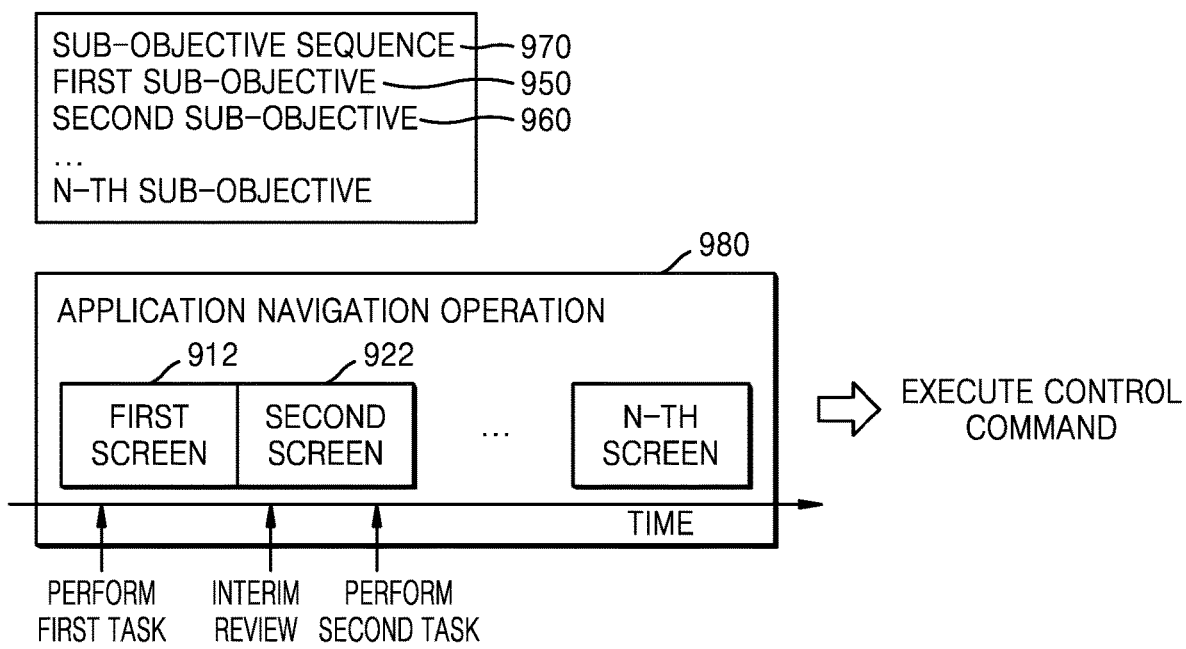
FIG. 9E is a diagram for describing an operation, performed by an electronic device, of dynamically updating a sub-goal sequence, according to an embodiment of the disclosure.

FIG. 9E is a diagram for describing an operation, performed by an electronic device, of dynamically updating a sub-goal sequence, according to an embodiment of the disclosure.

The examples described above with reference to FIGS. 9A to 9D in which the first sub-goal 950 is 'Move to 'Originals' tab' and the second sub-goal 960 is 'Click content A' will be also provided for describing FIG. 9E.

In an embodiment of the disclosure, the electronic device 2000 may update a sub-goal sequence 970 including a plurality of sub-goals. The sub-goal sequence 970 may include, for example, the first sub-goal 950, the second sub-goal 960, . . . , an N-th sub-goal. The sub-goal sequence 970 may be determined according to the above-described embodiments.

An application navigation operation 980 is performed by performing tasks corresponding to the sub-goals. In an embodiment of the disclosure, while performing the application navigation operation 980 for executing the control command, the electronic device 2000 may perform interim validation on the application navigation operation 980.

For example, when the first sub-goal 950 'Move to 'Originals' tab' is determined based on the UI elements on the first screen 912, a task corresponding to the first sub-goal may be performed on the electronic device 2000, and the screen of the electronic device 2000 may be switched to the second screen 922.

The electronic device 2000 may perform interim validation on the application navigation operation 980 based on the switching of the screen of the electronic device 2000. The electronic device 2000 may analyze the layout of the switched screen for the interim validation. For example, when the first screen 912 is switched to the second screen 922, the electronic device 2000 may analyze the layout of the second screen 922 to determine whether the first sub-goal 950 is achieved.

The electronic device 2000 may detect the current state of the electronic device 2000 based on UI elements in the second screen 922.

For example, when the first sub-goal 950 is achieved, the second screen 922 shows a state in which the first sub-goal 950 is achieved. In detail, when it is determined, by analyzing the layout of the second screen 922, that the first sub-goal 950 is 'Move to 'Originals' tab' and the 'Originals' tab is currently selected, the electronic device 2000 may determine that the first sub-goal 950 is achieved.

Alternatively, when the first sub-goal 950 is not achieved, the second screen 922 shows another state in which the first sub-goal 950 is not achieved. In detail, when it is determined, by analyzing the layout of the second screen 922, that the first sub-goal 950 is 'Move to 'Originals' tab' and a tab (e.g. the 'Entertainment' tab) other than the 'Originals' tab is currently selected, the electronic device 2000 may determine that the first sub-goal 950 is not achieved.

The electronic device 2000 may dynamically determine a next sub-goal based on whether the current sub-goal is achieved. For example, the electronic device 2000 may detect the current state of the electronic device 2000 based on the UI elements in the second screen 922, and dynamically determine the second sub-goal 960 based on the current state of the electronic device 2000. That is, the electronic device 2000 may change a sub-goal based on an interim validation result.

In some embodiments of the disclosure, the current state of the electronic device 2000 may be a state in which the first sub-goal 950 has been achieved and it is determined, based on a layout analysis result, that an element indicating the content A, which is the target of the second sub-goal 960, is present on the second screen 922. The electronic device 2000 may confirm the second sub-goal 960 'Click content A' included in the previously determined sub-goal sequence 970, without changing it.

In some embodiments of the disclosure, the current state of the electronic device 2000 may be a state in which the first sub-goal 950 has been achieved but it is determined, based on a layout analysis result, that an element indicating the content A, which is the target of the second sub-goal 960, is not present on the second screen 922. The electronic device 2000 may change the second sub-goal 960 to find an element indicating the content A in the 'Originals' tab. For example, the electronic device 2000 may change the second sub-goal 960 from 'Click content A' to 'Scroll down'.

In some embodiments of the disclosure, it may be determined, based on a layout analysis result, that the current state of the electronic device 2000 is a state in which the first sub-goal 950 is not achieved. For example, the current state of the electronic device 2000 may be a state in which an error occurs while the task corresponding to the first sub-goal is performed and thus a wrong task is performed (e.g., a tab (e.g., the 'Entertainment' tab) other than the 'Originals' tab is selected) or the application is terminated due to an error. Because the first sub-goal is not achieved, the electronic device 2000 may change the sub-goal by replanning the sub-goal sequence 970 to achieve the first sub-goal.

For example, when a tap other than the 'Originals' tap is selected, the electronic device 2000 may return to the first sub-goal 'Move to 'Originals' tab'. Based on the layout information, the electronic device 2000 may update the first task including system actions for achieving the first sub-goal in a state in which a wrong tab is selected.

For example, when the application is terminated, the electronic device 2000 may newly determine the first sub-goal. Based on the layout information, the first sub-goal may be determined to be 'Re-execute the application'. In this case, the existing first sub-goal 'Select 'Originals' tab' may be changed to be a second sub-goal so as to be performed after the application is re-executed.

The application navigation operation 980 performed by the electronic device 2000 according to an embodiment of the disclosure may include a feedback loop that repeats screen analysis until the user intent is achieved. While the application navigation operation 980 is performed, the electronic device 2000 may dynamically change and determine a sub-goal by continuously performing real-time screen analysis, thereby overcoming/dealing with an error/failure that may occur in the application navigation operation 980 and allowing a control command corresponding to a user intent to be executed.

Figure 10:
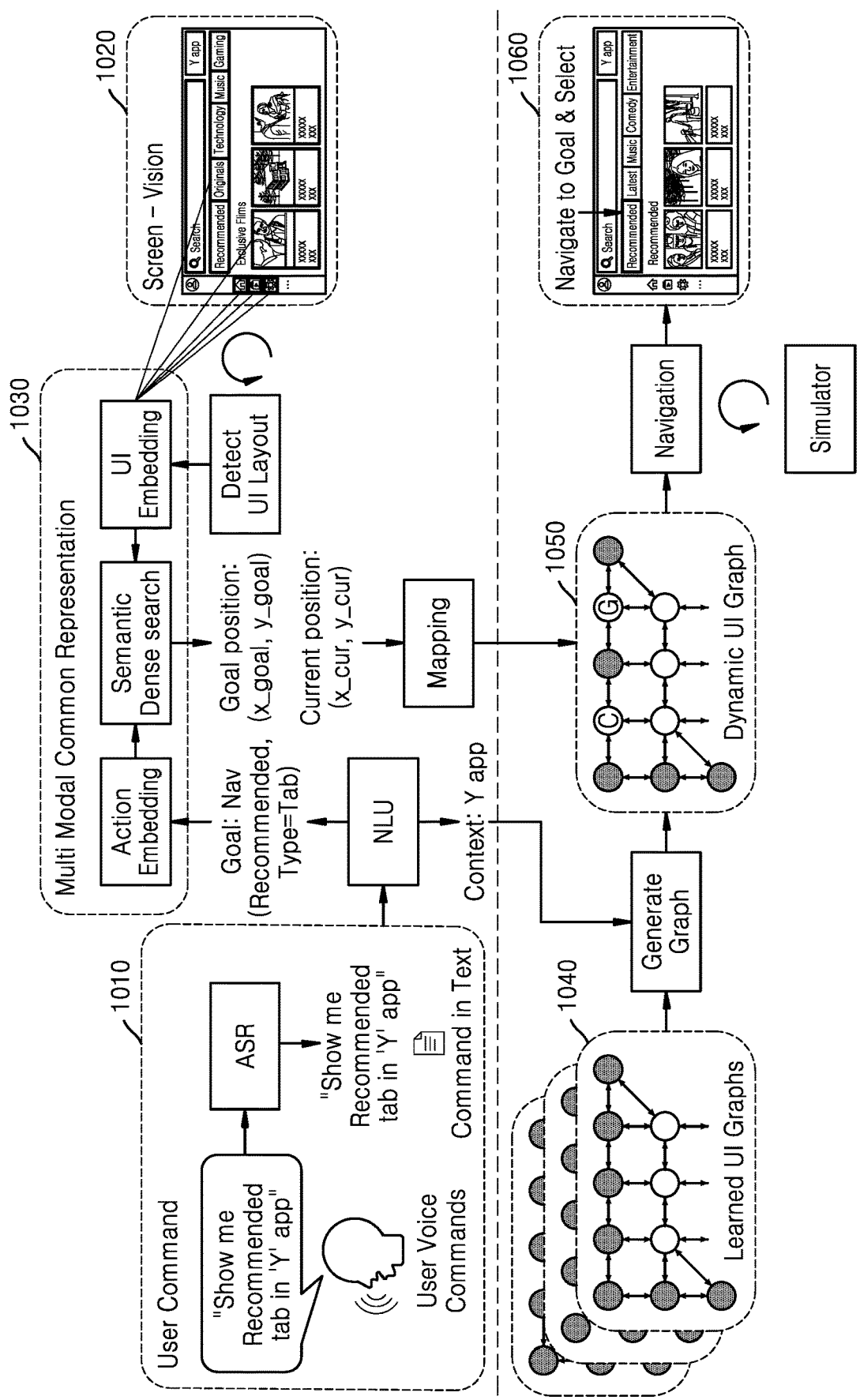
FIG. 10 is a diagram illustrating a technology map used for a control operation of an electronic device according to an embodiment of the disclosure.

FIG. 10 is a diagram illustrating a technology map used for a control operation of an electronic device according to an embodiment of the disclosure.

In an embodiment of the disclosure, the electronic device 2000 may obtain a user command 1010. The user command may be, for example, a voice command such as 'Open 'Recommended' tab in the Y app'. When the user command 1010 is a voice command, the electronic device 2000 may perform ASR to convert the user command 1010 into a text. The electronic device 2000 may determine a user intent by applying the text to an NLU model. The electronic device 2000 may process a result of applying the text to the NLU model to obtain a sub-goal (e.g., 'Navigate to 'Recommended' tab', etc.) or a context of the user command (e.g., a command for the Y app, etc.), etc. The NLU model may be, for example, a transformer model, but is not limited thereto.

In an embodiment of the disclosure, the electronic device 2000 may obtain a screen image 1020. The electronic device 2000 may analyze a screen layout to identify the overall configuration of a layout and detect and recognize UI elements included in the layout. In this case, an artificial intelligence model for vision recognition may be used. The artificial intelligence model may be, for example, a vision transformer or the like, but is not limited thereto.

In an embodiment of the disclosure, the electronic device 2000 may convert obtained data into a multi-modal common representation 1030. For example, the electronic device 2000 may determine actions for achieving a sub-goal and embed the actions into a vector. The electronic device 2000 may identify UI elements by performing layout detection and embed the UI elements into a vector. The electronic device 2000 may infer an association relation between an action vector and a UI vector by performing semantic search. For example, the electronic device 2000 may search for current cursor coordinates and target cursor coordinates based on the determined actions and the identified UI elements.

In an embodiment of the disclosure, the electronic device 2000 may generate a scene graph 1050. The scene graph 1050 may be generated by a scene graph generation model. The scene graph generation model may include learned scene graphs 1040 representing scene switching, scene connection relationships of a plurality of applications. The scene graph generation model may generate the scene graph 1050 by using a context identified from the user command. For example, when the context indicates a Y app, the scene graph 1050 representing connection/switching relationships between scenes of the Y app may be generated.

In an embodiment of the disclosure, the electronic device 2000 may map the current cursor coordinates and the target cursor coordinates to the scene graph 1050 to create a path for the electronic device 2000 to navigate the application.

The electronic device 2000 may navigate an application and execute a control command corresponding to a user intent, until an objective corresponding to the user intent is achieved. According to the above-described example, the electronic device 2000 may navigate the Y application to select the 'Recommended' tab.

Figure 11A:
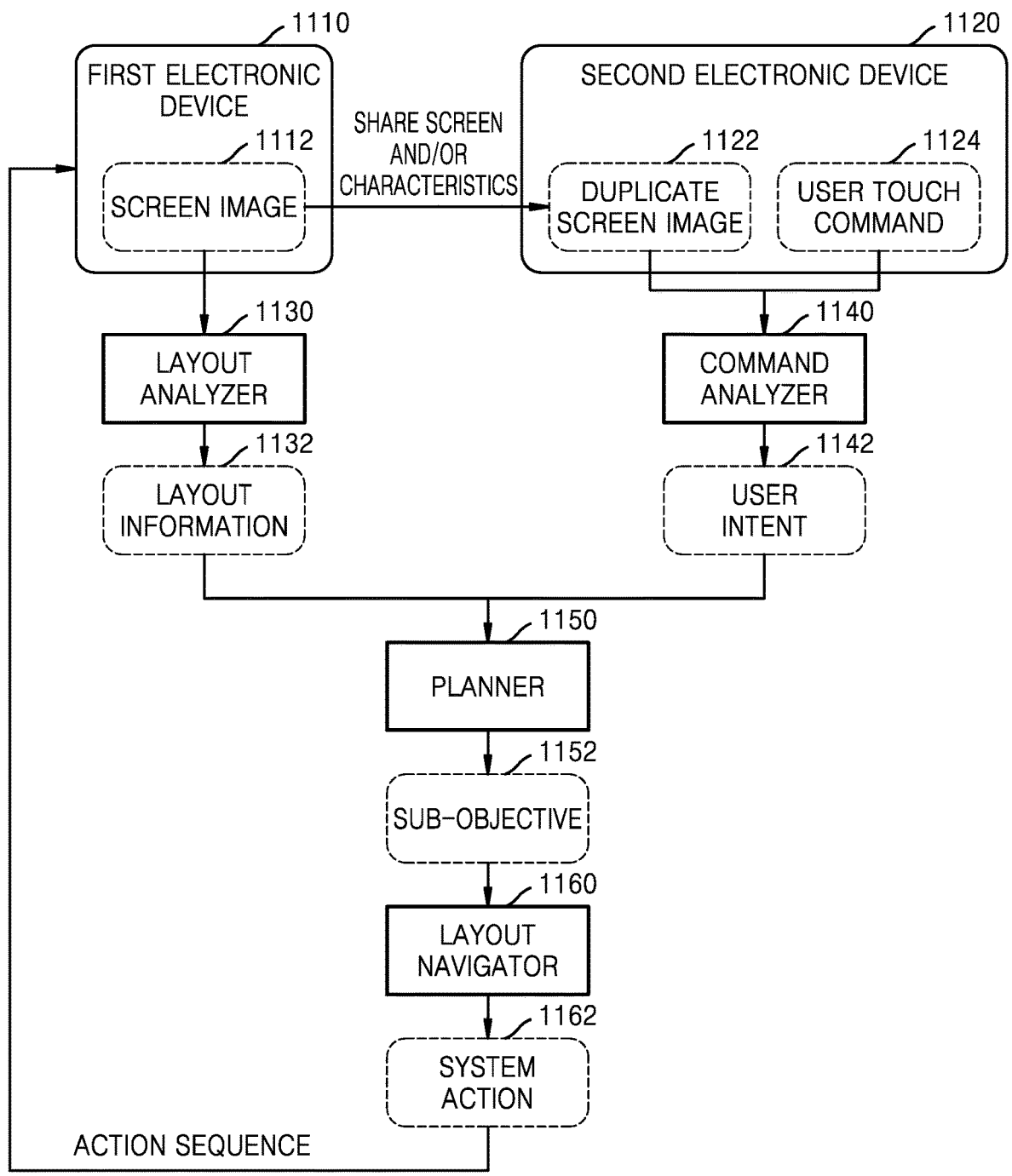
FIG. 11A is a diagram for describing an operation, performed by an electronic device, of controlling a screen based on a touch input of a user, according to an embodiment of the disclosure.

FIG. 11A is a diagram for describing an operation, performed by an electronic device, of controlling a screen based on a touch input of a user, according to an embodiment of the disclosure.

The electronic device 2000 for performing screen control and navigation of the embodiments described above with reference to FIGS. 1 to 10 corresponds to a first electronic device 1110 described with reference to FIG. 11A.

The first electronic device 1110 may be an electronic device without a touch input function (e.g., a TV, a signage, etc.). A separate control device, such as a remote controller, is used for controlling such an electronic device without a touch input function. However, a separate control device, such as a remote controller, is inconvenient for use in manipulation for using a particular function (e.g., text typing, screen navigation, payment, photographing, etc.). In an embodiment of the disclosure, in order to control the first electronic device 1110, the user may use a second electronic device 1120 having a touch input function. The second electronic device 1120 may include a touch panel.

In an embodiment of the disclosure, the first electronic device 1110 may share a screen image 1112 with the second electronic device 1120. The second electronic device 1120 may display a duplicate screen image 1122 obtained by duplicating the screen image 1112 of the first electronic device 1110, and receive a user touch command 1124.

Figure 11B:
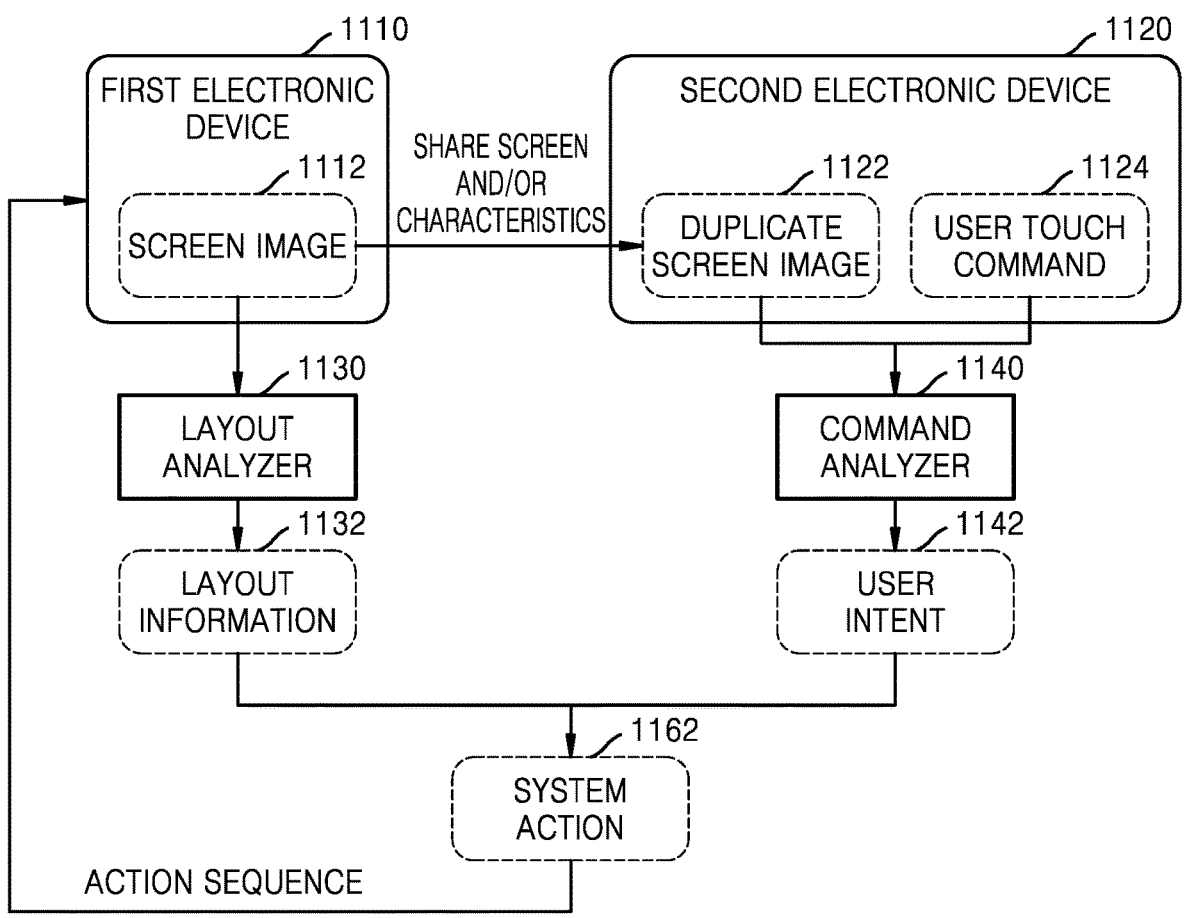
FIG. 11B is a diagram for describing another operation, performed by an electronic device, of controlling a screen based on a touch input of a user, according to an embodiment of the disclosure.
Figure 11C:
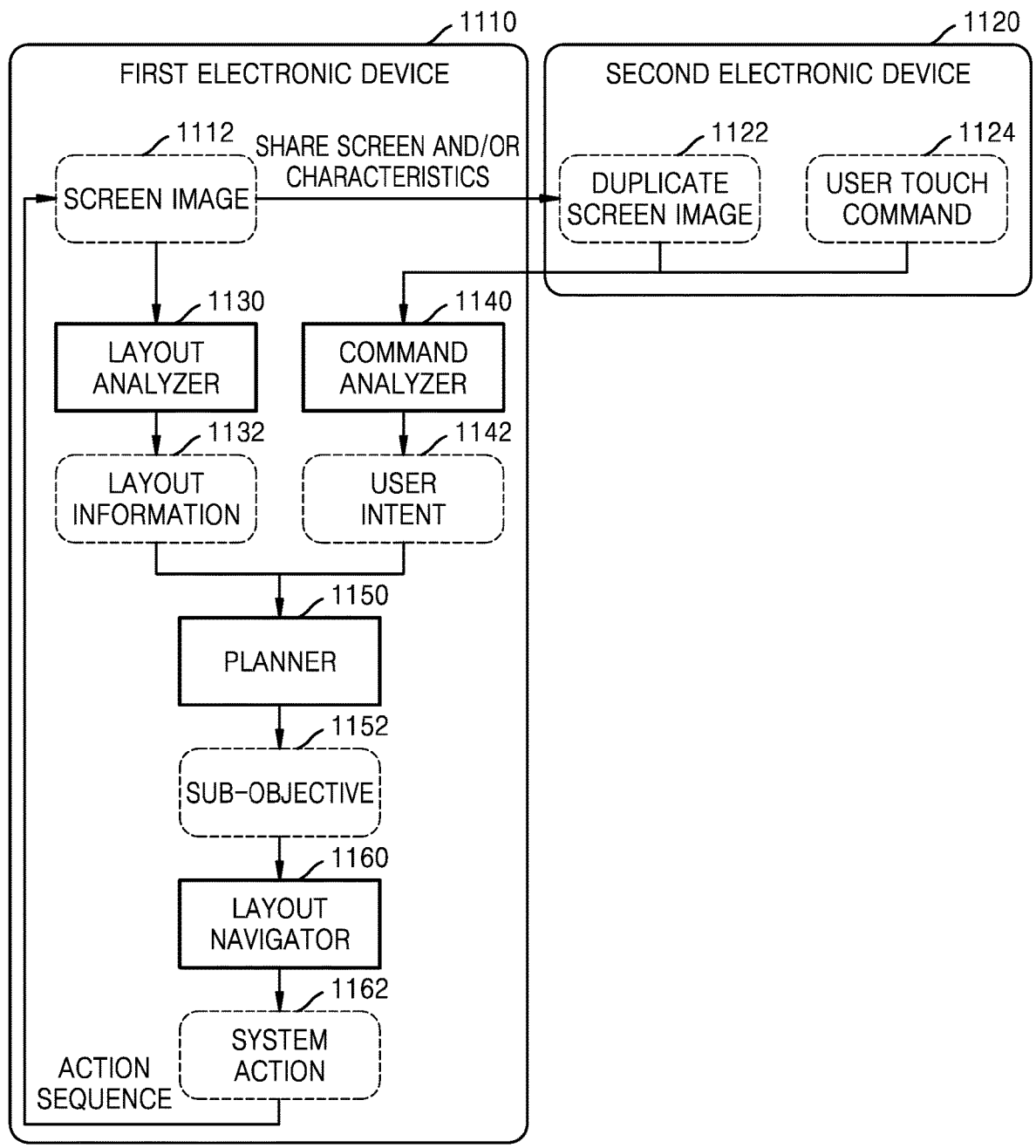
FIG. 11C is a diagram for describing a first embodiment of the disclosure in which a first electronic device is controlled based on a touch input on a second electronic device.
Figure 11D:
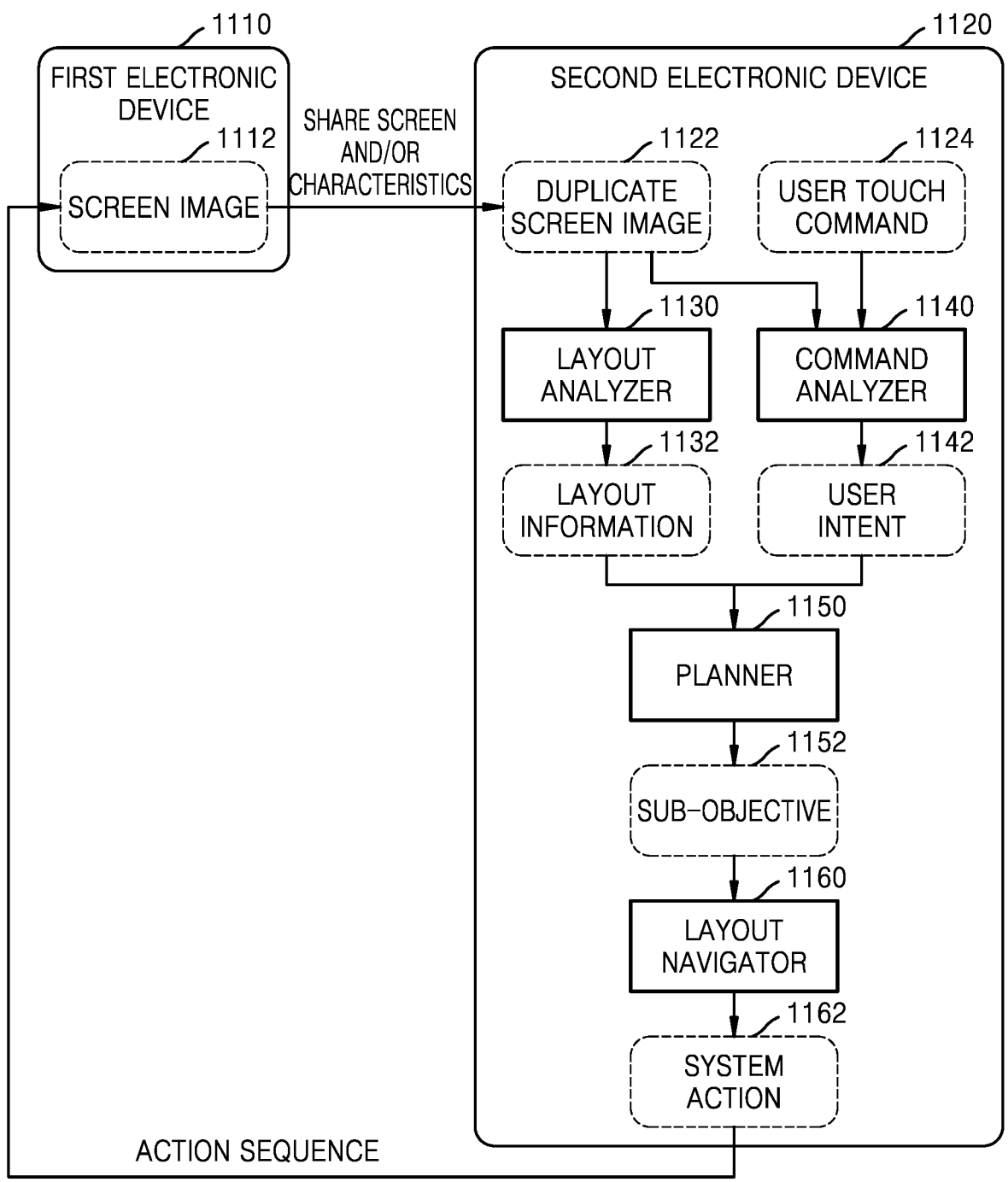
FIG. 11D is a diagram for describing a second embodiment of the disclosure in which a first electronic device is controlled based on a touch input on a second electronic device.
Figure 11E:
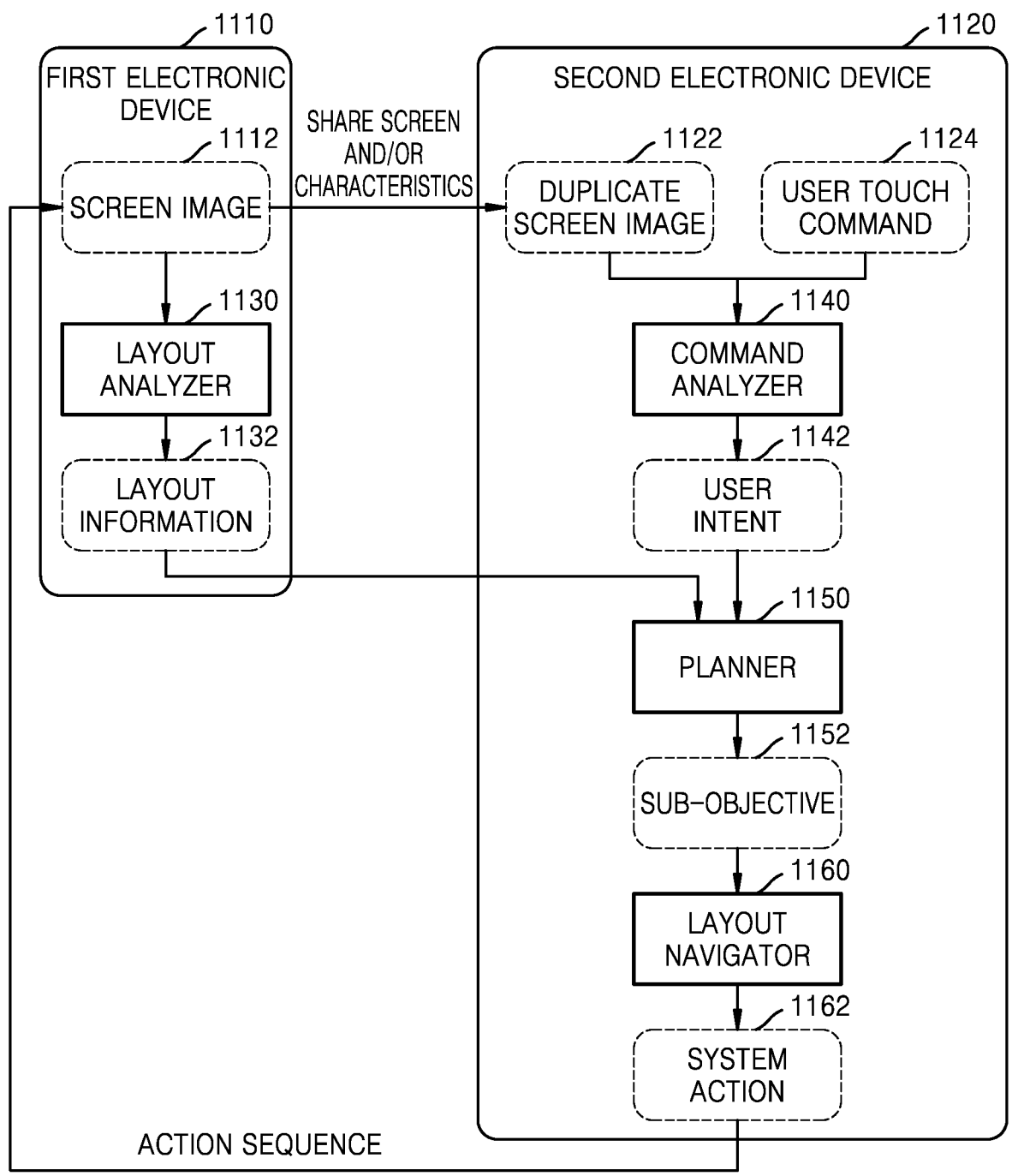
FIG. 11E is a diagram for describing a third embodiment of the disclosure in which a first electronic device is controlled based on a touch input on a second electronic device.
Figure 11F:
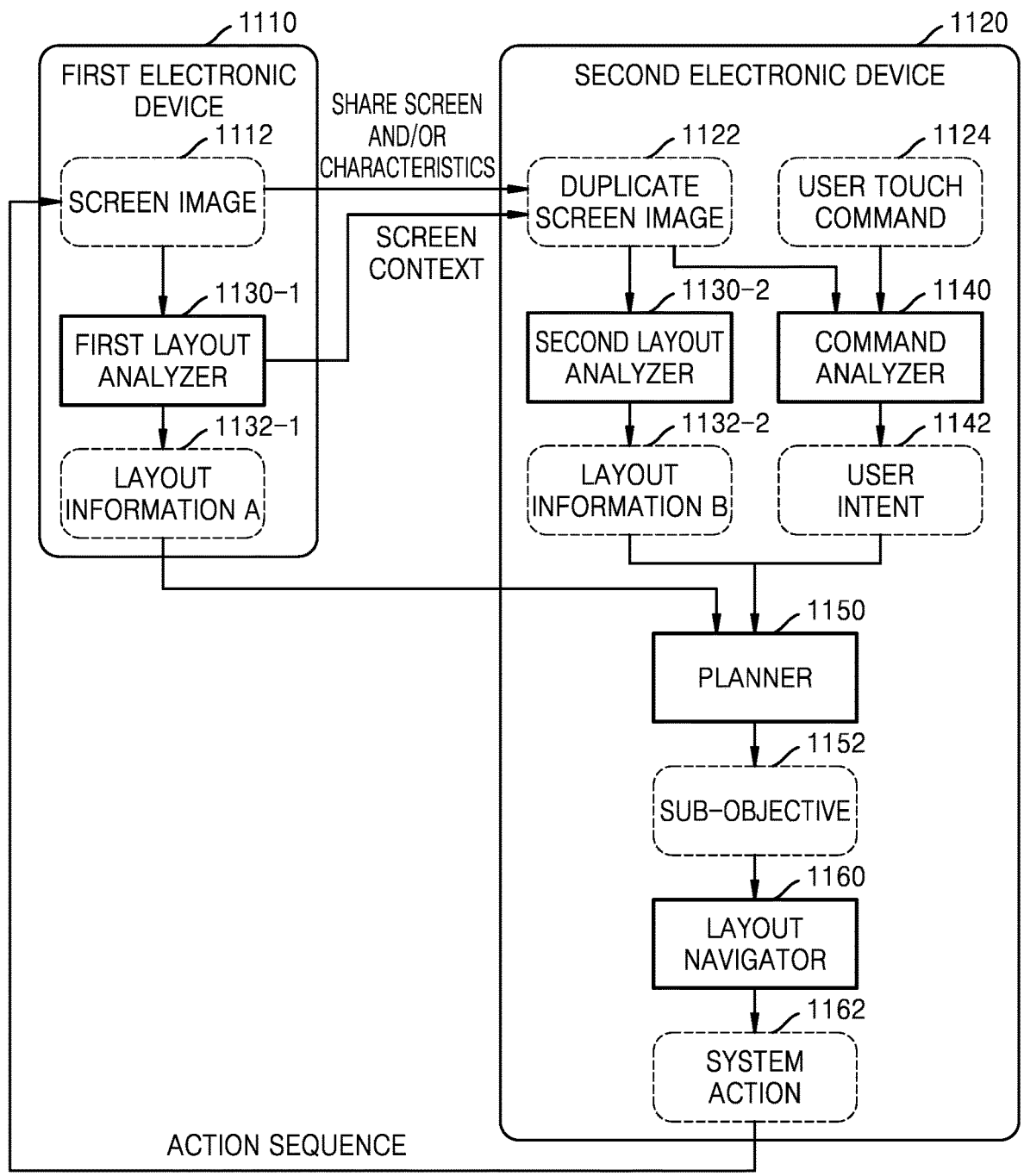
FIG. 11F is a diagram for describing a fourth embodiment of the disclosure in which a first electronic device is controlled based on a touch input on a second electronic device.
Figure 11G:
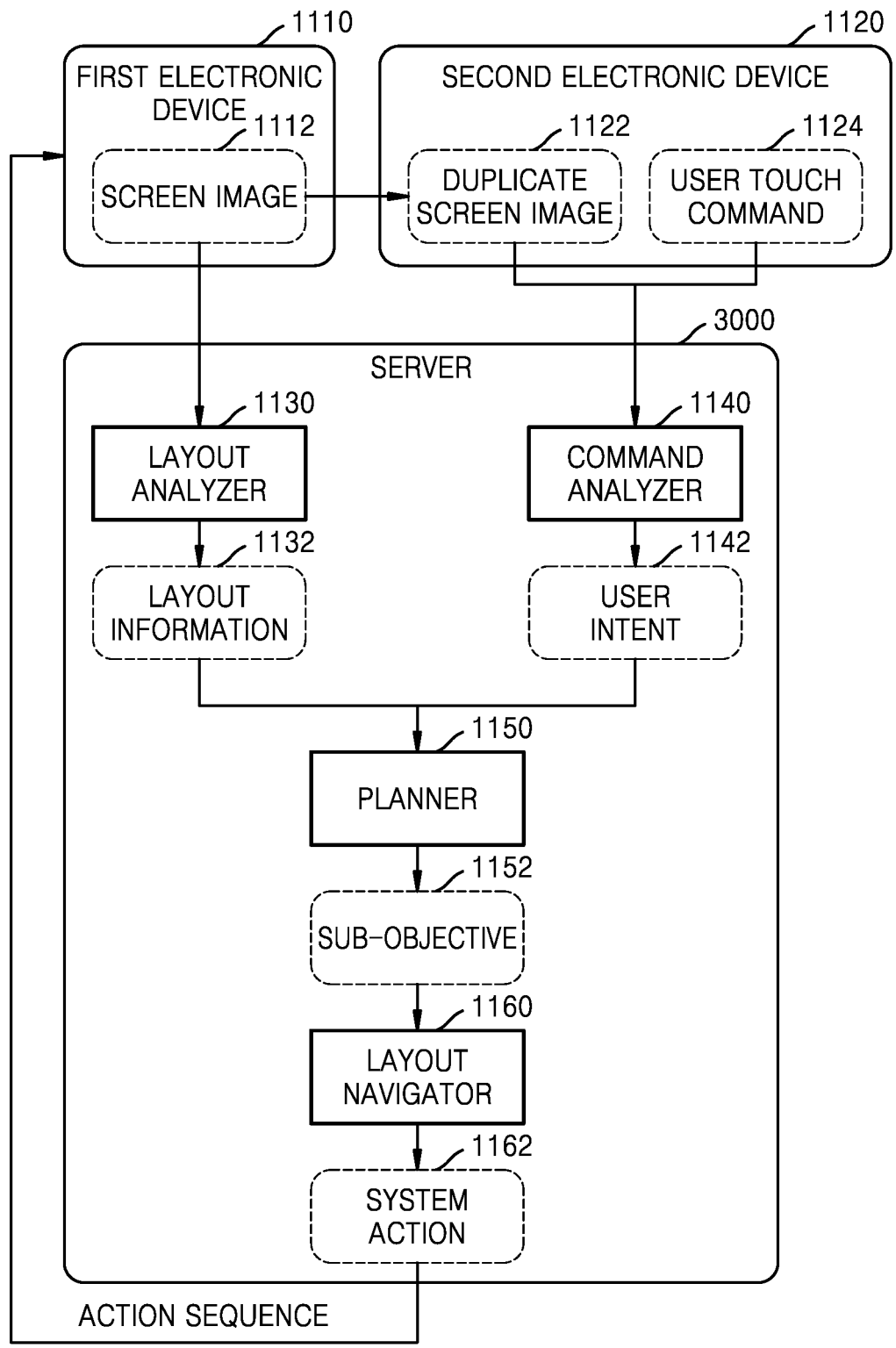
FIG. 11G is a diagram for describing a fifth embodiment of the disclosure in which a first electronic device is controlled based on a touch input on a second electronic device.

In an embodiment of the disclosure, a layout analyzer 1130, a command analyzer 1140, a planner 1150, and a layout navigator 1160 illustrated in FIG. 11A may be included in the first electronic device 1110, may be included in the second electronic device 1120, or may be included in a separate server 3000 (see FIG. 11G). Embodiments of the disclosure in which the respective modules are included in the first electronic device 1110, the second electronic device 1120, or the server 3000 will be described with reference to FIGS. 11C to 11G, and operations of the modules will be briefly described with reference to FIG. 11A.

The layout analyzer 1130 may analyze the screen image 1112 (or the duplicate screen image 1122) to identify UI elements. The layout analyzer 1130 may generate layout information 1132 by processing information related to the identified UI elements.

The command analyzer 1140 may analyze the user touch command 1124 on the duplicate screen image 1122 to determine a user intent 1142. The command analyzer 1140 may analyze the user touch command 1124 to determine whether the user touch command 1124 is, for example, a short touch, a long touch, a drag, or a zoom-in/out. The command analyzer 1140 may determine, based on a result of the analyzing, whether the user intent 1142 is, for example, to reproduce a video, to scroll down/up, or the like.

Based on the layout information 1132 and the user intent 1142, the planner 1150 may determine a sub-goal 1152 for executing a control command corresponding to the user intent 1142. The planner 1150 may determine a current state of the first electronic device 1110 and a target state, which indicates a state in which the control command is executed, and generate the sub-goal 1152 for reaching the target state.

The layout navigator 1160 may determine a task corresponding to the sub-goal 1152. The task may include at least one system action 1162 (e.g., a cursor movement, a click, etc.), which is a unit for executing a particular function in the first electronic device 1110. The layout navigator 1160 may control the screen of the first electronic device 1110 or navigate an application running on the first electronic device 1110, by performing the at least one system action 1162.

A detailed example in which the first electronic device 1110 does not have a touch input function will be further described with reference to FIGS. 12A to 13C.

FIG. 11B is a diagram for describing another operation, performed by an electronic device, of controlling a screen based on a touch input of a user, according to an embodiment of the disclosure.

The electronic device 2000 for performing screen control and navigation of the embodiments described above with reference to FIGS. 1 to 10 corresponds to the first electronic device 1110 described with reference to FIG. 11B.

The first electronic device 1110 may be an electronic device having a touch input function (e.g., a kiosk, etc.). In the case of such an electronic device having a touch input function, a user approaches the electronic device and the electronic device is controlled based on a direct touch by the user. In an embodiment of the disclosure, the user may remotely control the first electronic device 1110 by using the second electronic device 1120 having a touch input function. Each of the first electronic device 1110 and the second electronic device 1120 may include a touch panel.

In an embodiment of the disclosure, the first electronic device 1110 may share the screen image 1112 with the second electronic device 1120. The second electronic device 1120 may display the duplicate screen image 1122 obtained by duplicating the screen image 1112 of the first electronic device 1110, and receive the user touch command 1124.

The layout analyzer 1130 may analyze the screen image 1112 (or the duplicate screen image 1122) to identify UI elements. The layout analyzer 1130 may generate the layout information 1132 by processing information related to the identified UI elements.

The command analyzer 1140 may analyze the user touch command 1124 on the duplicate screen image 1122 to determine the user intent 1142. The command analyzer 1140 may analyze the user touch command 1124 to determine whether the user touch command 1124 is, for example, a short touch, a long touch, a drag, or a zoom-in/out. The command analyzer 1140 may determine, based on a result of the analyzing, whether the user intent 1142 is, for example, to reproduce a video, to scroll down/up, or the like.

When the first electronic device 1110 has a touch input function, it is only necessary to determine whether a region touched by a touch input (e.g., a click) for the user touch command 1124 corresponds to a particular function and/or action. Accordingly, the determining of the sub-goal 1152 by the planner 1150 and the determining of the task for achieving the sub-goal 1152 by the layout navigator 1160 may be omitted, and by determining and performing one or more system actions 1162 based on the layout information 1132 and the user intent 1142, the screen of the first electronic device 1110 may be controlled or the application running on the first electronic device 1110 may be navigated.

The layout analyzer 1130 and the command analyzer 1140 according to an embodiment of the disclosure may be included in the first electronic device 1110, the second electronic device 1120, or the separate server 3000, respectively.

A detailed example in which the first electronic device 1110 has a touch input function will be further described with reference to FIG. 14.

FIG. 11C is a diagram for describing a first embodiment of the disclosure in which a first electronic device is controlled based on a touch input on a second electronic device.

In an embodiment of the disclosure, the first electronic device 1110 may include the layout analyzer 1130, the command analyzer 1140, the planner 1150, and the layout navigator 1160.

In an embodiment of the disclosure, the first electronic device 1110 may duplicate the screen image 1112 and transmit the duplicate screen image 1122 to the second electronic device 1120. The second electronic device 1120 may display the duplicate screen image 1122 and receive the user touch command 1124 from the user. The second electronic device 1120 may transmit, to the first electronic device 1110, touch data related to the user touch command 1124.

The first electronic device 1110 may obtain the layout information 1132 by using the layout analyzer 1130, and determine the user intent 1142 by using the command analyzer 1140. The first electronic device 1110 may determine at least one sub-goal 1152 for executing a control command corresponding to the user intent 1142, by using the planner 1150. The first electronic device 1110 may determine a task for achieving the at least one sub-goal 1152, by using the layout navigator 1160. The first electronic device 1110 may perform an action sequence including the one or more system actions 1162, to achieve the sub-goal 1152. When the sub-goal 1152 is achieved, the screen of the first electronic device 1110 is switched or changed, and thus the first electronic device 1110 may analyze the screen image 1112 again and repeat the above-described operations.

FIG. 11D is a diagram for describing a second embodiment of the disclosure in which a first electronic device is controlled based on a touch input on a second electronic device.

In an embodiment of the disclosure, the second electronic device 1120 may include the layout analyzer 1130, the command analyzer 1140, the planner 1150, and the layout navigator 1160.

In an embodiment of the disclosure, the first electronic device 1110 may duplicate the screen image 1112 and transmit the duplicate screen image 1122 to the second electronic device 1120. The second electronic device 1120 may display the duplicate screen image 1122 and receive the user touch command 1124 from the user.

The second electronic device 1120 may obtain the layout information 1132 by using the layout analyzer 1130, and determine the user intent 1142 by using the command analyzer 1140. The second electronic device 1120 may determine at least one sub-goal 1152 for executing a control command corresponding to the user intent 1142, by using the planner 1150. The second electronic device 1120 may determine a task for achieving the at least one sub-goal 1152, by using the layout navigator 1160. The second electronic device 1120 may transmit, to the first electronic device 1110, a command and/or a signal (e.g., an IR signal) corresponding to an action sequence including one or more system actions 1162. The first electronic device 1110 may perform the action sequence including the one or more system actions 1162, to achieve the sub-goal 1152. When the sub-goal 1152 is achieved, the screen of the first electronic device 1110 is switched or changed, and thus the first electronic device 1110 may duplicate the screen image 1112 again and transmit the duplicate screen image 1122 to the second electronic device 1120. The second electronic device 1120 may analyze the duplicate screen image 1122 and repeat the above-described operations.

FIG. 11E is a diagram for describing a third embodiment of the disclosure in which a first electronic device is controlled based on a touch input on a second electronic device.

In an embodiment of the disclosure, the first electronic device 1110 may include the layout analyzer 1130, and the second electronic device 1120 may include the command analyzer 1140, the planner 1150, and the layout navigator 1160.

In an embodiment of the disclosure, the first electronic device 1110 may duplicate the screen image 1112 and transmit the duplicate screen image 1122 to the second electronic device 1120. The second electronic device 1120 may display the duplicate screen image 1122 and receive the user touch command 1124 from the user.

The first electronic device 1110 may obtain the layout information 1132 by using the layout analyzer 1130 and transmit the layout information 1132 to the second electronic device 1120. The second electronic device 1120 may determine the user intent 1142 by using the command analyzer 1140.

The second electronic device 1120 may determine at least one sub-goal 1152 for executing a control command corresponding to the user intent 1142, by using the planner 1150. The second electronic device 1120 may determine a task for achieving the at least one sub-goal 1152, by using the layout navigator 1160. The second electronic device 1120 may transmit, to the first electronic device 1110, a command and/or a signal (e.g., an IR signal) corresponding to an action sequence including one or more system actions 1162. The first electronic device 1110 may perform the action sequence including the one or more system actions 1162, to achieve the sub-goal 1152. When the sub-goal 1152 is achieved, the screen of the first electronic device 1110 is switched or changed, and thus the first electronic device 1110 may analyze the screen image 1112 again and repeat the above-described operations.

FIG. 11F is a diagram for describing a fourth embodiment of the disclosure in which a first electronic device is controlled based on a touch input on a second electronic device.

In an embodiment of the disclosure, the first electronic device 1110 may include a first layout analyzer 1130-1, and the second electronic device 1120 may include a second layout analyzer 1130-2, the command analyzer 1140, the planner 1150, and the layout navigator 1160.

In an embodiment of the disclosure, the first electronic device 1110 may duplicate the screen image 1112 and transmit the duplicate screen image 1122 to the second electronic device 1120. The second electronic device 1120 may display the duplicate screen image 1122 and receive the user touch command 1124 from the user.

In an embodiment of the disclosure, the first electronic device 1110 may partially analyze the screen image 1112, and the second electronic device 1120 may partially analyze the duplicate screen image 1122. Each or a combination of layout information A 1132-1 obtained by the first electronic device 1110 and layout information B 1132-2 obtained by the second electronic device 1120 may be used by the planner 1150 to determine the sub-goal 1152.

The first electronic device 1110 may obtain the layout information A 1132-1 by using the first layout analyzer 1130-1. The layout information A 1132-1 may include screen context information, which may include information of an application currently running on the first electronic device 1110 (e.g., 'Application Y is running'). The first electronic device 1110 may transmit the layout information A 1132-1 including the screen context information to the second electronic device 1120. The second electronic device 1120 may obtain the layout information B 1132-2 by using the second layout analyzer 1130-2, and determine the user intent 1142 by using the command analyzer 1140. The second electronic device 1120 may determine at least one sub-goal 1152 for executing a control command corresponding to the user intent 1142, by using the planner 1150. The second electronic device 1120 may determine a task for achieving the at least one sub-goal 1152, by using the layout navigator 1160. The second electronic device 1120 may transmit, to the first electronic device 1110, a command and/or a signal (e.g., an IR signal) corresponding to an action sequence including one or more system actions 1162. The first electronic device 1110 may perform the action sequence including the one or more system actions 1162, to achieve the sub-goal 1152. When the sub-goal 1152 is achieved, the screen of the first electronic device 1110 is switched or changed, and thus the first electronic device 1110 may duplicate the screen image 1112 again and transmit the duplicate screen image 1122 to the second electronic device 1120. The first electronic device 1110 may analyze the screen image 1112, and the second electronic device 1120 may analyze the duplicate screen image 1122 and repeat the above-described operations.

FIG. 11G is a diagram for describing a fifth embodiment of the disclosure in which a first electronic device is controlled based on a touch input on a second electronic device.

In an embodiment of the disclosure, the server 3000 may include the layout analyzer 1130, the command analyzer 1140, the planner 1150, and the layout navigator 1160.

In an embodiment of the disclosure, the first electronic device 1110 may duplicate the screen image 1112 and transmit the duplicate screen image 1122 to the second electronic device 1120. The second electronic device 1120 may display the duplicate screen image 1122 and receive the user touch command 1124 from the user. The second electronic device 1120 may transmit touch data related to the user touch command 1124 and the duplicate screen image 1122 to the server 3000. The first electronic device 1110 may transmit the screen image 1112 to the server 3000.

The server 3000 may obtain the layout information 1132 by using the layout analyzer 1130, and determine the user intent 1142 by using the command analyzer 1140. The server 3000 may determine at least one sub-goal 1152 for executing a control command corresponding to the user intent 1142, by using the planner 1150. The server 3000 may determine a task for achieving the at least one sub-goal 1152, by using the layout navigator 1160. The server 3000 may transmit, to the first electronic device 1110, a command and/or a signal (e.g., an IR signal) corresponding to an action sequence including one or more system actions 1162. The first electronic device 1110 may perform the action sequence including the one or more system actions 1162, to achieve the sub-goal 1152. When the sub-goal 1152 is achieved, the screen of the first electronic device 1110 is switched or changed, and thus the first electronic device 1110 may duplicate the screen image 1112 again and transmit the duplicate screen image 1122 to the second electronic device 1120. The server 3000 may receive data from the first electronic device 1110 and the second electronic device 1120, and repeat the above-described operations.

Figure 12A:
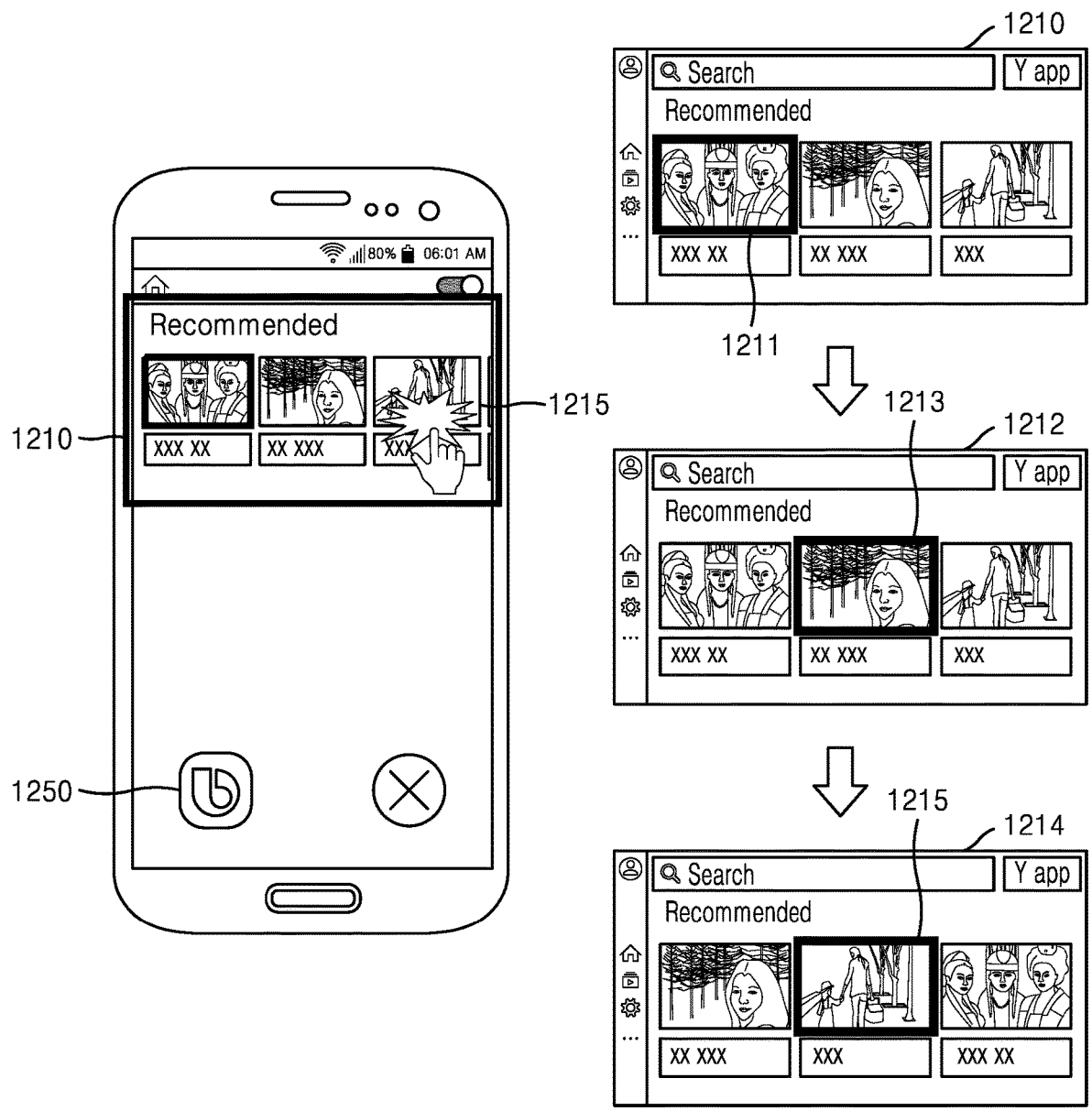
FIG. 12A is a diagram for describing a first embodiment of an operation of navigating a screen of a first electronic device based on a touch input on a second electronic device, according to an embodiment of the disclosure.

FIG. 12A is a diagram for describing a first embodiment of an operation of navigating a screen of a first electronic device based on a touch input on a second electronic device, according to an embodiment of the disclosure.

For convenience of description, an example will be described with reference to FIGS. 12A to 12D, in which the first electronic device on which screen navigation is performed as a control operation is a TV, and the second electronic device to which a touch command is input as a control command is a smart phone. In addition, in the example, the second electronic device includes a layout analyzer, a command analyzer, a planner, and a layout navigator, for controlling the first electronic device (i.e., the same example as described with reference to FIG. 11D). However, the description below is not limited to the example, and is also applicable to any one of the examples described with reference to FIGS. 11C to 11G.

According to an embodiment of the disclosure, a user may control the first electronic device by inputting a touch to the second electronic device. In order to control the first electronic device, which is a TV, the user may use the second electronic device, which is a smart phone having a touch input function.

The second electronic device (i.e., the smart phone) may receive a first screen 1210 from the first electronic device (i.e., the TV) and display the first screen 1210. The second electronic device may receive a touch command from the user.

The second electronic device may determine a user intent by using the command analyzer. For example, the cursor on the first screen 1210 may be currently active on content A 1211. When the user selects content C 1215 on the second electronic device, the second electronic device may determine that the user intends to use the content C 1215.

The second electronic device may analyze the first screen 1210 by using the layout analyzer, and generate one or more sub-goals for achieving the user intent by using the planner. For example, the determined sub-goal may be to place the cursor on the content C 1215, and a task corresponding to the sub-goal may be to move to the content C 1215. Because the cursor is currently active on the content A 1211, the second electronic device may determine a system action 'Move to the right twice' to be included in the task and transmit a control command corresponding to the 'Move to the right twice' to the first electronic device.

The first electronic device may receive a control command corresponding to system actions from the second electronic device, and perform screen/app navigation. For example, when the cursor is active on the content A 1211 on the first screen 1210, which is the current screen, the first electronic device is controlled based on a control command received from the second electronic device. When a system action 'Move to the right' is performed on the first electronic device, the cursor may be active on content B 1213 (as in a second screen 1212). In addition, when the system action 'Move to the right' is performed once again in a state in which the first electronic device displays the second screen 1212, the cursor may be active on the content C 1215, and the screen may be scrolled such that the content C 1215 is at the center of the screen.

In some embodiments of the disclosure, whenever the screen of the first electronic device is changed, the second electronic device may update the layout information by performing layout analysis on the changed screen. For example, the second electronic device may analyze a layout of the second screen 1212 and update the layout information. The second electronic device may determine whether a sub-goal is achieved, and then dynamically determine a next sub-goal according to a result of the determining. The second electronic device according to an embodiment of the disclosure may change or update a sub-goal according to a layout analysis result.

In some embodiments of the disclosure, the second electronic device may receive a voice command of the user. For example, the user may select a voice command input button 1250 of the second electronic device to execute a voice input function (e.g., a voice assistant, etc.) and input a voice input signal. The second electronic device may determine a user intent by analyzing a user voice input signal.

In an embodiment of the disclosure, a voice command and a touch command may act complementarily. The user may efficiently control the first electronic device by selecting and inputting a command having a form more suitable for controlling the first electronic device. For example, a displayed screen may not include a text. In detail, the screen of the first electronic device may include a thumbnail image of the content A but may not include a text related to the content A. In this case, because no UI element, such as a text, may be identified through screen analysis even when the user inputs a voice command 'Play content A', it may be unable to detect the content A on the screen through the layout analysis. In this case, a touch command may be more suitable for controlling the first electronic device than a voice command, the second electronic device may lead the user to input another type of user input (e.g., a touch command rather than a voice command). The second electronic device may display a user input guide on the screen or output the user input guide as an audio, but is not limited thereto.

FIG. 12B is a diagram for further describing the first embodiment of the operation of navigating the screen of the first electronic device based on a touch input on the second electronic device, according to an embodiment of the disclosure.

In an embodiment of the disclosure, in order to control the first electronic device, which is a TV, the user may use the second electronic device, which is a smart phone having a touch input function.

The second electronic device (i.e., the smart phone) may receive a first screen 1220 from the first electronic device (i.e., the TV) and display the first screen 1220. The second electronic device may receive a touch command from the user. The second electronic device may determine a user intent by using the command analyzer. For example, when the user selects content X 1221 on the first screen 1220 displayed on the second electronic device, the second electronic device may determine that the user intends to use the content X 1221.

The second electronic device may analyze the first screen 1220 by using the layout analyzer, and generate one or more sub-goals for achieving the user intent by using the planner. For example, the determined sub-goal may be to view information of the content X 1221, and a task corresponding to the sub-goal may be to select the content X 1221. The second electronic device may determine system actions 'Move to the right three times' and 'Click the content X 1221' to be included in the task, and transmit a control command corresponding to the system actions to the first electronic device.

The first electronic device may receive a control command corresponding to system actions from the second electronic device, and perform screen/app navigation. For example, when the first screen 1220 is currently displayed, the first electronic device is controlled based on a control command received from the second electronic device. When a system action 'Move to the right' is performed in the first electronic device, the screen of the first electronic device may be switched to a second screen 1222. In the same manner, when the system action 'Move to the right' is performed two more times in the first electronic device, the screen of the first electronic device may be switched to a fourth screen 1224 (a third screen, which is displayed prior to the fourth screen 1224, is omitted). For example, in the fourth screen 1224, the cursor may be active on the content X 1221, and the content X 1221 may be the first content on the screen. When the system action 'Click the content X 1221' is performed in the first electronic device, the screen of the first electronic device may be switched to a fifth screen 1226. The fifth screen 1226 may include information of the content X 1221, for example, the release date, content rating, plot summary, season information, episode information, and the like of the content X 1221.

In some embodiments of the disclosure, whenever the screen of the first electronic device is changed, the second electronic device may update the layout information by performing layout analysis on the changed screen. For example, the second electronic device may analyze a layout of the fifth screen 1226 and update the layout information. The second electronic device may determine whether a user intent is achieved based on a layout analysis result. For example, a result of analyzing the fifth screen 1226 indicates that the information of the content X 1221 is displayed on the fifth screen 1226, the second electronic device may determine that the user intent is achieved. As another example, when it is determined that the user intent is not achieved, the second electronic device may update the sub-goal based on the layout information.

In some embodiments of the disclosure, the second electronic device may receive a voice command of the user. For example, the user may select the voice command input button 1250 of the second electronic device to execute a voice input function (e.g., a voice assistant, etc.) and input a voice input signal. The second electronic device may determine a user intent by analyzing a user voice input signal.

Figure 12C:
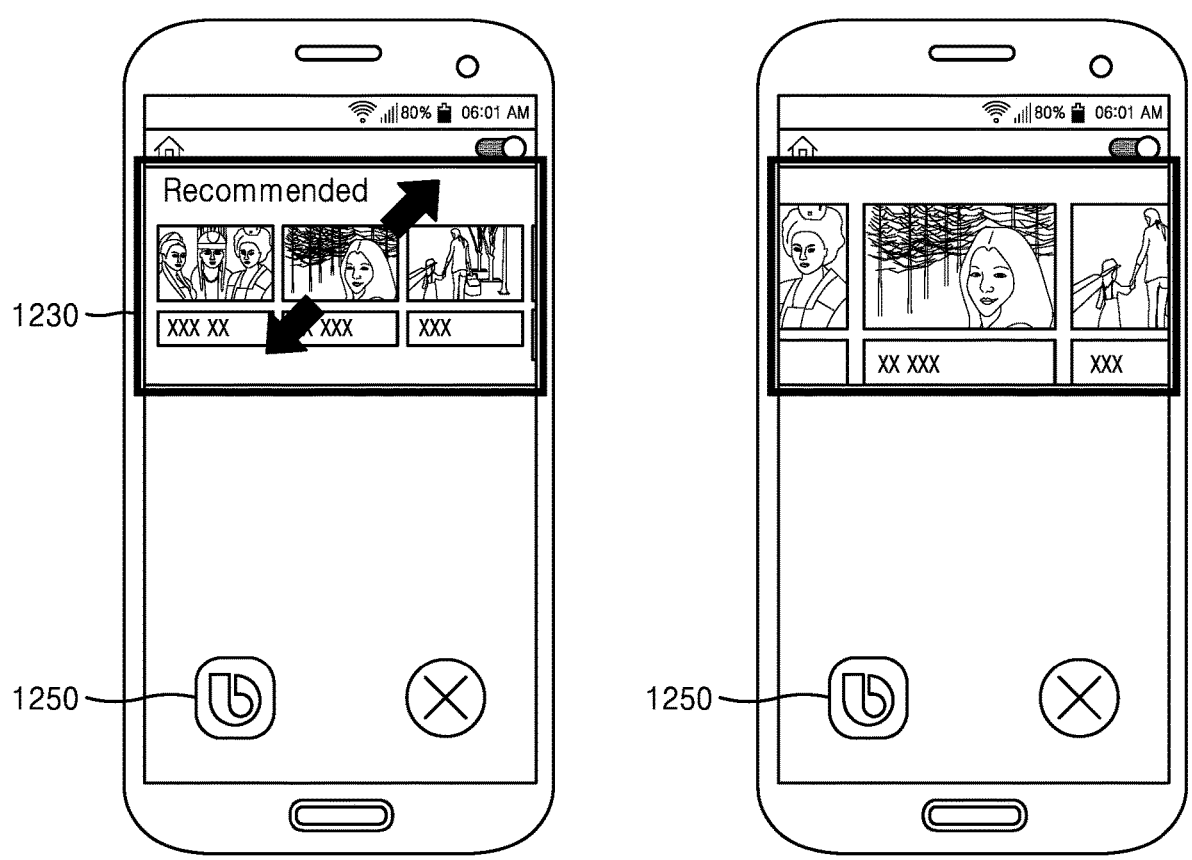
FIG. 12C is a diagram for describing a second embodiment of an operation of navigating a screen of a first electronic device based on a touch input on a second electronic device, according to an embodiment of the disclosure.

FIG. 12C is a diagram for describing a second embodiment of an operation of navigating a screen of a first electronic device based on a touch input on a second electronic device, according to an embodiment of the disclosure.

Referring to FIG. 12C, the second electronic device (e.g., a smart phone) may receive a duplicate screen 1230 from the first electronic device (e.g., a TV) and display the duplicate screen 1230. The second electronic device may receive a touch command from the user.

In an embodiment of the disclosure, the second electronic device may receive a zoom-in/out touch input from the user. In some embodiments of the disclosure, a touch input of touching two or more points on the screen and then moving them apart may correspond to a zoom-in command, and a touch input of touching two or more points on the screen and then moving them together may correspond to a zoom-out command. In an embodiment of the disclosure, when receiving a zoom-in touch input from the user, the second electronic device may enlarge the duplicate screen 1230. The user may more precisely input a touch onto the enlarged duplicate screen 1230.

In an embodiment of the disclosure, the second electronic device may enlarge or reduce the duplicate screen 1230 based on a user touch input. For example, when the second electronic device is unable to determine the target object of a user touch on the duplicate screen 1230 (e.g., when the user touches a region covering all of the bounding boxes of two or more objects), the second electronic device may enlarge the duplicate screen 1230. When the target object of a user touch on the enlarged screen is accurately identified, the second electronic device may zoom out from and reduce the screen to display the duplicate screen 1230 again.

According to the above-described embodiments of the disclosure, the second electronic device may control the first electronic device by determining a user intent and a sub-goal with higher resolution based on analysis of a user touch input on an enlarged screen.

FIG. 12D is a diagram for describing a third embodiment of an operation of navigating a screen of a first electronic device based on a touch input on a second electronic device, according to an embodiment of the disclosure.

According to an embodiment of the disclosure, a user may control the first electronic device by inputting a touch to the second electronic device. In an embodiment of the disclosure, in order to control the first electronic device, which is a TV, the user may use the second electronic device, which is a smart phone having a touch input function.

In an embodiment of the disclosure, when the first electronic device duplicates a screen and provides the duplicate screen to the second electronic device, the first electronic device may duplicate a portion of the entire screen of the first electronic device, and provide the second electronic device with an edited screen 1240 including only the portion of the entire screen of the first electronic device. For example, the first electronic device may analyze a screen layout, and generate the edited screen 1240 by reconfiguring the entire screen to include only clickable content (or clickable UI elements). The first electronic device may provide the edited screen 1240 to the second electronic device.

In an embodiment of the disclosure, the user may navigate a screen/app of the first electronic device by inputting a touch to the second electronic device. For example, when the user intends to scroll down the screen of the first electronic device, the user may input a touch (e.g., a drag, etc.) for scrolling the screen to the second electronic device or may touch a 'View more' button. Accordingly, the second electronic device may determine that the user intends to view a new content list.

Based on a user intent determined according to a user touch input and layout information obtained through screen analysis, the second electronic device may determine a sub-goal and a task for achieving the user intent. For example, the determined sub-goal may be to display new content items, and a task corresponding to the sub-goal may be to scroll down. The second electronic device may determine a system action 'Move down three times' to be included in the task, and transmit a control command corresponding to the system action to the first electronic device.

The first electronic device may receive a control command corresponding to system actions from the second electronic device, and perform screen/app navigation. For example, after the first electronic device performs screen/app navigation based on the control command, new content items 1242 may be displayed on the screen of the first electronic device.

In an embodiment of the disclosure, the second electronic device may generate and display a second edited screen 1244 additionally processed for user control convenience, in addition to displaying the edited screen 1240 (hereinafter, referred to as the first edited screen 1240) obtained by reconfiguring the screen to include only clickable content items (or clickable UI elements) on the screen of the first electronic device. For example, the second electronic device may generate the second edited screen 1244 in which the new content items 1242 are further displayed in addition to the content items on the first edited screen 1240 such that selectable content items are viewed on one screen.

The user may control the first electronic device by inputting a touch to the second electronic device. For example, the user may select any one of the content items in the edited screen 1244 to reproduce the selected content item on the first electronic device.

Figure 13A:
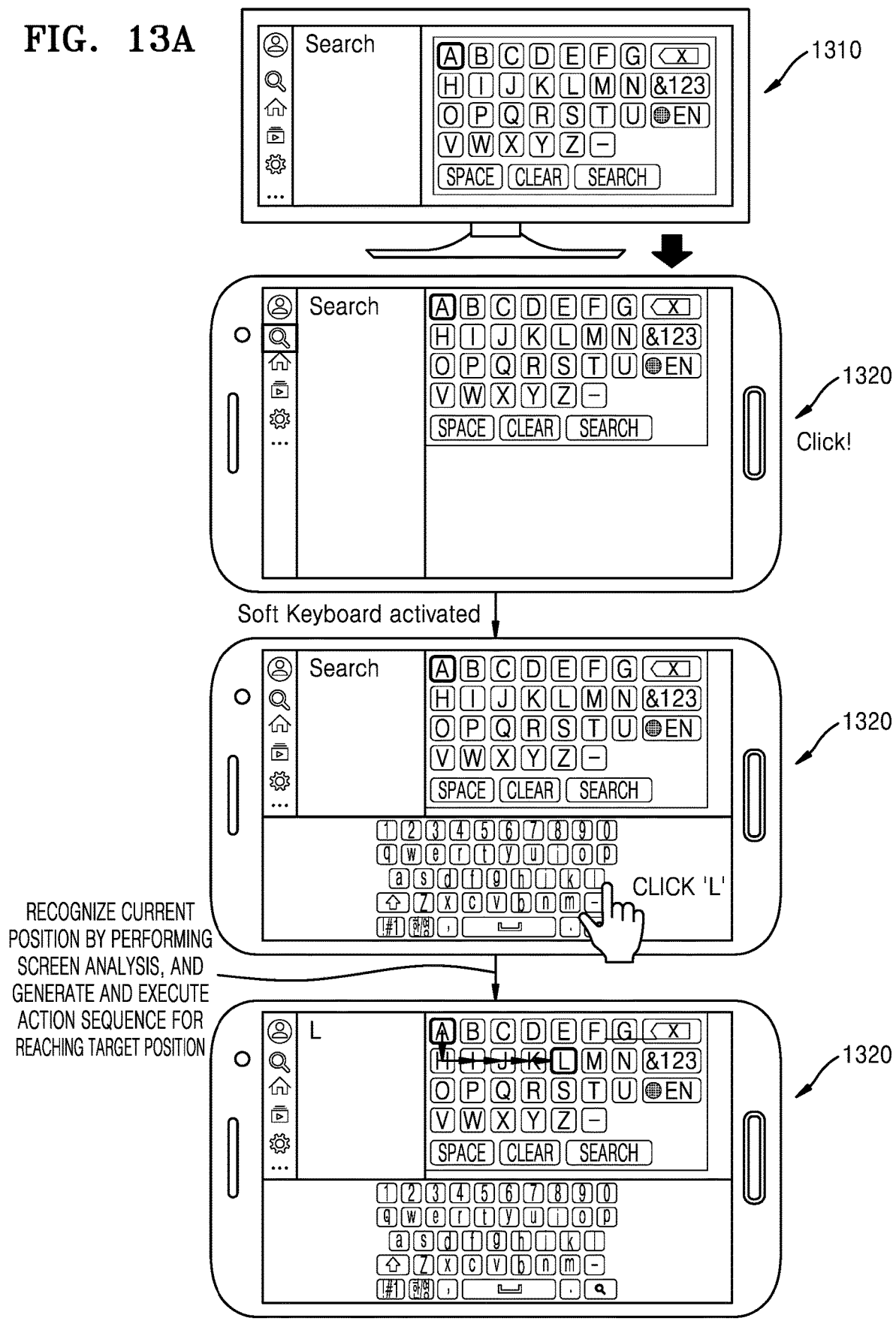
FIG. 13A is a diagram for describing a first embodiment of an operation of inputting a text to a first electronic device by inputting a touch to a second electronic device, according to an embodiment of the disclosure.

FIG. 13A is a diagram for describing a first embodiment of an operation of inputting a text to a first electronic device by inputting a touch to a second electronic device, according to an embodiment of the disclosure.

For convenience of description, an example will be described with reference to FIG. 13A, in which a second electronic device 1320 includes a layout analyzer, a command analyzer, a planner, and a layout navigator, for controlling a first electronic device 1310 (i.e., the same example as described with reference to FIG. 11D). However, the description below is not limited to the example, and is also applicable to any one of the examples described with reference to FIGS. 11C to 11G. In addition, for convenience of description, in the example, the first electronic device 1310 on which text typing is performed as a control operation is a TV, and the second electronic device 1320 to which a touch command is input as a control command is a smart phone.

In an embodiment of the disclosure, the first electronic device 1310 may duplicate a screen and transmit the duplicate screen to the second electronic device 1320. The second electronic device 1320 may display the duplicate screen and receive a user touch command. The second electronic device 1320 may generate an action sequence for controlling the first electronic device 1310 based on the user touch command. For example, when the user touches a search icon on the screen of the second electronic device 1320, a software keyboard may be activated on the screen of the second electronic device 1320. Alternatively, the second electronic device 1320 may recognize, by performing screen analysis, that the screen of the first electronic device 1310 is a search page, and activate the software keyboard on the screen of the second electronic device 1320.

In an embodiment of the disclosure, when the user touches 'L' on the software keyboard to input the character 'L' to the first electronic device 1310, the second electronic device 1320 may recognize the current cursor position by performing screen analysis and determine an action sequence for achieving a sub-goal. In detail, because the cursor is currently on 'A', the second electronic device 1320 may determine that the action sequence is 'Move down once, move to the right four times, and enter'.

The second electronic device 1320 may transmit the determined action sequence to the first electronic device 1310. The first electronic device 1310 may be controlled based on the received action sequence to allow the character 'L' to be input thereto.

Figure 13B:
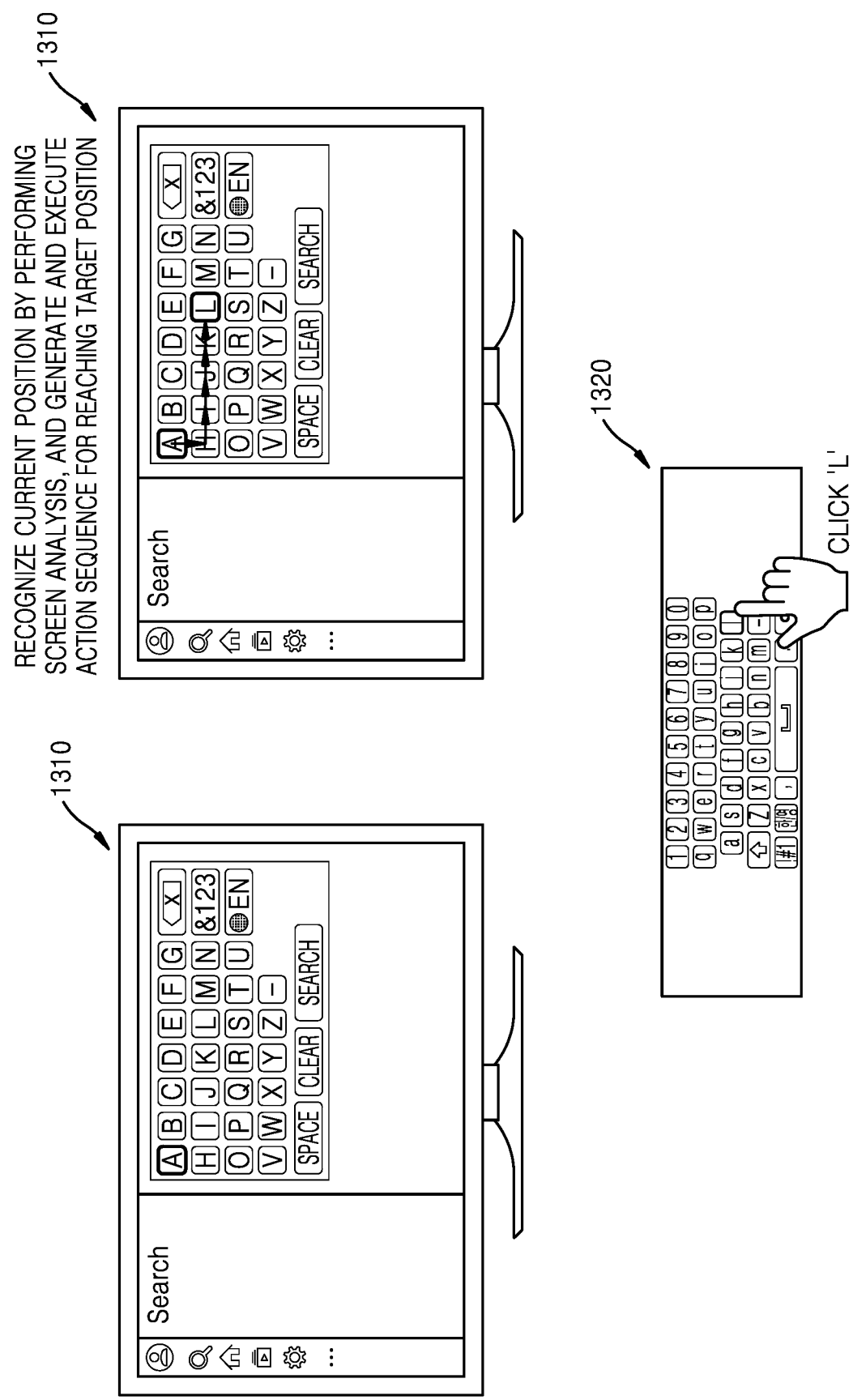
FIG. 13B is a diagram for describing a second embodiment of an operation of inputting a text to a first electronic device by inputting a touch to a second electronic device, according to an embodiment of the disclosure.

FIG. 13B is a diagram for describing a second embodiment of an operation of inputting a text to a first electronic device by inputting a touch to a second electronic device, according to an embodiment of the disclosure.

An example will be described with reference to FIG. 13B, in which the first electronic device 1310 includes a layout analyzer, a command analyzer, a planner, and a layout navigator (i.e., the same example as described with reference to FIG. 11C). However, the description below is not limited to the example, and is also applicable to any one of the examples described with reference to FIGS. 11C to 11G.

In an embodiment of the disclosure, the second electronic device 1320 may be a physical keyboard. The first electronic device 1310 may allow the user to input a text thereto based on a text input through a physical keyboard.

When the user presses 'L' on the physical keyboard, which is the second electronic device 1320, in order to input the character 'L' to the first electronic device 1310, the first electronic device 1310 may recognize the current cursor position by performing screen analysis and determine an action sequence for achieving a sub-goal. In detail, because the cursor is currently on 'A', the first electronic device 1310 may determine that the action sequence is 'Move down once, move to the right four times, and enter'. The first electronic device 1310 may perform the determined action sequence to input the character 'L' thereto.

Figure 13C:
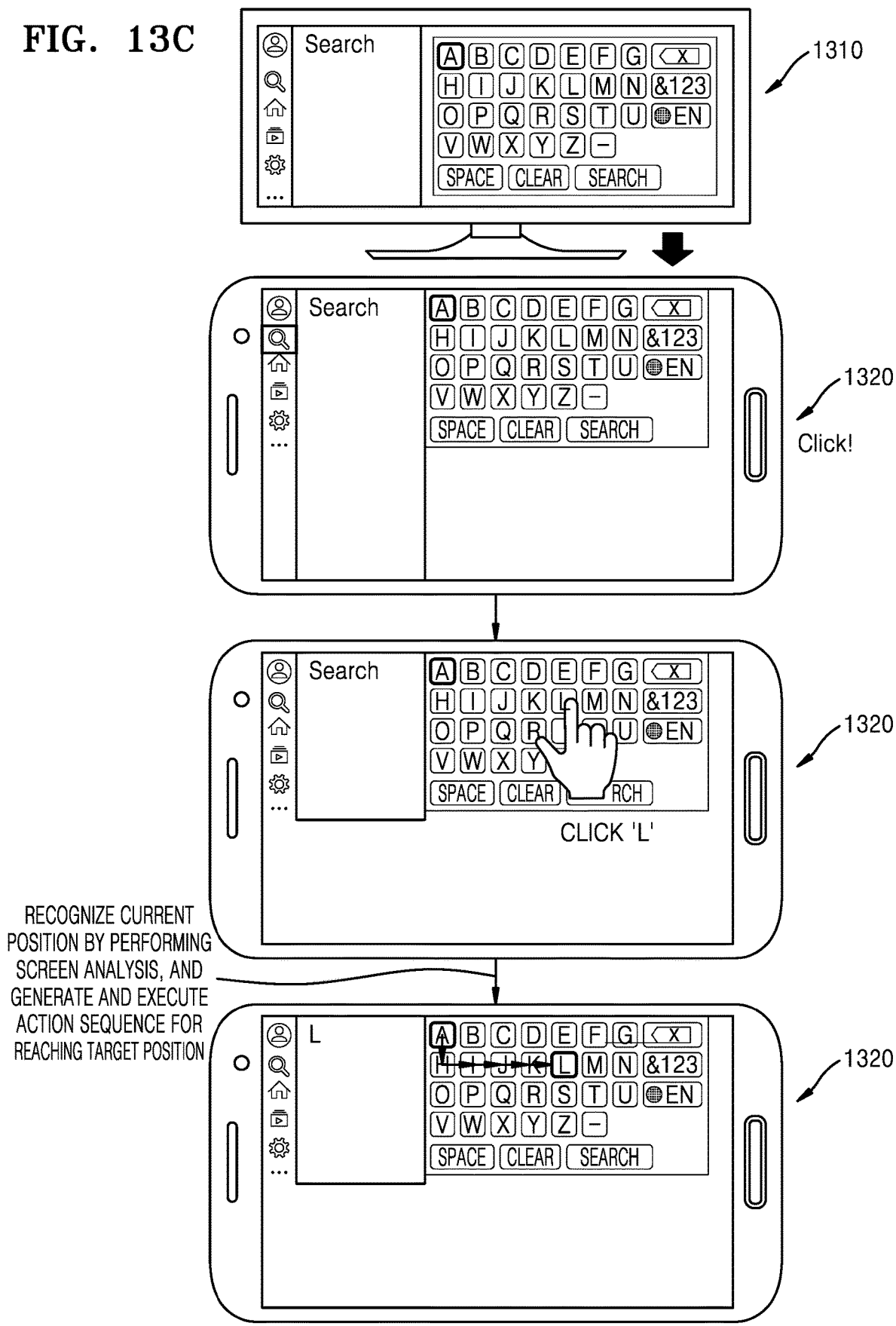
FIG. 13C is a diagram for describing a third embodiment of an operation of inputting a text to a first electronic device by inputting a touch to a second electronic device, according to an embodiment of the disclosure.

FIG. 13C is a diagram for describing a third embodiment of an operation of inputting a text to a first electronic device by inputting a touch to a second electronic device, according to an embodiment of the disclosure.

For convenience of description, an example will be described with reference to FIG. 13C, in which the second electronic device 1320 includes a layout analyzer, a command analyzer, a planner, and a layout navigator, for controlling the first electronic device 1310 (i.e., the same example as described with reference to FIG. 11D). However, the description below is not limited to the example, and is also applicable to any one of the examples described with reference to FIGS. 11C to 11G. In addition, for convenience of description, in the example, the first electronic device 1310 on which text typing is performed as a control operation is a TV, and the second electronic device 1320 to which a touch command is input as a control command is a smart phone.

In an embodiment of the disclosure, the first electronic device 1310 may duplicate a screen and transmit the duplicate screen to the second electronic device 1320. The second electronic device 1320 may display the duplicate screen and receive a user touch command. The second electronic device 1320 may generate an action sequence for controlling the first electronic device 1310 based on the user touch command.

In an embodiment of the disclosure, when the user touches 'L' on the duplicate screen of the second electronic device 1320 to input the character 'L' to the first electronic device 1310, the second electronic device 1320 may recognize the current cursor position by performing screen analysis and determine an action sequence for achieving a sub-goal. In detail, because the cursor is currently on 'A', the second electronic device 1320 may determine that the action sequence is 'Move down once, move to the right four times, and enter'.

The second electronic device 1320 may transmit the determined action sequence to the first electronic device 1310. The first electronic device 1310 may be controlled based on the received action sequence to allow the character 'L' to be input thereto.

FIG. 14 is a diagram for describing another embodiment of the disclosure in which a first electronic device is controlled based on a touch input on a second electronic device.

For convenience of description, an example will be described with reference to FIG. 14, in which a first electronic device 1410 on which screen navigation is performed as a control operation is a device with a touch input function (e.g., a kiosk, an electronic blackboard, etc.), and a second electronic device 1420 to which a touch command is input as a control command is a smart phone. In addition, in the example, the second electronic device 1420 may include a layout analyzer, a command analyzer, a planner, and a layout navigator, for controlling the first electronic device 1410 (i.e., the same example as described with reference to FIG. 11D). However, the description below is not limited to the example, and is also applicable to any one of the examples described with reference to FIGS. 11C to 11G.

In an embodiment of the disclosure, the user may use the second electronic device 1420 to control the first electronic device 1410.

The second electronic device 1420 may receive and display a duplicate screen from the first electronic device 1410. The second electronic device 1420 may receive a touch command from the user.

In an embodiment of the disclosure, the first electronic device 1410 has a touch input function, and thus the second electronic device 1420 only needs to determine whether the touched region corresponds to a particular function and/or action, without having to analyze a screen layout to plan sub-goals for a control command according to the user touch input. The second electronic device 1420 only needs to transmit, to the first electronic device 1410, the coordinates of a touch event and the touch command input on the duplicate screen. In detail, when the user touches a 'Purchase' button 1422 on the second electronic device 1420, the second electronic device 1420 may transmit, to the first electronic device 1410, the coordinates of the 'Purchase' button 1422 on which the touch event has occurred, and a click action. The first electronic device 1410 may perform a system action 'Click 'Purchase' button' to move to a payment screen. In an embodiment of the disclosure, the second electronic device 1420 may display a payment screen 1424 for allowing payment to be performed in the first electronic device 1410. When a payment action is performed in the second electronic device 1420, the second electronic device 1420 may transmit data related to the payment action to the first electronic device 1410 to complete the payment.

Figure 15:
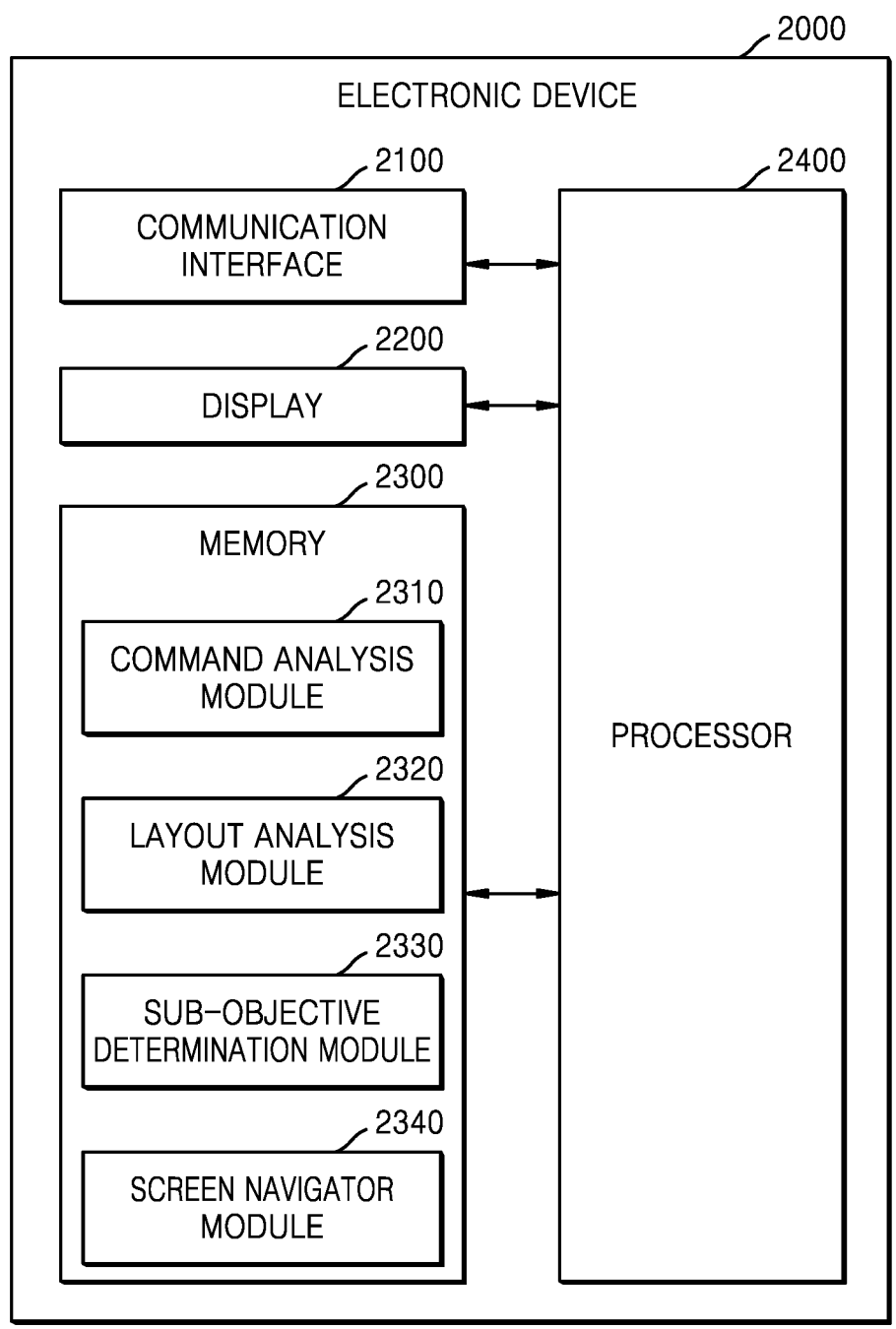
FIG. 15 is a block diagram illustrating a configuration of an electronic device according to an embodiment of the disclosure.

FIG. 15 is a block diagram illustrating a configuration of an electronic device according to an embodiment of the disclosure.

Referring to FIG. 15, an electronic device 2000 according to an embodiment of the disclosure may include a communication interface 2100, a display 2200, a memory 2300, and a processor 2400.

The communication interface 2100 may perform data communication with other electronic devices under the control by the processor 2400.

The communication interface 2100 may include a communication circuit. The communication interface 2100 may include a communication circuit capable of performing data communication between the electronic device 2000 and other devices by using at least one of data communication schemes, for example, wired local area network (LAN), wireless LAN, Wi-Fi, Bluetooth, ZigBee, Wi-Fi Direct (WFD), Infrared Data Association (IrDA), Bluetooth Low Energy (BLE), near-field communication (NFC), wireless broadband internet (WiBro), Worldwide Interoperability for Microwave Access (WiMAX), Shared Wireless Access Protocol (SWAP), Wireless Gigabit Alliance (WiGig), and radio frequency (RF) communication.

The communication interface 2100 according to an embodiment of the disclosure may transmit and receive data for controlling a screen of the electronic device 2000 to and from an external device. For example, the communication interface 2100 may transmit a screen image of the electronic device 2000 to a second electronic device or the server 3000, or may receive a control command for the electronic device 2000 generated by the second electronic device or the server 3000. Also, the communication interface 2100 may transmit and receive an artificial intelligence model (e.g., an ASR model, an NLU model, a vision recognition model, etc.), which is used by the electronic device 2000 to control a screen, and training data to and from an external device.

The display 2200 may output an image signal to the screen of the electronic device 2000 under the control by the processor 2400. The screen displayed on the display 2200 may be changed as at least one task for controlling an application is performed according to the embodiments of the disclosure.

The memory 2300 may store instructions, a data structure, and program code that are readable by the processor 2400. In the embodiments of the disclosure, operations performed by the processor 2400 may be implemented by executing instructions or code of a program stored in the memory 2300.

The memory 2300 may include a flash memory-type memory, a hard disk-type memory, a multimedia card micro-type memory, a card-type memory (e.g., an SD memory, an XD memory, etc.), a non-volatile memory including at least one of read-only memory (ROM), electrically erasable programmable ROM (EEPROM), programmable ROM (PROM), a magnetic memory, a magnetic disk, or an optical disk, and a volatile memory such as random-access memory (RAM) or static RAM (SRAM).

The memory 2300 according to an embodiment of the disclosure may store one or more instructions and/or a program that enable the electronic device 2000 to operate for screen control. For example, the memory 2300 may store a command analysis module 2310, a layout analysis module 2320, a sub-goal determination module 2330, and a screen navigator module 2340.

The processor 2400 may control overall operations of the electronic device 2000. For example, the processor 2400 may execute one or more instructions of the program stored in the memory 2300 to control the overall operations of the electronic device 2000 to control a screen.

For example, the processor 2400 may include, but is not limited to, at least one of a central processing unit (CPU), a microprocessor, a graphics processing unit (GPU), an application-specific integrated circuits (ASIC), a digital signal processor (DSP), a digital signal processing device (DSPDs), a programmable logic device (PLD), a field-programmable gate array (FPGAs), an application processor, a neural processing unit, or a dedicated artificial intelligence processor designed in a hardware structure specialized for processing an artificial intelligence model.

The processor 2400 may execute the command analysis module 2310 to analyze a user input command. The command analysis module 2310 may include a command analyzer. The command analyzer may receive a user command and output a user intent. A user intent may include information indicating a function and/or operation that a user input is to perform via the electronic device 2000.

The processor 2400 may execute the layout analysis module 2320 to analyze a screen layout. The layout analysis module 2320 may include a layout analyzer. The layout analyzer may receive a screen image of the electronic device 2000 and output layout information. The layout information may include, for example, the positions of UI elements in the screen, the sizes of the UI elements, the function of an icon (e.g., icon recognition), the content of a text (e.g., character recognition), and the like.

The processor 2400 may execute the sub-goal determination module 2330 to establish a plan for executing a control command corresponding to the user intent. The sub-goal determination module 2330 may include a planner. The planner may determine a sub-goal based on the layout information and the user intent.

The processor 2400 may execute the screen navigator module 2340 to perform screen navigation. The screen navigator module 2340 may include a layout navigator. The layout navigator may determine a task corresponding to a sub-goal. A task is a set of system actions (e.g., a cursor movement, a click, etc.), which are units for executing a particular function in the electronic device 2000. The electronic device 2000 may achieve a sub-goal by performing a task corresponding to the sub-goal. The task for achieving the sub-goal may include system actions including cursor movements, clicks, etc.

Figure 16:
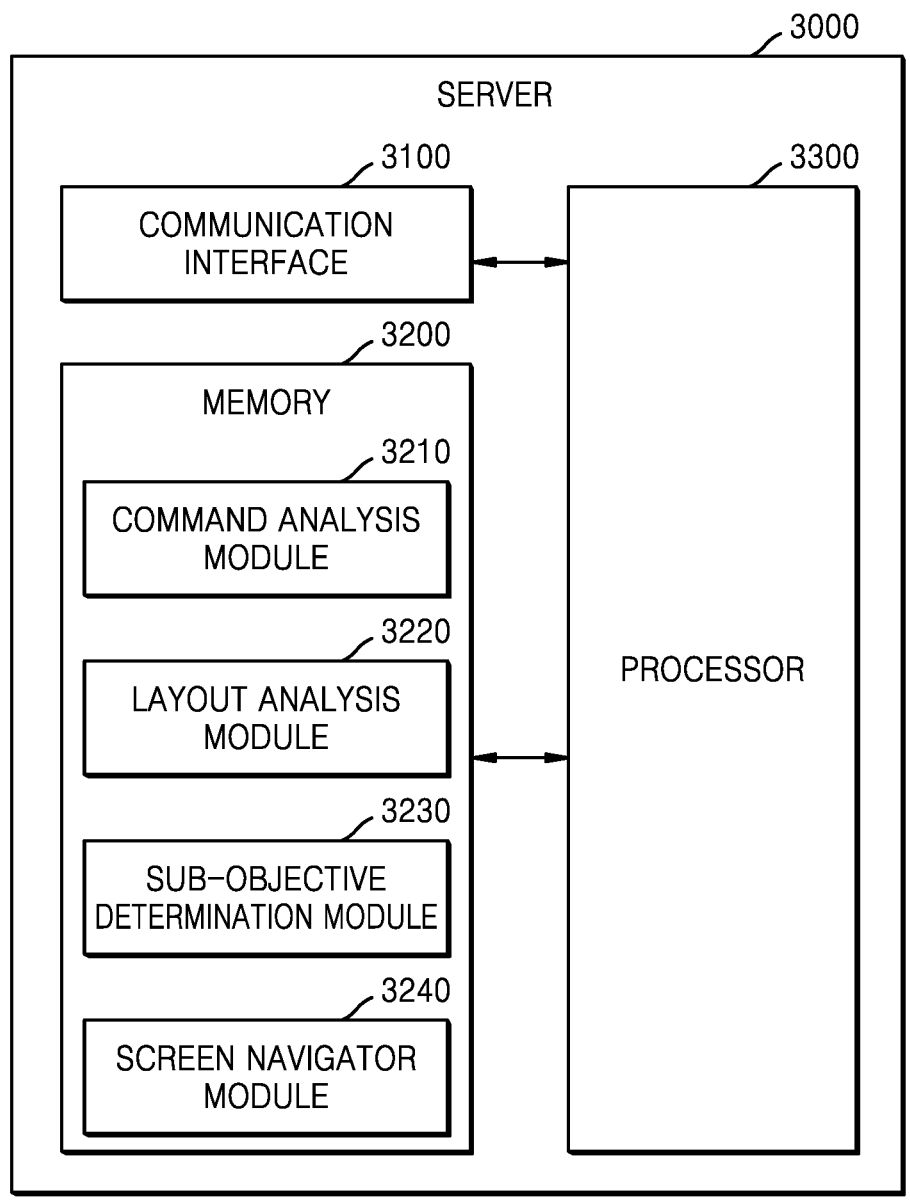
FIG. 16 is a block diagram illustrating a configuration of a server according to an embodiment of the disclosure.

FIG. 16 is a block diagram illustrating a configuration of a server according to an embodiment of the disclosure.

In an embodiment of the disclosure, the operations of the electronic device 2000 described above may be performed by the server 3000.

The server 3000 according to an embodiment of the disclosure may include a communication interface 3100, a memory 3200, and a processor 3300. The communication interface 3100, the memory 3200, and the processor 3300 of the server 3000 correspond to the communication interface 2100, the memory 2300, and the processor 2400 of the electronic device 2000 illustrated in FIG. 15, respectively, and thus the description thereof will be omitted.

The server 3000 according to an embodiment of the disclosure may be a device having higher computing performance than that of the electronic device 2000 and thus capable of performing a larger amount of computation. The server 3000 may perform training of an artificial intelligence model requiring a relatively larger amount of computation than does inference.

FIG. 17 is a flowchart of a control operation of an electronic device according to an embodiment of the disclosure.

In operation S1710, the electronic device 2000 according to an embodiment of the disclosure receives a user input.

In an embodiment of the disclosure, user inputs may include, but are not limited to, voice signal inputs, text inputs, gesture inputs, and touch inputs on a duplicate screen on a second device. The electronic device 2000 may determine a user intent based on the user input.

In operation S1720, the electronic device 2000 according to an embodiment of the disclosure determines whether screen analysis is required. In an embodiment of the disclosure, when the application that is the target of the user input is an app that is directly accessible by the OS, the electronic device 2000 may obtain layout information without screen analysis. When it is determined that screen analysis may be required, the electronic device 2000 may perform operation S1725.

In operation S1725, the electronic device 2000 according to an embodiment of the disclosure obtains layout information by performing screen analysis.

In operation S1730, the electronic device 2000 according to an embodiment of the disclosure plans a sub-goal. The electronic device 2000 may plan the sub-goal based on the user intent and the layout information (e.g., elements of a user interface). A plurality of sub-goals may be planned. The electronic device 2000 may determine a task corresponding to a first sub-goal, and perform system actions to achieve the sub-goal. When the first sub-goal is achieved, the electronic device 2000 may perform operation S1735.

In operation S1735, the electronic device 2000 according to an embodiment of the disclosure obtains layout information by performing screen analysis. The layout information obtained in operation S1735 may be used to determine whether the user intent is achieved or whether a sub-goal is achieved.

In operation S1740, the electronic device 2000 according to an embodiment of the disclosure determines whether the user intent is achieved. Based on the layout information obtained in operation S1735, the electronic device 2000 may determine whether the current screen of the electronic device 2000 is in a target state in which the user intent is achieved.

In operation S1750, when the user intent is not achieved, the electronic device 2000 according to an embodiment of the disclosure selects a next sub-goal (i.e., the sub-goal to be performed after the previous sub-goal is achieved).

In operation S1760, the electronic device 2000 according to an embodiment of the disclosure plans an action sequence corresponding to a task for achieving the next sub-goal. The electronic device 2000 may perform the action sequence (i.e., system actions) such that the next sub-goal is achieved.

In operation S1770, the electronic device 2000 according to an embodiment of the disclosure determines whether the sub-goal is achieved. When all of the system actions of the planned action sequence are performed, the electronic device 2000 may determine that the sub-goal is achieved. When only some of the system actions of the planned action sequence are performed, the electronic device 2000 may determine that the sub-goal is not achieved.

In operation S1780, the electronic device 2000 according to an embodiment of the disclosure checks whether the sub-goal still exists. For example, the sub-goal may be lost due to an error in the electronic device 2000, or the sub-goal may not exist due to an app conversion or another operation performed on the electronic device 2000. When no sub-goal exists, the electronic device 2000 may perform operation S1720 again. When the sub-goal exists, the electronic device 2000 may perform operation S1790.

In operation S1790, the electronic device 2000 according to an embodiment of the disclosure may perform the remaining next actions when the sub-goal still exists, only a portion of the action sequence is performed, and thus the sub-goal is not achieved.

In operation S1795, the electronic device 2000 according to an embodiment of the disclosure obtains layout information by performing screen analysis. The layout information obtained in operation S1795 may be used to determine whether the sub-goal is achieved.

The embodiments of the disclosure may be implemented as a recording medium including computer-executable instructions such as a computer-executable program module. A computer-readable medium may be any available medium which is accessible by a computer, and may include a volatile or non-volatile medium and a removable or non-removable medium. Also, the computer-readable media may include computer storage media and communication media. The computer storage media include both volatile and non-volatile, removable and non-removable media implemented in any method or technique for storing information such as computer readable instructions, data structures, program modules or other data. The communication medium may typically include computer-readable instructions, data structures, or other data of a modulated data signal such as program modules.

In addition, the computer-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to various embodiments disclosed herein may be included in a computer program product and provided. The computer program product may be traded between a seller and a purchaser as a commodity. The computer program product may be distributed in the form of a machine-readable storage medium (e.g., a compact disc- ROM (CD-ROM)), or may be distributed online (e.g., downloaded or uploaded) through an application store or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

The above-described description of the disclosure is provided only for illustrative purposes, and those of skill in the art will understand that the disclosure may be easily modified into other detailed configurations without modifying technical aspects and essential features of the disclosure. Therefore, it should be understood that the above-described embodiments of the disclosure are exemplary in all respects and are not limited. For example, the elements described as single entities may be distributed in implementation, and similarly, the elements described as distributed may be combined in implementation.

The scope of the disclosure is not defined by the detailed description of the disclosure but by the following claims, and all modifications or alternatives derived from the scope and spirit of the claims and equivalents thereof fall within the scope of the disclosure.

The invention claimed is:

1. A method, performed by an electronic device, of navigating a screen of an application, the method comprising:
   receiving a user input;
   determining, based on the user input, a user intent for controlling the electronic device;
   determining a command for performing a control operation corresponding to the user intent as a goal;
   generating layout information by identifying functions of user interface (UI) elements, wherein a UI element causes a corresponding function to perform when selected by the user, and the layout information includes positions, sizes, and the functions of the UI elements;
   determining, based on the user intent and the layout information, at least one sub-goal for executing the command, wherein the determining of the at least one sub-goal comprises:
      detecting a current state of the electronic device based on the layout information;
      determining, based on the user intent, a target state of the electronic device in which the command is executed; and
      determining the at least one sub-goal based on the current state of the electronic device and the target state of the electronic device;
   executing the command by performing at least one task corresponding to the at least one sub-goal based on the at least one sub-goal including two or more sub-goals, sequentially achieving the two or more sub-goals until the command is executed;
   performing the validation based on the screen of the application being switched from a first screen to a second screen, by identifying the UI elements in the second screen to determine whether a first sub-goal is achieved; and
   changing a second sub-goal, which has been determined previously, based on whether the first sub-goal is achieved,
   wherein the executing of the command includes navigating the application by performing the at least one task including switching of the screen of the application,
   wherein the at least one sub-goal is changeable based on a validation of an operation of navigating the application for executing the command, and
   the at least one task includes units of action for navigating the application.

2. The method of claim 1, wherein the elements of the user interface of the screen of the application include at least one of an icon, an image, a text, or a button.

3. The method of claim 1, further comprising determining whether the command corresponds to a function that is callable by an operating system of the electronic device,
   wherein the generating layout information includes generating the layout information by analyzing the screen layout of the application based on the command corresponding to a function that is uncallable by the operating system of the electronic device.

4. The method of claim 1, wherein the dynamically determining of the second sub-goal includes changing the second sub-goal based on layout information of the second screen.

5. The method of claim 4, wherein the executing of the command includes:
   performing a first task corresponding to the first sub-goal; and
   performing a second task corresponding to the second sub-goal.

6. The method of claim 1, wherein
   the user input includes a voice signal, and
   the determining of the user intent includes:
   converting the voice signal into a text by performing automatic speech recognition (ASR) on the voice signal; and
   obtaining the user intent by applying the text to a natural-language understanding (NLU) model.

7. An electronic device for navigating a screen of an application, the electronic device comprising:
   a display configured to display the screen of the application being executed;
   a communication interface;
   a memory storing one or more instructions; and
   a processor configured to execute the one or more instructions stored in the memory to:
   receive a user input,
   determine, based on the user input, a user intent for controlling the electronic device,
   determine a command for performing a control operation corresponding to the user intent as a goal,
   generate layout information by identifying functions of user interface (UI) elements, wherein a UI element causes a corresponding function to perform when selected by the user, and the layout information includes positions, sizes, and the functions of the UI elements,
   determine, based on the user intent and the layout information, at least one sub-goal for executing the command, wherein the determining the at least one sub-goal comprises:
      detect a current state of the electronic device based on the layout information,
      determine, based on the user intent, a target state of the electronic device in which the operation is executed, and
      determine the at least one sub-goal based on the current state of the electronic device and the target state of the electronic device,
   execute the command by performing at least one task corresponding to the at least one sub-goal based on the at least one sub-goal including two or more sub-goals, sequentially achieve the two or more sub-goals until the control command is executed, perform the validation based on the screen of the application being switched from a first screen to a second screen, by identifying the UI elements in the second screen to determine whether a first sub-goal is achieved, and change a second sub-goal, which has been determined previously, based on whether the first sub-goal is achieved, wherein the executing of the command includes navigating the application by performing the at least one task including switching of the screen of the application, wherein the at least one sub-goal is changeable based on a validation on an operation of navigating the application for executing the command, and the at least one task includes units of action for navigating the application.

8. The electronic device of claim 7, wherein the processor is further configured to execute the one or more instructions to:

determine whether the command corresponds to a function that is callable by an operating system of the electronic device, and generating the layout information by analyzing the screen layout of the application based on the command corresponding to a function that is uncallable by the operating system of the electronic device.

9. The electronic device of claim 7, wherein the processor is further configured to execute the one or more instructions to change the second sub-goal based on layout information of the second screen.

10. The electronic device of claim 9, wherein the processor is further configured to execute the one or more instructions to perform a first task corresponding to the first sub-goal, and perform a second task corresponding to the second sub-goal.

11. The electronic device of claim 7, wherein the user input includes a voice signal, and the processor is further configured to execute the one or more instructions to convert the voice signal into a text by performing automatic speech recognition (ASR) on the voice signal, and obtain the user intent by applying the text to a natural-language understanding (NLU) model.

12. A non-transitory computer-readable recording medium having recorded thereon a program for navigating a screen of an application by executing a method comprising:

receiving a user input;

determining, based on the user input, a user intent for controlling the electronic device;

determining a command for performing a control operation corresponding to the user intent as a goal;

generating layout information by identifying functions of user interface (UI) elements, wherein a UI element causes a corresponding function to perform when selected by the user, and the layout information includes positions, sizes, and the functions of the UI elements;

determining, based on the user intent and the layout information, at least one sub-goal for executing the command, wherein the determining of the at least one sub-goal comprises:

detecting a current state of the electronic device based on the layout information;

determining, based on the user intent, a target state of the electronic device in which the command is executed; and determining the at least one sub-goal based on the current state of the electronic device and the target state of the electronic device;

executing the command by performing at least one task corresponding to the at least one sub-goal based on the at least one sub-goal including two or more sub-goals, sequentially achieving the two or more sub-goals until the command is executed;

perform the validation based on the screen of the application being switched from a first screen to a second screen, by identifying the UI elements in the second screen to determine whether a first sub-goal is achieved; and change a second sub-goal, which has been determined previously, based on whether the first sub-goal is achieved, wherein the executing of the command includes navigating the application by performing the at least one task including switching of the screen of the application, wherein the at least one sub-goal is changeable based on a validation of an operation of navigating the application for executing the command, and the at least one task includes units of action for navigating the application.

* * * * *